(12) United States Patent
Goto et al.

(10) Patent No.: US 8,886,959 B2
(45) Date of Patent: *Nov. 11, 2014

(54) SECURE PROCESSOR AND A PROGRAM FOR A SECURE PROCESSOR

(75) Inventors: Seiji Goto, Kawasaki (JP); Jun Kamada, Kawasaki (JP); Taiji Tamiya, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 60 days.

This patent is subject to a terminal disclaimer.

(21) Appl. No.: 12/926,476

(22) Filed: Nov. 19, 2010

(65) Prior Publication Data

US 2011/0167278 A1    Jul. 7, 2011

Related U.S. Application Data

(62) Division of application No. 11/089,352, filed on Mar. 25, 2005, now Pat. No. 7,865,733.

(30) Foreign Application Priority Data

Jun. 30, 2004   (JP) ................................. 2004-194951

(51) Int. Cl.
G06F 11/30 (2006.01)
G06F 12/14 (2006.01)
G06F 21/71 (2013.01)
G06F 21/70 (2013.01)
G06F 21/72 (2013.01)
G06F 21/57 (2013.01)
G06F 21/55 (2013.01)
G06F 21/64 (2013.01)
G06F 21/52 (2013.01)

(52) U.S. Cl.
CPC ................ *G06F 21/70* (2013.01); *G06F 21/71* (2013.01); *G06F 21/72* (2013.01); *G06F 12/1408* (2013.01); *G06F 21/575* (2013.01); *G06F 21/554* (2013.01); *G06F 21/64* (2013.01); *G06F 21/52* (2013.01)
USPC ............................................. 713/190; 380/28

(58) Field of Classification Search
USPC ......................................................... 713/190
See application file for complete search history.

(56) References Cited

U.S. PATENT DOCUMENTS 4,774,659 A * 9/1988 Smith et al. .................... 711/208
4,847,902 A   7/1989 Hampson (Continued)

FOREIGN PATENT DOCUMENTS

EP   1202150    5/2002
JP   7-182304   7/1995

(Continued)

OTHER PUBLICATIONS

European Search Report dated Mar. 28, 2011 in corresponding European Patent Application 05251054.2.

(Continued)

*Primary Examiner* — Philip Chea
*Assistant Examiner* — Monjour Rahim
(74) *Attorney, Agent, or Firm* — Staas & Halsey LLP

(57) ABSTRACT

The instruction code including an instruction code stored in the area where the encrypted instruction code is stored in a non-rewritable format is authenticated using a specific key which is specific to the core where the instruction code is executed or an authenticated key by a specific key to perform an encryption processing for the input and output data between the core and the outside.

18 Claims, 75 Drawing Sheets

(56) References Cited

U.S. PATENT DOCUMENTS

| | | | |
|---|---|---|---|
| 5,386,469 | A | 1/1995 | Yearsley et al. |
| 5,574,785 | A * | 11/1996 | Ueno et al. ............... 380/2 |
| 5,633,934 | A | 5/1997 | Hember |
| 5,757,919 | A | 5/1998 | Herbert et al. |
| 5,859,911 | A | 1/1999 | Angelo et al. |
| 5,915,025 | A | 6/1999 | Taguchi et al. |
| 6,149,522 | A | 11/2000 | Alcorn et al. |
| 6,704,871 | B1 | 3/2004 | Kaplan et al. |
| 6,708,273 | B1 | 3/2004 | Ober et al. |
| 6,832,316 | B1 | 12/2004 | Sibert |
| 7,134,025 | B1 | 11/2006 | Trimberger |
| 7,149,862 | B2 | 12/2006 | Tune |
| 7,150,039 | B2 | 12/2006 | Kusakabe |
| 7,363,491 | B2 | 4/2008 | O'Conner |
| 7,370,210 | B2 | 5/2008 | Symes |
| 2001/0029579 | A1 | 10/2001 | Kusakabe et al. |
| 2002/0051536 | A1 | 5/2002 | Shirakawa et al. |
| 2002/0095296 | A1 | 7/2002 | Hind et al. |
| 2002/0099946 | A1 * | 7/2002 | Herbert et al. ......... 713/193 |
| 2002/0184046 | A1 * | 12/2002 | Kamada et al. ......... 705/1 |
| 2003/0046563 | A1 * | 3/2003 | Ma et al. ............ 713/190 |
| 2003/0074567 | A1 | 4/2003 | Charbonneau |
| 2003/0126458 | A1 | 7/2003 | Teramoto et al. |
| 2003/0163648 | A1 | 8/2003 | Smith |
| 2004/0148502 | A1 | 7/2004 | Gollner et al. |

FOREIGN PATENT DOCUMENTS

| | | |
|---|---|---|
| JP | 9-258977 | 10/1997 |
| JP | 11-282667 | 10/1999 |
| JP | 2002-202720 | 7/2002 |
| JP | 2002-232417 | 8/2002 |
| JP | 2002-353960 | 12/2002 |
| JP | 2004-38394 | 2/2004 |
| WO | 00/10283 | 2/2000 |

OTHER PUBLICATIONS

Mikio Hashimoto et al., "Multi-vendor Secure Processor under a Hostile Operating System", Journal of Information Processing Society of Japan, the Information Processing Society of Japan, Mar. 15, 2004, vol. 145, No. SIG3 (ACS5), pp. 1-10.

Japanese Office Action issued Apr. 19, 2011 in corresponding Japanese Patent Application 2009-185005.

Chinese Office Action issued May 19, 2011 in corresponding Chinese Patent Application 200710140450.0.

Chinese Office Action issued May 19, 2011 in corresponding Chinese Patent Application 200710140450/0.

Extended European Search Report issued Oct. 29, 2012 in corresponding European Patent Application No. 12165515.3.

Japanese Office Action mailed May 28, 2013 in corresponding Japanese Application No. 2011-136617.

Extended European Search Report issued Oct. 22, 2012 in corresponding European Patent Application No. 12165494.1.

Extended European Search Report issued Oct. 26, 2012 in corresponding European Patent Application No. 12165501.3.

Extended European Search Report issued Oct. 19, 2012 in corresponding European Patent Application No. 12165519.5.

European Office Action dated Mar. 4, 2014 in corresponding European Patent Application No. 12165519.5, Date: Feb. 23, 2005.

European Office Action dated Mar. 4, 2014 in corresponding European Patent Application No. 12165501.3 ; Date: Feb. 23, 2005.

Chinese Office Action issued on Mar. 13, 2009 in corresponding Chinese Patent Application 200710140450.0.

Japanese Office Action issued on Jun. 9, 2009 in corresponding Japanese Patent Application 2004-194951.

Office Action from corresponding Chinese application No. 200710140450.0 issued Aug. 28, 2009.

Office Action from corresponding Japanese Application No. 2004-194951 issued Sep. 8, 2009.

Yu Inamura, "Realization of Security Using the Latest Encoding Technique", Open Design, Japan, CQ Publishing Co., Ltd., vol. 3, No. 3, pp. 12-29, Mar. 25, 2005.

Office Action mailed Feb. 4, 2009 in corresponding U.S. Appl. No. 11/089,352.

Office Action mailed Aug. 6, 2009 in corresponding U.S. Appl. No. 11/089,352.

Office Action mailed Dec. 30, 2009 in corresponding U.S. Appl. No. 11/089,352.

Notice of Allowance mailed Aug. 19, 2010 in corresponding U.S. Appl. No. 11/089,352.

* cited by examiner

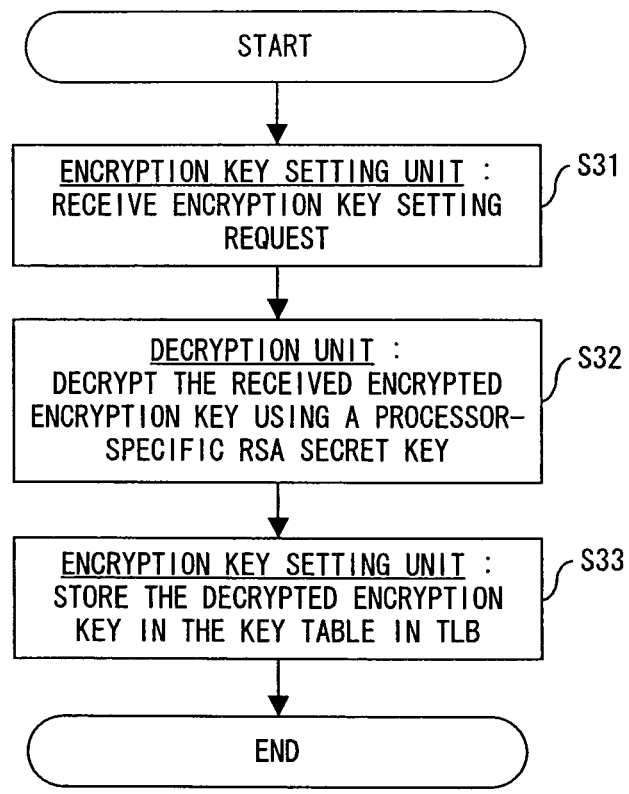
F I G. 7

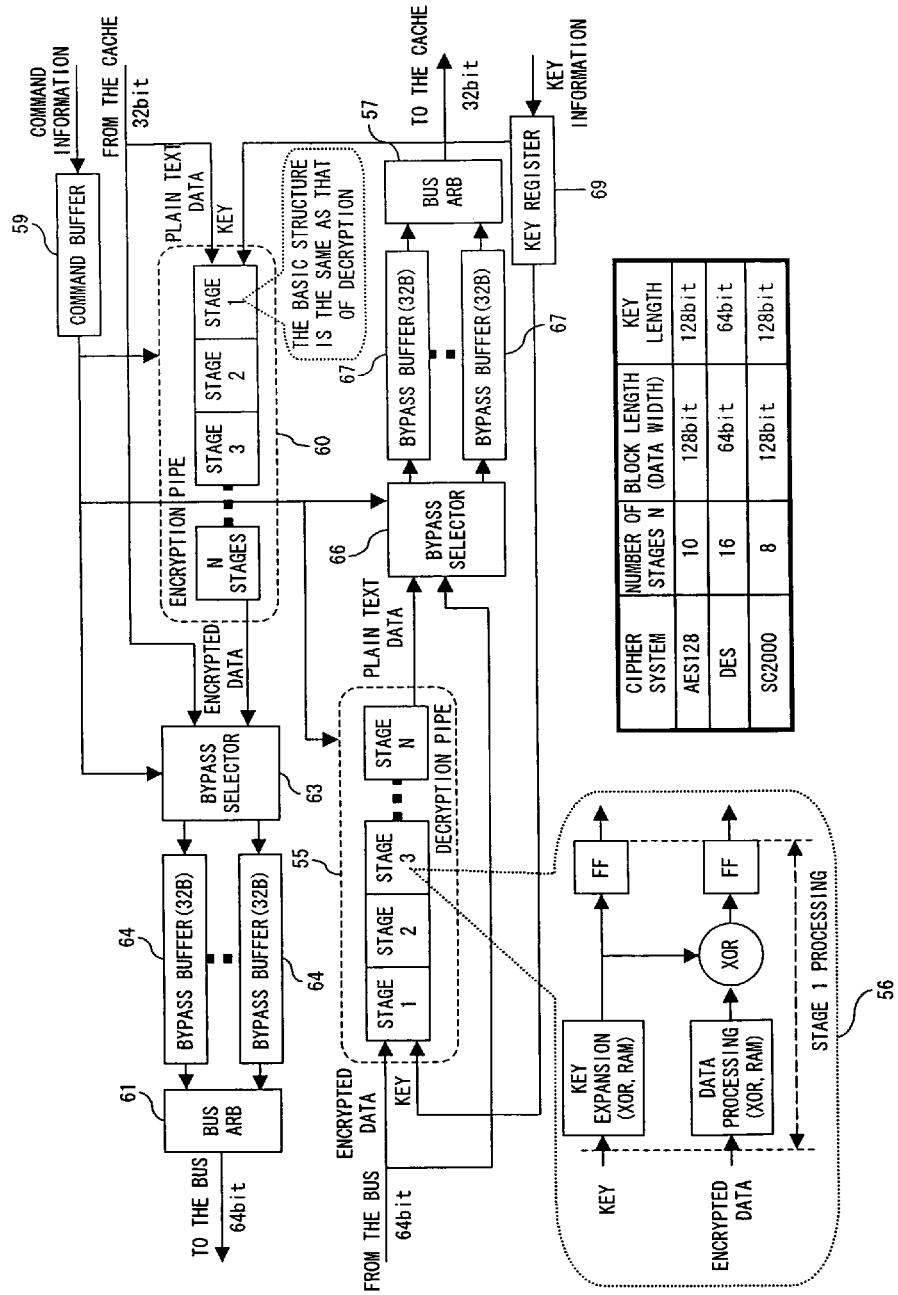
F I G. 27

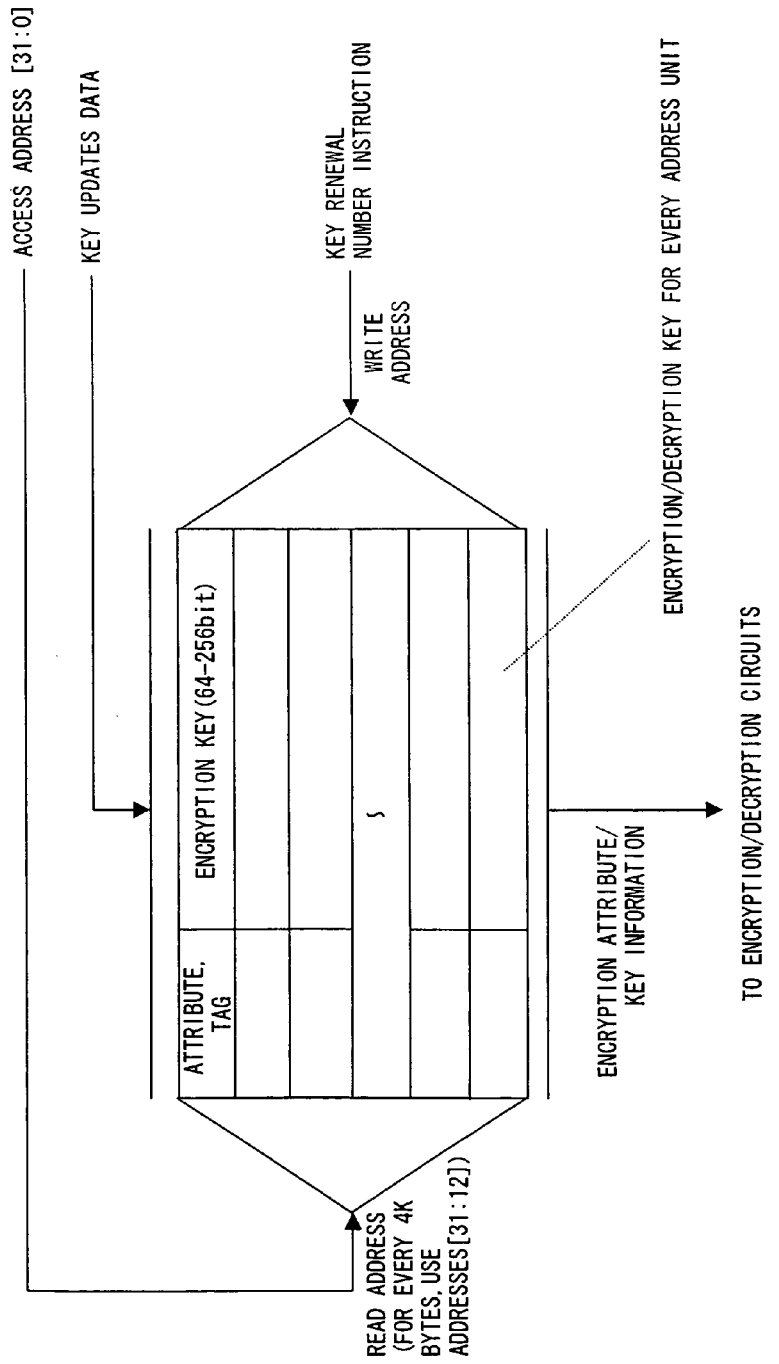
F I G. 32

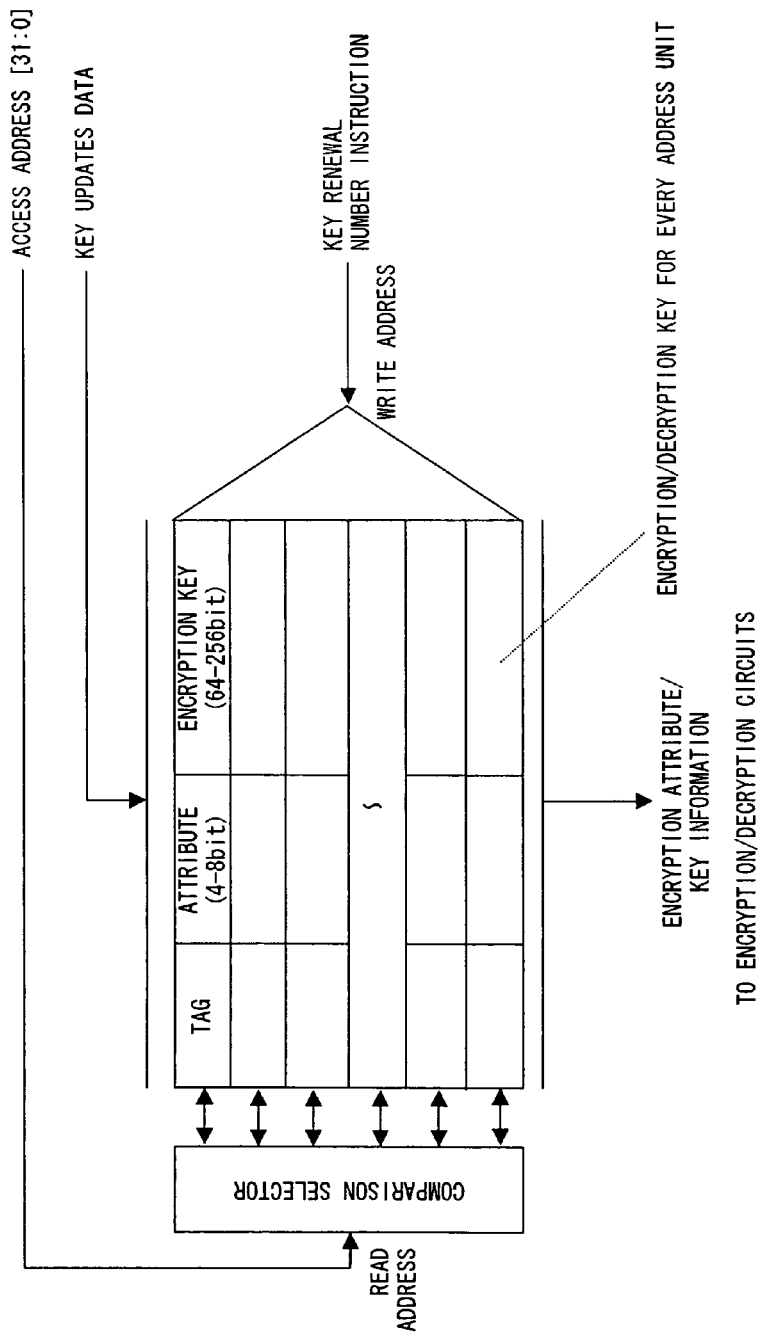
F I G. 34

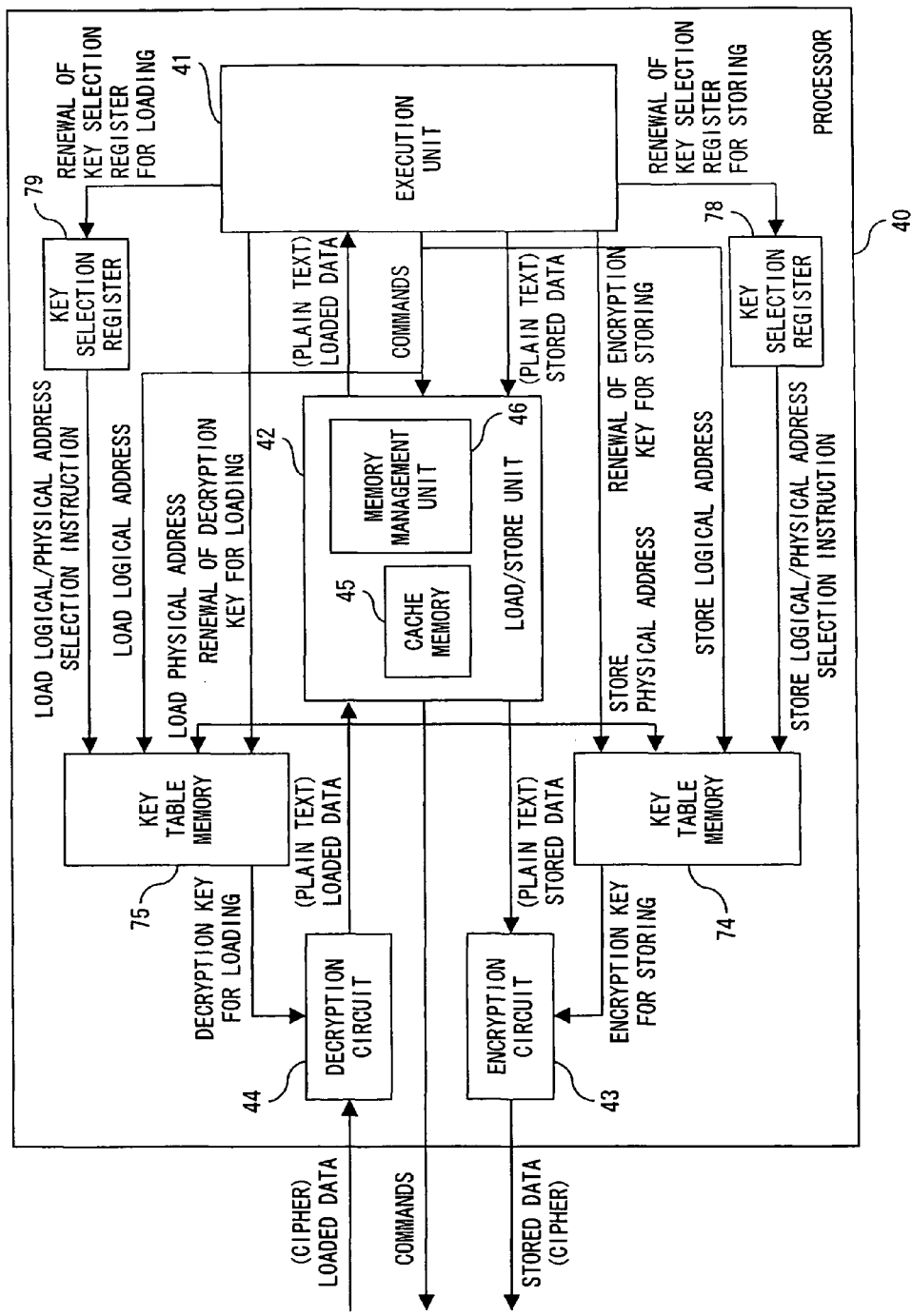
F I G. 36

FIG. 43

| ITEMS | DIRECTIONS | 20 | 21 | 22 | 23 | 24 | 21+22+23 | 27 | 29 | 30 | 31 | 35 | 36 | 38 | 40 | 41 | COMMENT |
|---|---|---|---|---|---|---|---|---|---|---|---|---|---|---|---|---|---|
| LOAD DECRYPTION KEY | OUTPUT | O | | | | | | | | | | | | | | O | |
| LOAD DATA | INPUT | O | O | | O | | O | O | O | O | O | O | O | O | O | O | |
| LOAD KEY NUMBER INSTRUCTION | OUTPUT | | O | | | | O | | | | | | | | | O | |
| COMMAND FETCH DATA | INPUT | | | O | | O | O | O | O | O | O | O | O | O | O | O | |
| STORE ENCRYPTION KEY | OUTPUT | O | | | | | | | | | | | | | | O | |
| STORE DATA | OUTPUT | O | O | | O | | O | O | O | O | O | O | O | O | O | O | |
| STORE KEY NUMBER INSTRUCTION | OUTPUT | | O | | | | O | | | | | | | | | O | |
| COMMAND | OUTPUT | O | O | O | O | O | O | O | O | O | O | O | O | O | O | O | ACCESS TYPES, ACCESS SIZES, ETC |
| EXECUTION STATUS SIGNALS | OUTPUT | | | | | | | | | | | | O | | | O | |
| REGISTER WRITE SIGNALS | OUTPUT | | O | O | O | O | O | △ | O | O | O | O | O | △ | O | O | |
| REGISTER READ DATA | INPUT | | △ | △ | △ | △ | △ | △ | △ | | | | | △ | △ | O | |
| REGISTER WRITE DATA | OUTPUT | | △ | △ | △ | △ | △ | △ | △ | | | | | △ | △ | O | |
| ACCESS ADDRESS | OUTPUT | △ | | | | | | O | O | O | O | O | O | O | O | O | |
| LOAD/STORE STATUS SIGNALS | OUTPUT | △ | | | | | | △ | O | O | O | O | O | △ | O | O | |
| KEY SELECTION INSTRUCTION | OUTPUT | | | | | | O | O | | | | O | | | | O | |
| MMU STATUS SIGNALS | OUTPUT | | | | | | | O | | | | | | | | O | |
| SUPERVISOR/USER STATUS SIGNALS | OUTPUT | | | | | | | O | | | | | | O | O | O | |
| CONTEXT ID DATA | OUTPUT | | | | | | O | O | | | | | | | O | O | |

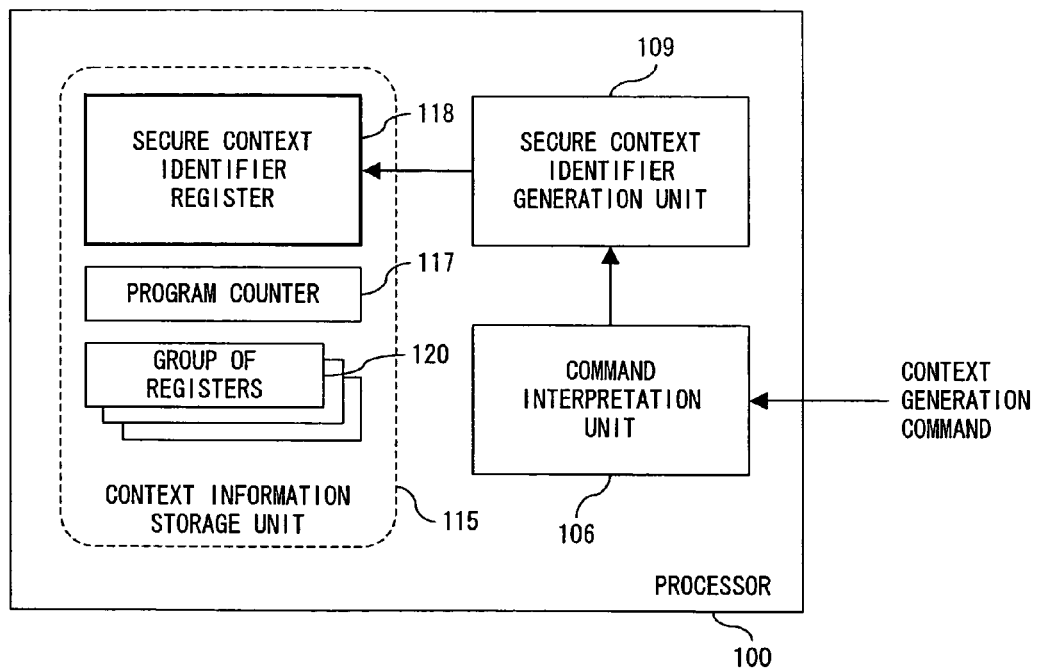
F I G. 4 5

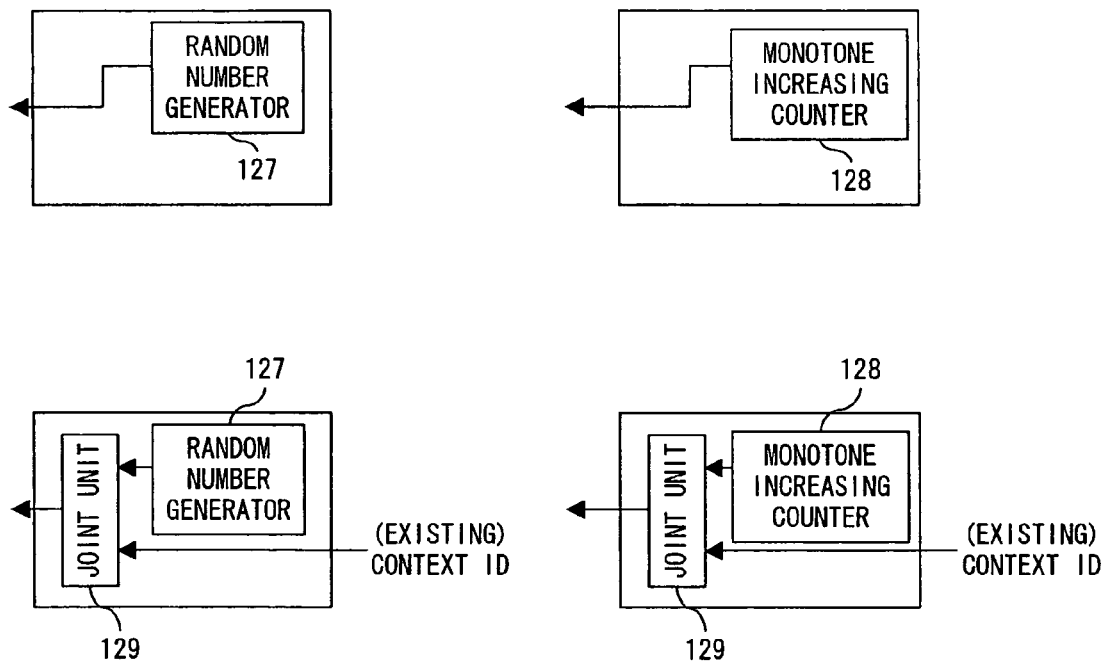
F I G. 4 6

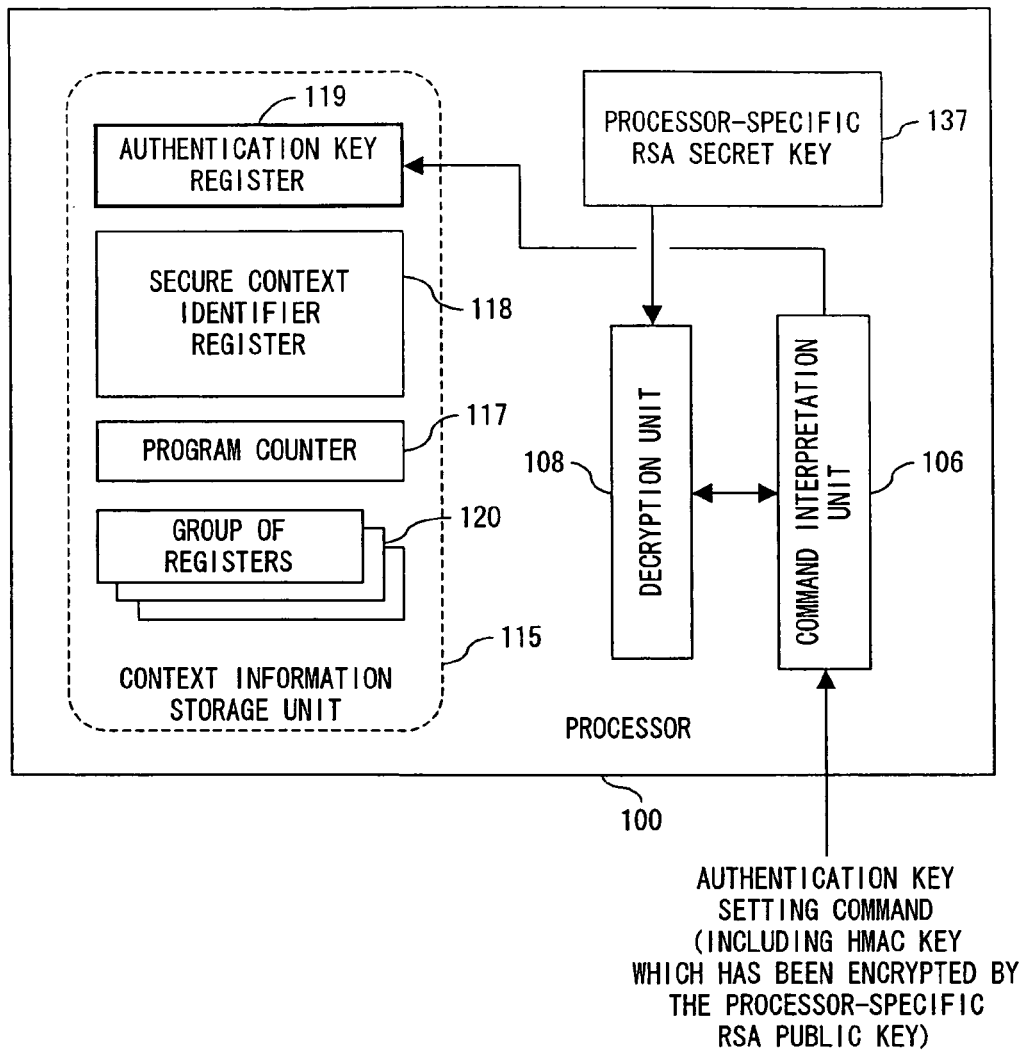
F I G. 5 1

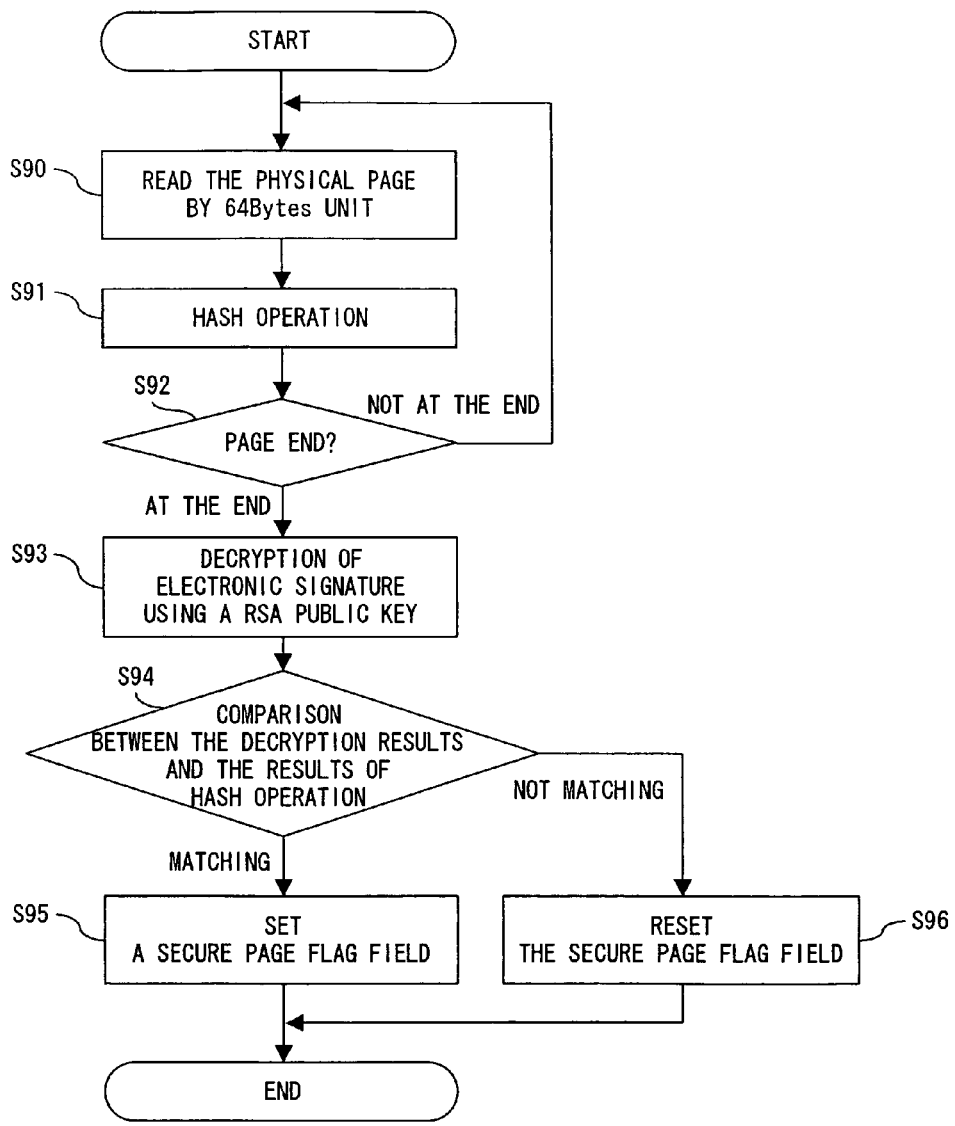
F I G. 5 6

SECURE PROCESSOR AND A PROGRAM FOR A SECURE PROCESSOR

CROSS REFERENCE TO RELATED APPLICATIONS

This application is a divisional of U.S. application Ser. No. 11/089,352, filed Mar. 25, 2005, now U.S. Pat. No. 7,865,733 which is based upon and claims the benefit of priority from the prior Japanese Patent Application No. 2004-194951, filed Jun. 30, 2004, the entire contents of all of which are incorporated herein by reference.

BACKGROUND OF THE INVENTION

1. Field of the Invention

The present invention relates to a system of assuring security for information processing systems such as computers. More precisely, it relates to a secure processor and a program for the secure processor, which are capable of preventing operation of malicious execution codes as in computers and various kinds of equipment with a built-in processor.

2. Description of the Related Art

In the systems using a processor, operations can be described by a program so that those operations showing high flexibility and multiple functions can be easily mounted when compared to systems configured entirely by hardware. Because of these features, processors have been used in numerous systems such as personal computers, PDAs, cellular phones, and information household appliances and with the increased popularity of these systems, processing requiring higher levels of security as in e-commerce has been performed widely. Although a variety of kinds of system-based measures such as encryption for line data and user authentication have been taken in order to tighten security, software-level or processor-level security has become an issue when coping with the spread of computer viruses and illegal accessing as well as dealing with system-level security in recent years.

For example, as a variety of kinds of equipment with a built-in processor including cellular phones and information household appliances are connected to networks, there is a high likelihood that this equipment is also exposed to external threats similar to those of personal computers. When precisely analyzing problems such as illegal access, the main cause is the fact that the malicious execution codes operate within the terminals. It is important to prevent the malicious codes or undesirable codes from operating on a processor, but the measures taken traditionally at the processor side to prevent the operation of the malicious codes are not adequate at all. As a result, the problem remains that a secure software execution environment has not been provided.

Next, traditionally a processing is executed as follows: when storing data and execution codes for instructions in the main memory device or in the secondary memory device, encryption is performed for assuring security, and the encrypted data are then decrypted prior to the actual execution of instructions and are stored in the cache memory within the processor, and the processing is executed. In this case, the hardware for executing the encryption processing is loaded externally on another chip which is different from the processor chip. Therefore, there was the problem that encryption processing performance such as processing speed tends to become inferior.

Also, in such encryption processing, the encryption key used for encryption of data is determined at the side of encryption processing on the external chip so that there are no relationships with the kinds of instructions to be executed at the processor side, supervisor/user mode or the access addresses for fetching the data or instructions. In addition, the problem remained that an appropriate encryption key can not be selected in response to the instructions to be executed since the execution unit at the processor side can not specify a key to be used for encryption and decryption.

The following literature is available as the prior art regarding the security of this software execution environment.

Patent Reference 1: Japanese Patent Application Disclosure 2002-353960, "code Execution Apparatus and Code Distributing Method"

This document discloses a code execution apparatus wherein the encrypted execution code is authenticated to confirm effectiveness of the encrypted code, and the secure processor fetches instructions corresponding to the encrypted code in order to execute them as a secure task.

However, in this code execution apparatus, there are no relationships between the process corresponding to the execution code and the key used for authentication. For example, a problem could not be solved such that if a malicious operation is performed in the operating system (OS) and then if another authentication key is allocated in the program, the malicious code must be operated.

SUMMARY OF THE INVENTION

The first objective of the present invention is to provide a secure processor which continuously authenticates execution codes of a program stored in, for example, secondary storage unit based on the memory contents as a base in the memory storing the encrypted instruction codes in a non-rewritable format, extends the range of secure reliable applications in a stepwise manner and thereby can execute only the reliable operations.

The second objective of the present invention is to make it possible to select a key to be used for encryption/decryption of the data and execution codes by the instructions being executed as well as improving the encryption processing performance by installing an encryption processing block on the same chip as that of the processor.

The third objective of the present invention is to improve the security of the information processing by the processor by making only the execution codes which have been successfully authenticated as executable by performing authentication of the execution codes using an authentication key corresponding to the process at the time when storing the process execution codes into the main memory.

The first secure processor of the present invention is a processor having a core which executes instruction codes which comprises a key storing device, an instruction code storing device, an authentication processing device, and an encryption processing device. The key storing device stores a specific key in the core. The instruction code storing device stores the encrypted instruction codes in a non-rewritable format. The authentication processing device authenticates the instruction codes including the instruction codes stored in the instruction code storing device using the specific key or an authenticated key using the specific key. The encryption processing device encrypts the input and output data between the core and the outside.

The second secure processor of the present invention comprises an instruction execution device, a load/store control device, and an encryption processing device. The instruction execution device executes instructions. The load/store control device controls loading/storing of the data to the external memory in response to commands from the instruction execution device. The encryption processing device performs encryption/decryption of the data between the load/store control device and the external memory. In addition, the instruction execution device specifies a key to be used for data encryption/decryption for the encryption processing device in response to the instructions being executed.

The third secure processor of the present invention comprises an instruction execution device, a load/store control device, and an encryption processing device. The instruction execution device executes instructions. The load/store control device controls loading/storing of the data to the external memory in response to commands from the instruction execution device. The encryption processing device performs encryption/decryption of the data between the load/store control device and the external memory. In addition, the instruction execution device gives a signal which specifies a key to be used for data encryption/decryption for the encryption processing device in response to the access addresses of the data/instruction fetch by the instructions being executed.

The fourth secure processor of the present invention comprises a secure process identifier generation device and a process information retention device. The secure process identifier generation device generates a secure process identifier at the point when the process generation command is issued which is to be compared with a secure process identifier corresponding to the page with a secure page flag showing that the page storing the execution codes is correctly authenticated prior to the execution of the process corresponding to the execution codes. The process information retention device retains the generated secure process identifier as information related to the process.

BRIEF DESCRIPTION OF THE DRAWINGS

FIG. 7 is a flowchart of the storage processing for the encryption key encrypted by using a public key;

FIG. 27 is a diagram showing a configuration example of the encryption circuit and decryption circuit having a data passing over function;

FIG. 32 is a diagram showing a configuration example (No. 1) of the key table memory in the fourth embodiment;

FIG. 34 is the other diagram showing a configuration example (No. 3) of the key table memory in the fourth embodiment;

FIG. 36 is a configuration block diagram of the processor comprising the key selection register giving an address selection instruction to the key table memory shown in FIG. 35;

FIG. 43 is an explanatory diagram of I/O signals of the execution unit in the third and the fourth embodiments;

FIG. 45 is an explanatory diagram of a system for producing the secure context identifier;

FIG. 46 is an explanatory diagram of a method for producing the secure context identifier;

FIG. 51 is an explanatory diagram of a storage system for an encrypted shared key to the authentication key register;

FIG. 56 is an operation flowchart of the authentication unit;

DESCRIPTION OF THE PREFERRED EMBODIMENTS

The embodiments of the present invention are described below in detail by referring to the attached drawings.

Figure 1:
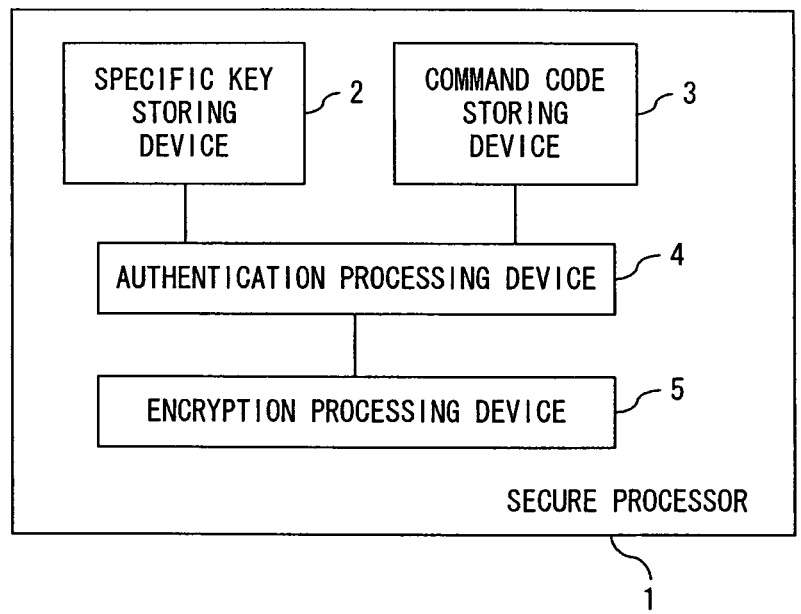
FIG. 1 is a block diagram showing the principle configuration of the secure processor according to the present invention.

FIG. 1 is a block diagram showing the principle configuration of the present invention's secure processor. In this figure, the secure processor 1 of the present invention comprises a specific key storing device 2, an instruction code storing device 3, an authentication processing device 4 and an encryption processing device 5.

The specific key storing device 2 stores a specific key, for example, a CPU specific key in the core which executes instruction codes in the secure processor. The instruction code storing device 3, for example, the encrypted ROM code area, stores the encrypted instruction codes in a non-rewritable format. The authentication processing device 4 performs authentication of the instruction codes containing the instruction codes stored in the instruction code storing device 3 using the specific key and the encryption processing device 5 encrypts the I/O data between the core and the external memory.

In the mode carried out in the present invention, the encryption processing device 5 encrypts the authenticated instruction codes and can store them in the memory device, for example, a main memory, which is connected to the secure processor 1 on the page unit, and the authentication processing device 4 can add authenticated information to the instruction codes which are to be authenticated.

Next, the secure processor 1 shown in FIG. 1 can comprise cores for executing instruction codes: a secure core for executing only the instruction codes authenticated by the authentication processing device 4 and a normal core for executing the regular instruction codes which are not authenticated.

In this case, the secure core is booted (activated) using the encrypted instruction codes stored in the instruction code storing device and the secure core can have a normal core booting device which boots the normal core after the completion of booting of the secure core. In addition, the secure core can comprise a normal core monitoring device which monitors the operation of the normal core after booting the normal core, and when an abnormal state is detected, aborts the operation of the normal core or carries out branching to the specific processing.

Next, a program for the secure processor of the present invention makes a computer execute the following procedures: a procedure of performing an activation processing using a program in a memory wherein encrypted instruction codes are stored in a non-rewritable format; an authentication processing block for performing an authentication processing of the instruction codes including the instruction codes stored in the memory; a key management processing for managing the processor specific key; a procedure of setting up the operation processing for the key table where the key used for encryption/decryption processing of the instruction codes authenticated by the authentication processing block; a procedure for performing the program authentication processing on a secondary memory using the authentication processing block; and a procedure for carrying out the operation as a key processing monitor executing the key processing which is needed when executing the authenticated program including the activated operating system.

The secure processor of the present invention comprises a instruction execution device which executes commands, such as an execution unit, a load/store control device which controls loading and storing the data for the external memory in response to the commands from the instruction execution device, such as a load/store unit, and an encryption processing device which performs encryption/decryption of the data between the load/store control device and the external memory, such as an encryption circuit and a decryption circuit. The instruction execution device specifies the key to be used for data encryption/decryption for the encryption processing device in response to the commands being executed.

In an embodiment of the present invention, the secure processor can further contain a key storing device which stores multiple keys, such as a key table memory, and the instruction execution device outputs the key number specified by the said key to the key storing device and the key storing device can give a key to be used for data encryption/decryption for the encryption processing device in response to the key number.

Furthermore, this secure processor can further contain a key storing device which stores the key to be used for decryption of the command fetched data loaded externally and when the instruction execution device is in the command fetching state, the key storing device can provide a key to be used for decryption of the fetched commands with the encryption processing device.

Furthermore, the secure processor of the present invention can comprise an instruction execution device which executes commands, a load/store control device which controls loading and storing the data for the external memory in response to the commands from the instruction execution device, and an encryption processing device which performs encryption/decryption of the data between the load/store control device and the external memory. The instruction execution device gives a signal which specifies the key to be used for data encryption/decryption to the encryption processing device in response to the data/command fetch access addresses based on the commands being executed.

In an embodiment of the present invention, the secure processor can further contain a key storing device which stores multiple keys, and the instruction execution device outputs a logical address as the said access address and the key storing device can give a key to be used for data encryption/decryption to the encryption processing device in response to the logical address.

Alternatively, this secure processor can further contain a key storing device which stores the multiple keys, the load/store control device outputs the physical address as an access address in response to the command given from the instruction execution device, and the key storing device can give a key to be used in encryption/decryption to the encryption processing device in response to the physical address.

The secure processor of the present invention also comprises a secure process (context) identifier generation device at the point when the process producing command is issued, which generates a secure process identifier to compare with the secure process identifier corresponding to the page on which a secure page flag is set up to indicate that the execution codes are properly authenticated prior to the execution of the process corresponding to the execution codes, and a process information retention device, for example, a context information storage unit, which retains the secure process identifier generated as information related to that process.

In an embodiment of the present invention, along with the addition of authentication information to the execution codes corresponding to the said process, the process information retention device can retain an authentication key for the execution code authentication performed during the survival period of the generated process.

Furthermore, this secure processor can further comprise an authentication device which performs authentication of the execution codes using the authentication key for every page after the execution codes corresponding to the said process are stored in a spare page of the memory, and the secure process identifier is stored in the buffer within the processor in correspondence to the address of that page, and sets a secure page flag in that buffer when the authentication is successful.

Alternatively, this secure processor can further comprise a memory access control device which compares the secure process identifier which is stored in the said buffer prior to the actual execution of the execution codes, and to which a corresponding secure page flag has been set with the secure process identifier which is retained in the process information retention device, and is corresponding to the instruction codes to be executed, and which allows the command execution unit which executes commands to access a page on the memory where the execution codes are stored when both identifiers agree with each other.

Additionally, this secure processor can also comprise a secure core which executes only the authenticated execution codes and a normal core which executes the regular execution codes which have not been authenticated, and each f cores has respective command execution units and a cache.

Moreover, this secure processor can also comprise a direct memory access device which performs an arithmetic calculation which is necessary for authentication of the execution codes while storing the execution codes in the memory, and which retains the results of the calculation to give them to the authentication device.

Next, a program for the secure processor of the present invention is a program used by a computer which pages-in the page containing the execution codes into the memory, which makes the computer execute the following procedures: a procedure for requesting the transfer into the memory of the said page to the direct memory access mechanism in the computer; procedure for setting, in the page table entry in the translation look-aside buffer, data about a page on which a secure page flag is set in order to indicate that the page storing the execution codes are properly authenticated prior to the execution of the process, which include a secure process identifier to be compared with a secure process identifier corresponding to the page, and is generated at the point when the process producing command is issued after completing the transfer successfully; and a procedure for requesting the hardware to authenticate the page and to set the secure page flag indicating the successful authentication in the page table entry.

Moreover, the program for the secure processor of the present invention is a program used by the computer performing authentication of the page containing the execution codes, which makes the computer execute the following procedures: a procedure for performing hash arithmetic for the page read in the memory; a procedure for decrypting the authentication information added to that page; a procedure for comparing the hash operation results and the decryption results; and a procedure for setting a secure page flag which indicates the authentication of the page was successful in the page table entry in the translation look-aside buffer of the computer when the comparison results are detected to be identical.

According to the present invention, the instruction codes encrypted in the non-rewritable format retained in the processor are used as basic integrity points, and the authentication of the program including the operating system is performed so that the security level of the system can be substantially improved by expanding the range of the reliable program.

Further, according to the present invention, while the encryption processing block is installed within the same chip as the processor to improve the performance of the encryption processing, the data and execution codes corresponding to the commands being executed can be encrypted. Therefore, the levels of encryption can be altered in response to the commands being executed so that the security level as a system can be improved.

Moreover, according to the present invention, the instruction codes can be authenticated prior to the execution of the instruction codes and the process can be executed. And after detecting the agreement between the process identifier corresponding to the process which a secure page flag has been set and the process identifier of the process being executed, the process is executed. Therefore, the operation of the maliciously altered execution codes on the processor can be prevented, and as a result, a secure software execution environment can be provided.

The overall configuration of the secure processor of the present invention, and the outline of its processing are explained below as a first embodiment.

Figure 2:
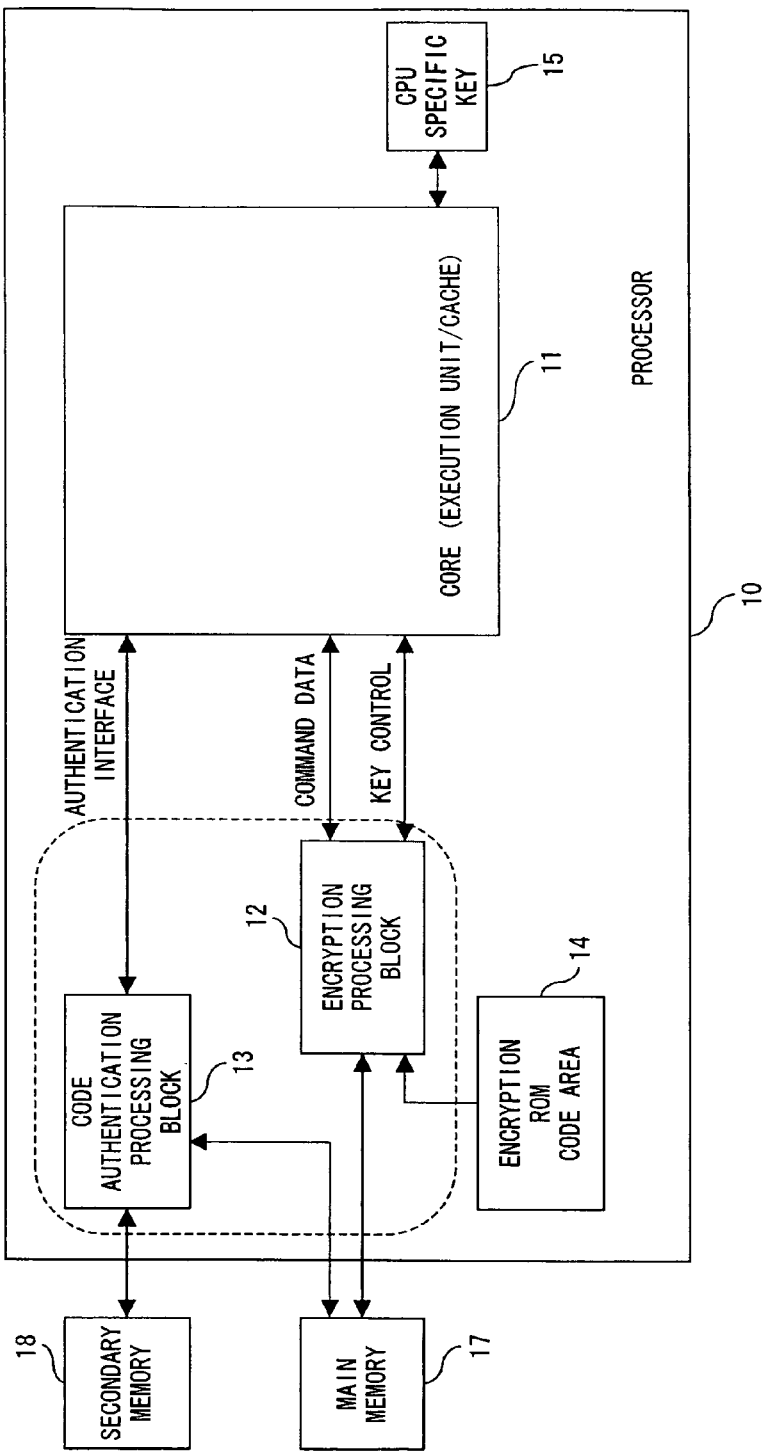
FIG. 2 is a block diagram showing the basic configuration of the processor in the first embodiment.

FIG. 2 is a block diagram showing the basic configuration of the secure processor as the first embodiment. In this figure, the processor 10 comprises a core 11 containing an execution unit and a cache, an encryption processing block 12 which performs a command processing with the external interface and encryption/decryption of the bus data (program codes or data), a code authentication processing block 13 which performs authentication of the instruction codes, an encrypted ROM code area 14 in which the most basic program used when activating the processor is encrypted and stored, and a CPU specific key 15 to perform decryption of the program stored in this code area 14. The operation of the encryption processing block 12 will be explained in detail later in the third embodiment and the operation of the code authentication processing block 13 will also be explained in detail later in the fifth embodiment.

While commands and data are transmitted between the core 11 and the encryption processing block 12, the key for encryption is controlled. An authentication interface is installed between the core 11 and the code authentication processing block 13. Moreover, the encryption processing block 12 and the code authentication processing block 13 execute accessing to the main memory 17, and the code authentication processing block 13 executes accessing to the secondary memory 18.

Figure 3:
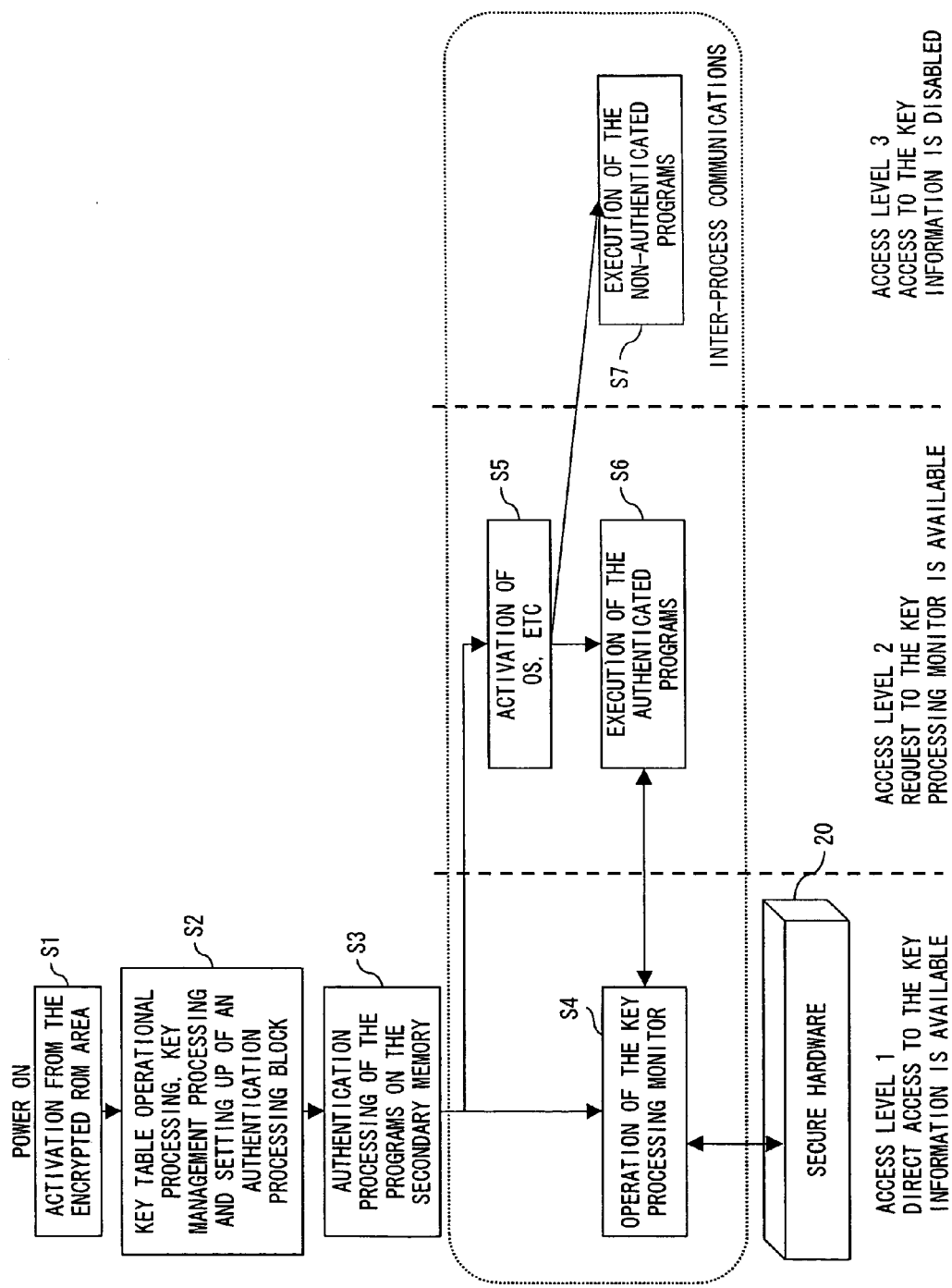
FIG. 3 is a basic processing flowchart of the processor in the first embodiment.

FIG. 3 is an overall processing flowchart of a secure processor in the first embodiment.

When a power source is turned on in FIG. 1, at Step S1, the core 11 shown in FIG. 2 decrypts the program stored in the encrypted ROM code area 14 using a CPU specific key 15 and executes a booting (activation) processing. Because of the built-in ROM, falsification of the program is essentially difficult. However, even though falsification is carried out by a certain method, the program has already been encrypted and to carry out a meaningful falsification is difficult. Therefore, if the program is booted properly, it can be determined that no falsification has been made in the program. As a result, the program stored in the encrypted ROM code area 14 can be assumed to be an absolutely reliable program. Then, this state can be defined as a basic reliable point of the program.

Regarding the encrypted ROM code area 14, if an AES (Advanced Encryption Standard) method having a higher confidentiality than a DES (Data Encryption Standard) method performing encryption at 64 bit units [is used], this can be installed externally instead of inside the processor. In this case, in order to avoid estimation of the encryption key in response to the frequent patterns such as NOP of the instruction codes and All 0/All 1 of the data pattern, it is possible to use another mode other than ECB (electric code book) where the same encrypted sentence is always output for the same plain sentence.

Subsequently, at Step 2, an operation processing for the key table (memory) as will be mentioned later which is installed in the encryption processing block 12, a key management processing to perform generation of a public key and a secret key using the CPU specific key 15, and setting up of a code authentication processing block 13 are executed and the contents of the processing are defined as the same integrity points.

Subsequently, at Step S3, an authentication processing is performed for the program stored in the secondary memory 18. In the first embodiment, the general programs including the operating system (OS) are stored on the secondary memory 18 via hard disk and a network, and the authentication processing is executed for these programs. The authentication processing will be explained later.

A group of programs for executing the said key table operation processing forms a library which is called a key processing monitor. Accessing the secure hardware 20 including the encryption processing block 12, the code authentication processing block 13, and CPU specific key 15 is limited to the segments operated by the key processing monitor at Step S4. The state when the key processing monitor is operated and accessing secure hardware 20 is enabled is called access level 1. Access level 1 is implemented by the hardware which monitors whether a program counter indicates the addresses of the key processing monitor of the step S4 in the fixed area.

The operations using the general programs including the said OS are classified under access level 2 or access level 3 when compared to the access level 1. In the first embodiment, the OS is classified under access level 2, and when the OS is activated at Step S5, authenticated programs are executed at Step S6. The authenticated programs in the access level 2 can request key processing monitor, which is Step 4 in the access level 1, namely for the key processing, and execute indirectly via the key processing monitor such as encryption of the own space or data encryption and decryption. Even the programs from outside of the CPU are allocated as access level 2, if they are authenticated, can execute key processing. However, direct access to all the keys besides the public keys or secure hardware 20 is disabled so that even if there are some problems with the programs of level 2, key information other than the public keys is not exposed to the outside.

The non-authenticated programs at the access level 3 are executed at Step S7 after activation of the OS at Step S5. The programs at the access level 3 can not access all the keys other than public keys and can not request the key processing monitor key processing. The processing from the Step S4 through Step S7 is executed using the inter-process communications among the programs at each access level.

As was mentioned above, in the first embodiment, when the booting process carried out using the program stored in the encrypted ROM code area 14 is successful at the time of activation of the processor, the basic point of integrity of the program is established and as the reliable program range is expanded by performing authentication of various kinds of programs including the OS using the basic point of integrity, the purpose of improving the security level of the systems step-by-step by the processor itself can be achieved. After initiating the operation, encryption of codes and data can be performed at each unit of authentication so that sufficient integrity can be retained with regard to retention of confidentiality among programs. In the first embodiment, the method explained implemented a processing at the access level 1 as a software executed by the core of the processor, but a portion of the processing at the level 1 or the entire processing can also be implemented as a micro code or a wired logic.

Figure 4:
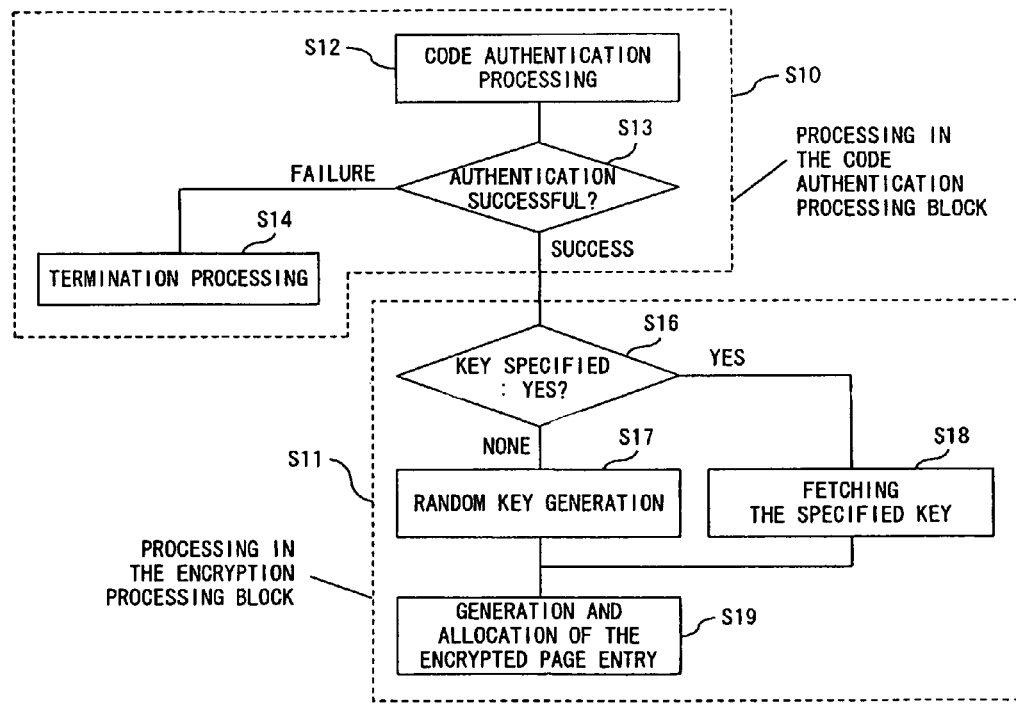
FIG. 4 is a flowchart showing the processing comprising a code authentication processing block and an encryption processing block.

FIG. 4 is a flowchart showing the outlines of the processing by the code authentication processing block 13 and the encryption processing block 12 in FIG. 2. In this figure, following the initial processing in the code authentication processing block at Step S10, the processing in the encryption processing block is carried out at Step S11.

In FIG. 4, a code authentication processing is executed initially at Step S12 for the programs stored, for example, in the main memory 17 or in the secondary memory 18. The details of this processing will be described later. Subsequently, whether or not authentication succeeds or fails is determined at Step S13. If authentication fails, a termination processing is executed for the code execution at Step S14.

If authentication succeeds, a processing in the encryption processing block starts and whether or not a key for encryption at Step S16 is specified at each page unit is determined. If it is not specified, a random key is generated using a random number generator and so on at Step S17, but if it is specified, the specified key is fetched at Step S18. The case when the key is not specified includes the case when that page is newly produced and so on, but the case when the key is specified includes the case of repeated paging-in after the page produced is once paged-out or the case when encrypted page from the outside is stored. After the key is defined at Step S19, an encrypted page entry, namely the page table entry (PTE) in the translation look aside buffer (TLB) as will be mentioned later is generated and an encrypted page is allocated to perform encryption of codes or data.

Figure 5:
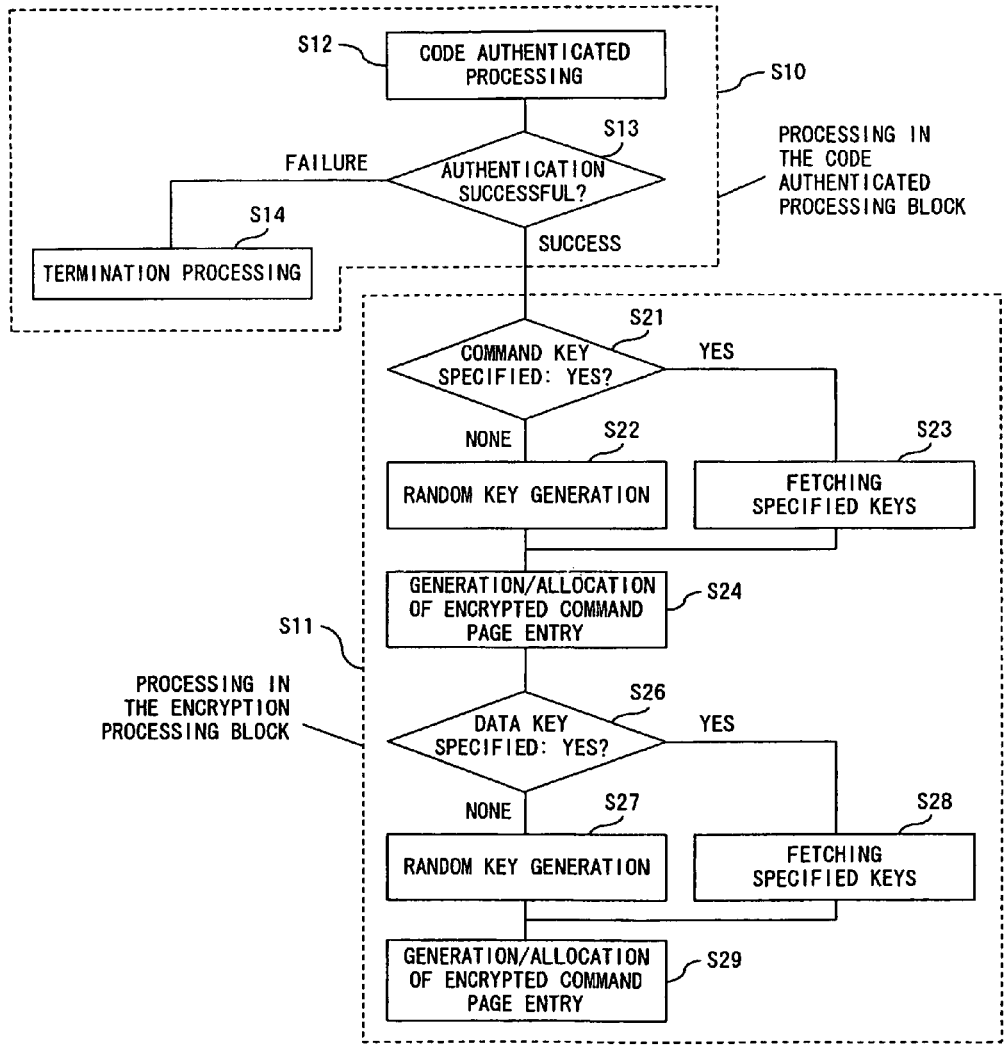
FIG. 5 is a processing flowchart of the encryption processing block when different keys are specified by the instruction area and the data area.

FIG. 5 is an overall flowchart of the code authentication and its encryption processing when a different encryption key is allocated in the same process command area and data area to perform encryption of the codes. In this figure, Step S10, namely the processing by the code authentication processing block, is the same as in the case of FIG. 4.

If the code authentication succeeds in FIG. 5, whether or not a command key is specified as a key for the command area is determined at Step S21. If it is not specified, a random key is generated at Step S22, but if it is specified, the specified key is fetched at Step S23, and the random key or the specified key is used at Step S24 to generate an encrypted command page table entry, namely PTE, and the encrypted page is allocated in the command area to perform encryption of the command area.

Subsequently, whether or not a data key is specified as an encryption key in the data area is determined at Step S26. If it is not specified, a random key is generated at Step S27, but if it is specified, a specified key is fetched at Step S28 to generate a page table entry for the data at Step S29, and an encrypted page is allocated and encryption is executed for the data area.

Figure 6:
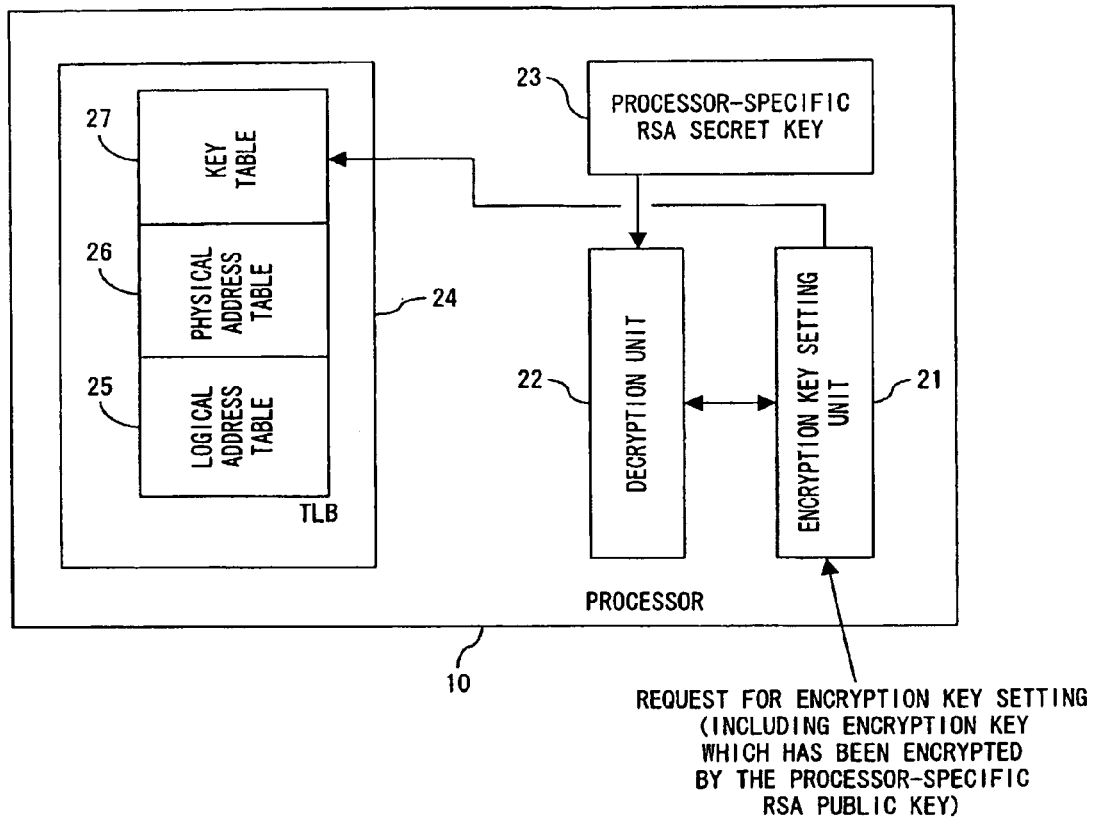
FIG. 6 is an explanatory diagram of a storage system of the encryption key encrypted by using a public key.

Subsequently, the operations for acquiring an encryption key in the first embodiment are explained with reference to FIG. 6 through FIG. 9. FIG. 6 and FIG. 7 are a configuration example of the inside of the processor in the encryption key acquisition operation example (No. 1), and a flowchart of its processing, respectively. In this example, it is assumed that a processor-specific RSA secret key is retained inside of the processor in advance in a secure system, a corresponding RSA public key is output to the outside of the processor by a certain method, and an encryption key given from the outside has been encrypted by this public key. That is, for instance, an encryption key for encryption and decryption at a page unit is a common key and re-encryption by a public key is essential for retaining confidentiality.

FIG. 6 shows a configuration of the processor 10 for executing an encryption key setting processing into the processor. The inside of the processor comprises the following essential blocks: an encryption key setting unit 21; a decryption unit 22; a processor-specific RSA secret key 23; and a translation look aside buffer (TLB) 24. The interior of the TLB comprises a logic address table 25, a physical address table 26 and a key table 27 which correspond to the said page table entry (PTE). A request for setting an encryption key including an encryption key encrypted by the processor-specific RSA public key is given externally to the encryption key setting unit 21.

FIG. 7 is a flowchart of the encryption key acquisition processing. When the processing starts in this figure, initially an encryption key setting request is received by the encryption key setting unit 21 at Step S31, the encrypted encryption key received by the decryption unit 22 is decrypted using the processor-specific RSA secret key 23 at Step S32. The encryption key decrypted by the encryption key setting unit 21 at Step S33 is stored in the key table 27 inside of the TLP 24 at Step S32 and the processing is terminated.

Figure 8:
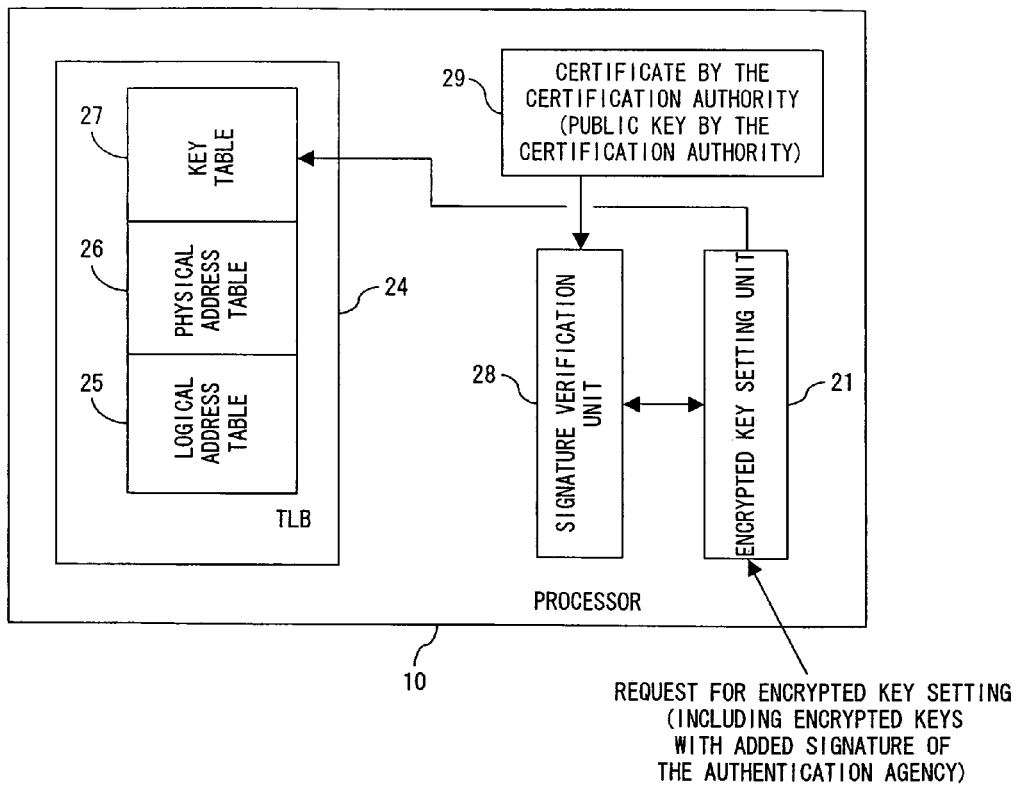
FIG. 8 is an explanatory diagram of a storage system for the encryption key with the added signature of the certification authority.

FIG. 8 is a configuration example of the processor in the encryption key acquisition operation example (No. 2). In this figure, the following is the difference in the processor 10 when compared to the example No. 1 of FIG. 6: a signature verification unit 28 is provided in place of the decryption unit 22; and a certificate of a certification authority 29 is stored as a public key of the certification authority in place of the processor-specific RSA secret key 23. It is assumed that this certificate of a certification authority 29 is recorded inside of the processor so as to avoid the illegal replacement of this certificate and an encryption key setting request including the encryption key with the signature of the certification authority is given to the encryption key setting unit 21.

Figure 9:
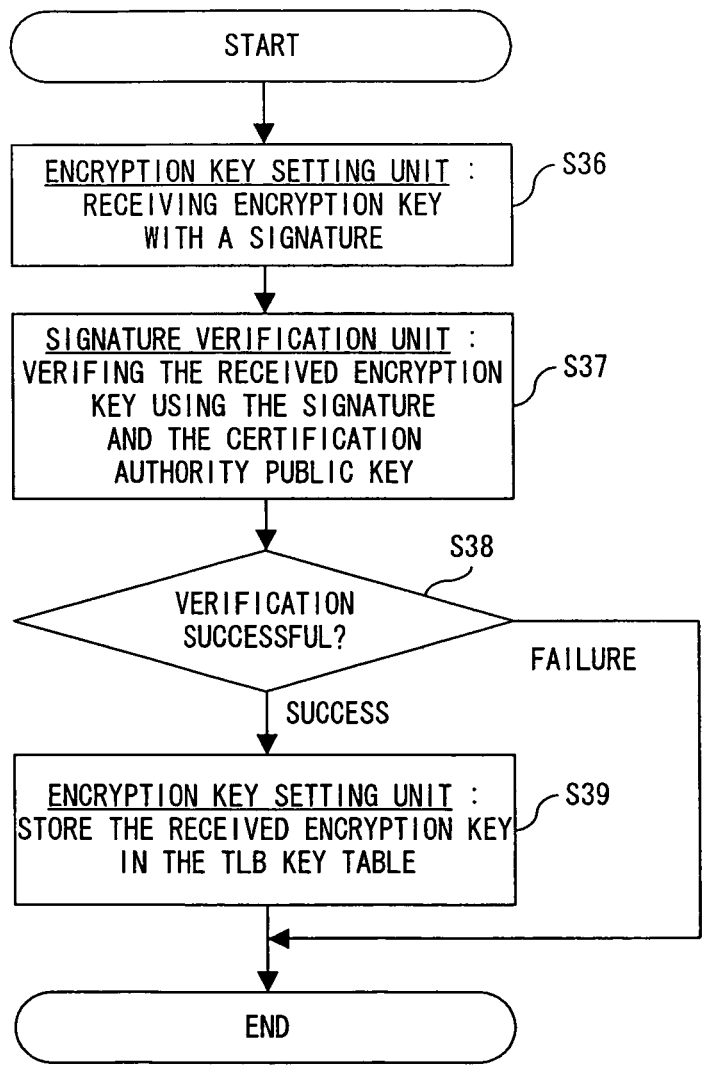
FIG. 9 is a flowchart of the storage processing of the encryption key with the added signature of the certification authority.

FIG. 9 is a flowchart of the processing in the encryption key acquisition operation example (No. 2). When the processing starts in this figure, initially an encryption key along with the signature is received by the encryption key setting unit 21 at Step S36, the received encryption key is verified by the signature verification unit 28 using the signature and the public key of the certification authority at Step S37, whether or not the verification succeeds is determined at Step S38. If the verification succeeds, the encryption key received by the encryption key setting unit 21 is stored in the key table 27 inside of the TLB 24, and then the processing is terminated. Or, if the verification fails, the processing ends immediately. In order to improve reliability of the encryption key, it is possible to perform both the operation example No. 1, that is, retention of confidentiality of the encryption key and the operation example No. 2, that is, identification of the encryption key in combination.

Figure 10:
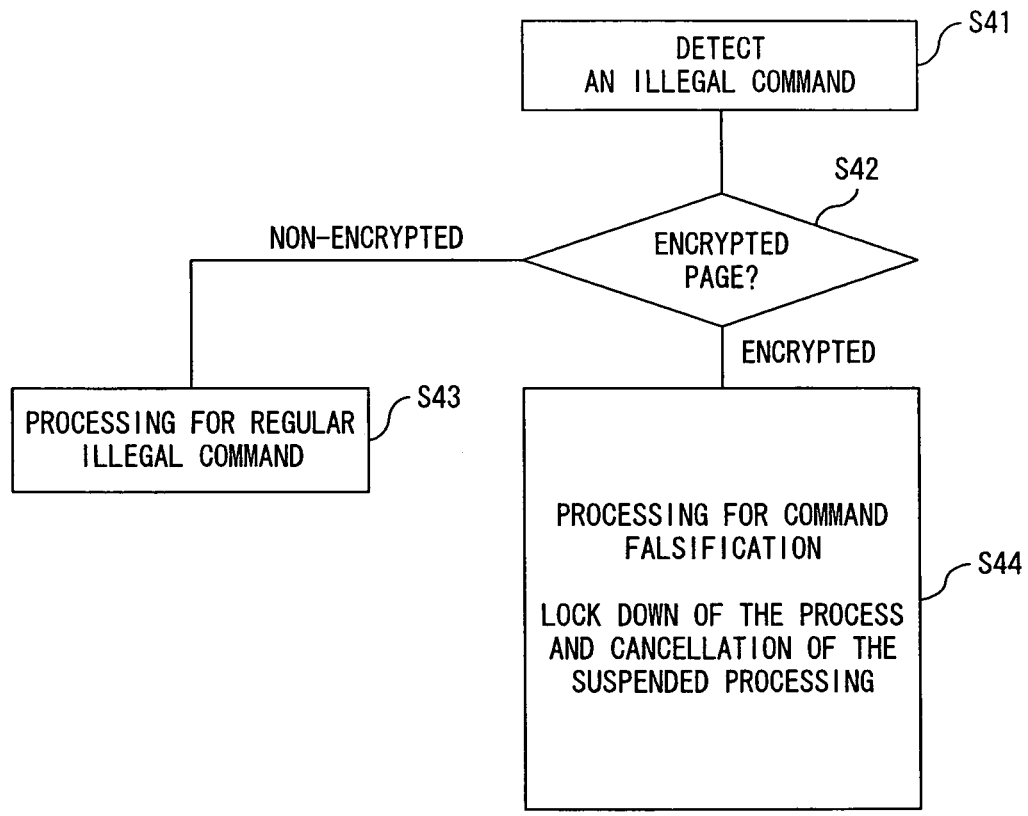
FIG. 10 is a processing flowchart when detecting an invalid instruction is detected.

FIG. 10 is a flowchart of the illegal command treatment processing when an illegal command is detected while executing commands in the encrypted command area in the first embodiment. If an illegal command is detected at Step S41 in this figure, whether or not the illegal command is a command within the encrypted page is determined at Step 42, if it is a command within the non-encrypted page, a regular illegal command treatment processing is carried out at Step S43. If it is determined to be a command within the encrypted page, it is determined that command falsification is made at Step S44, and a process lock down as a command falsification treatment processing for falsification or cancellation of the suspended processing are executed to stop the execution of the instruction codes.

Figure 11:
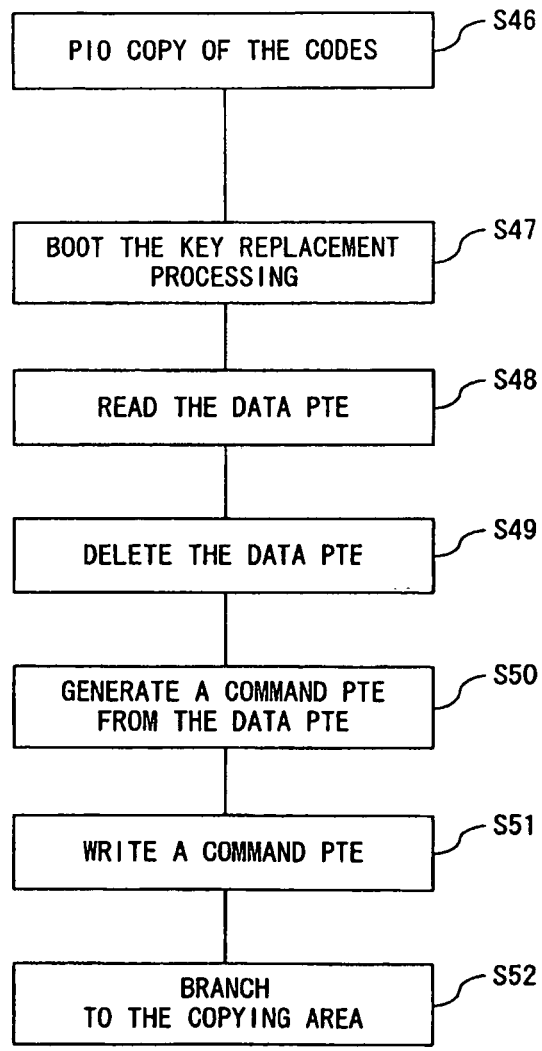
FIG. 11 is flowchart of a key replacement processing for the instructions stored in the data area.

FIG. 11 is a key replacement processing flowchart to prevent that a command is detected as an illegal command prior to the execution of the instruction codes stored in the data area in the case when different encryption keys are allocated in the command area and in the data area for the same process as explained in FIG. 5. Such storage of the instruction code in the data area is occurred when a programmed IO (PIO), that is, copying of the command by the program, is performed.

In FIG. 11, initially, when the instruction code is copied in the data area by PIO at Step S46, a key replacement processing is booted at Step S47. In this processing, the data PTE corresponding to the data page where the command was stored is read at Step S48, after the PTE is deleted, the encryption key stored in that entry is fetched at Step S49. Further, using the contents of the data PTE, namely the encryption key, a command PTE which the key is stored in the key table 27 in FIG. 6 is generated. And, the command PTE is written in the TLB at Step S51, then, branching into the copying area where the command is copied is performed at Step S52, and finally the command stored in the copying area is executed.

In the first embodiment, only one core 11 including an execution unit and a cache is installed in the processor 10 as explained in FIG. 2, and the core 11 plays, as secure core, the central role of the operation as the secure processor. In contrast, in the systems called multiprocessor systems or multi-core systems, the processing can be divided, for instance, multiple cores can be classified to a secure core executing the secure operation and a normal core executing the normal operation. Such a processor system will be explained below with reference to the second embodiment.

Figure 12:
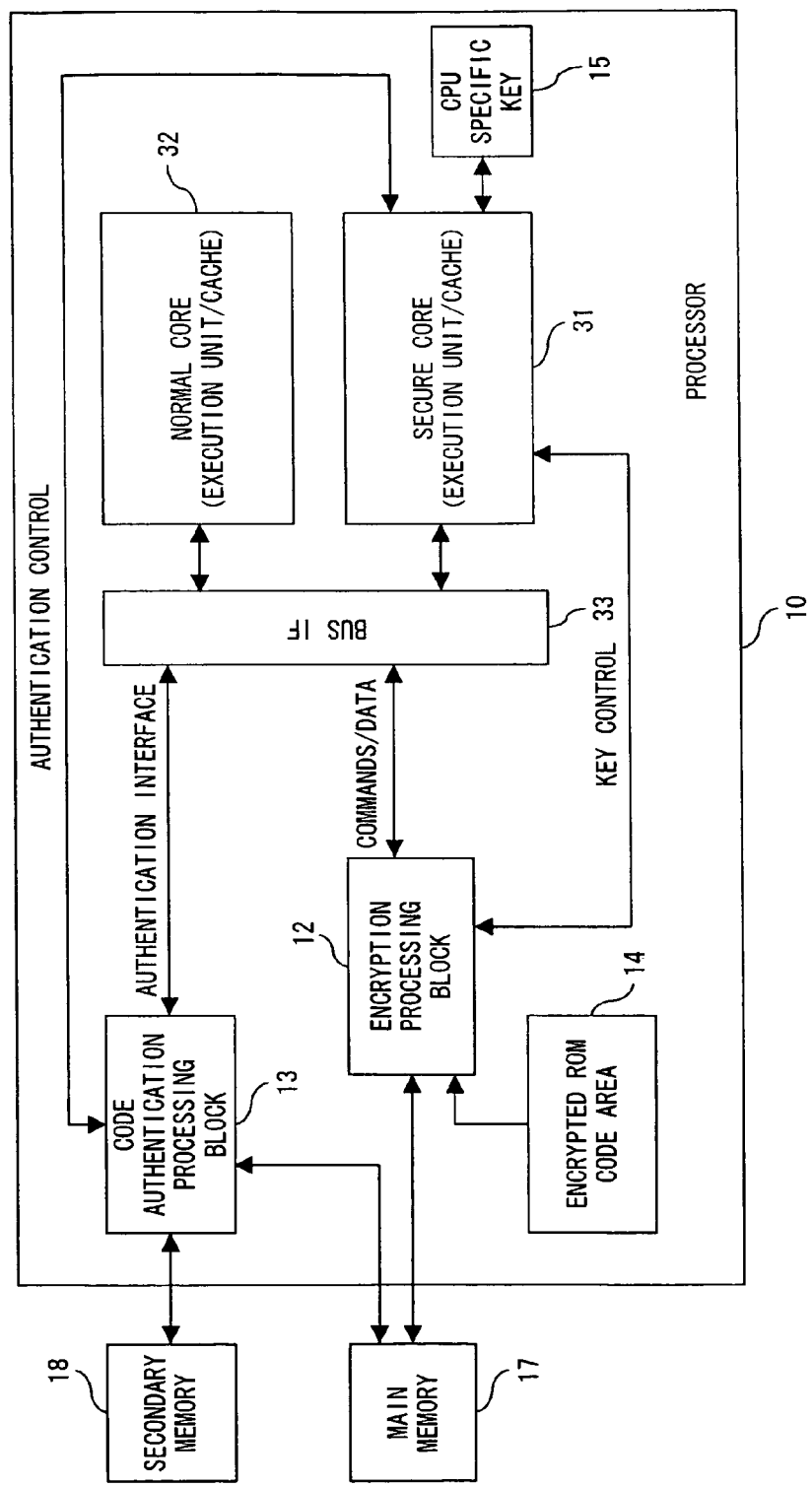
FIG. 12 is a block diagram showing the basic configuration of the processor in the second embodiment.

FIG. 12 is a basic configuration block diagram of a processor in the second embodiment. When compared to FIG. 2 showing the first embodiment, the following points are different: a secure core 31 and a normal core 32 are installed in place of the core 11 in this figure; a bus interface 33 is installed between these two cores 31 and 32 and the encryption processing block 12 or the code authentication processing block 13; a key control is performed between the secure core 31 and the encryption processing block 12; an authentication control is performed between the secure core 31 and the code authentication processing block 13; and additionally a CPU specific key 15 is connected only to the secure core 31. Basically, the second embodiment is characterized in that the encryption processing block 12, the code authentication processing block 13 and the CPU specific key 15 as the secure hardware as explained in FIG. 3 are controlled only by the secure core 31.

In the second embodiment, the access to the secure hardware 20 is only limited to the secure core 31. In the first embodiment, user software may be involved in the operation of the key processing monitor at step S4 in FIG. 2 as a secure operation and the access is limited by hardware monitoring of the program counter as mentioned previously. In the second embodiment, the involvement of software is absent and there is no problem with software bugs.

In the first embodiment, such access levels must be shared, for example, by the time sharing system using the same core. However, as a different core is used in the second embodiment, the amount of requested processing for software such as register clear at the time when switching the access levels becomes less.

Figure 13:
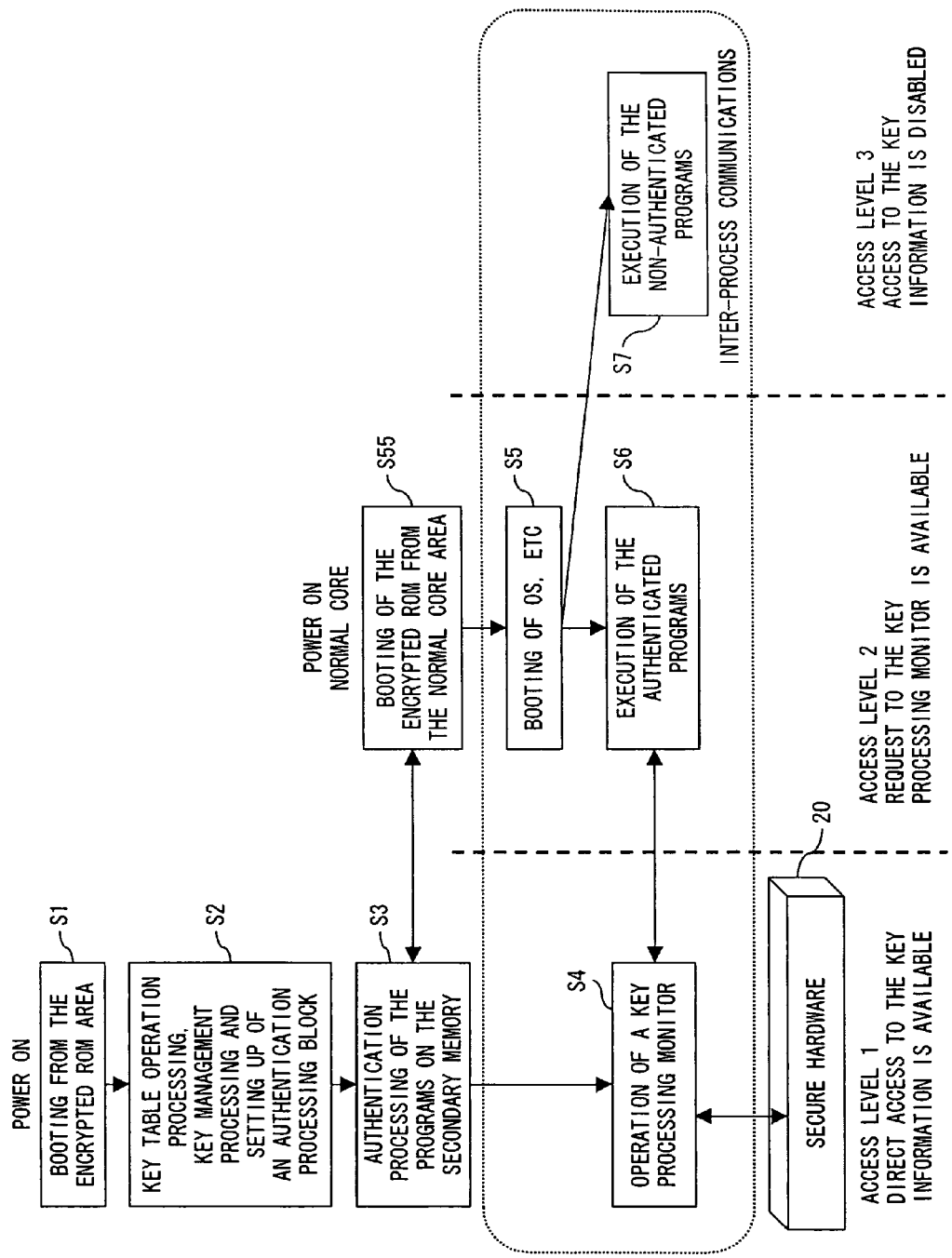
FIG. 13 is a basic processing flowchart of the processor in the second embodiment.

FIG. 13 is a basic processing flowchart of the processor used in the second embodiment. When compared to FIG. 3 showing the first embodiment, the following points are different in the processing. If the secure core 31 and the normal core 32 in FIG. 12 are assumed to have basically equal relationships, when power is turned on the respective core executes a booting process using the programs stored in the encrypted ROM code area 14. That is, the encrypted programs are decrypted using the CPU specific key 15 in the booting process by the secure core at Step S1 to execute the booting process. If the booting succeeds, this status is defined as a basic reliable point of the programs and subsequently, the secure core continues operations primarily, for example, as a key processing monitor.

In contrast, the normal core 32 primarily becomes in charge of processing equivalent to the access level 2 such as the OS. In response to the fact that the authentication processing of the program on the secondary memory is executed at the side of secure core at Step S3 in FIG. 13, the power is turned on at the normal core 32 side and a booting process is executed by the programs in the encrypted ROM code area 14 at Step S55. Assuming that it is ascertained that the programs in the encrypted ROM code area 14 are absolutely reliable by the secure core 31, a booting process at the normal core side ends basically without any problems and other booting processes such as the OS are continuously executed at Step S5.

Figure 14:
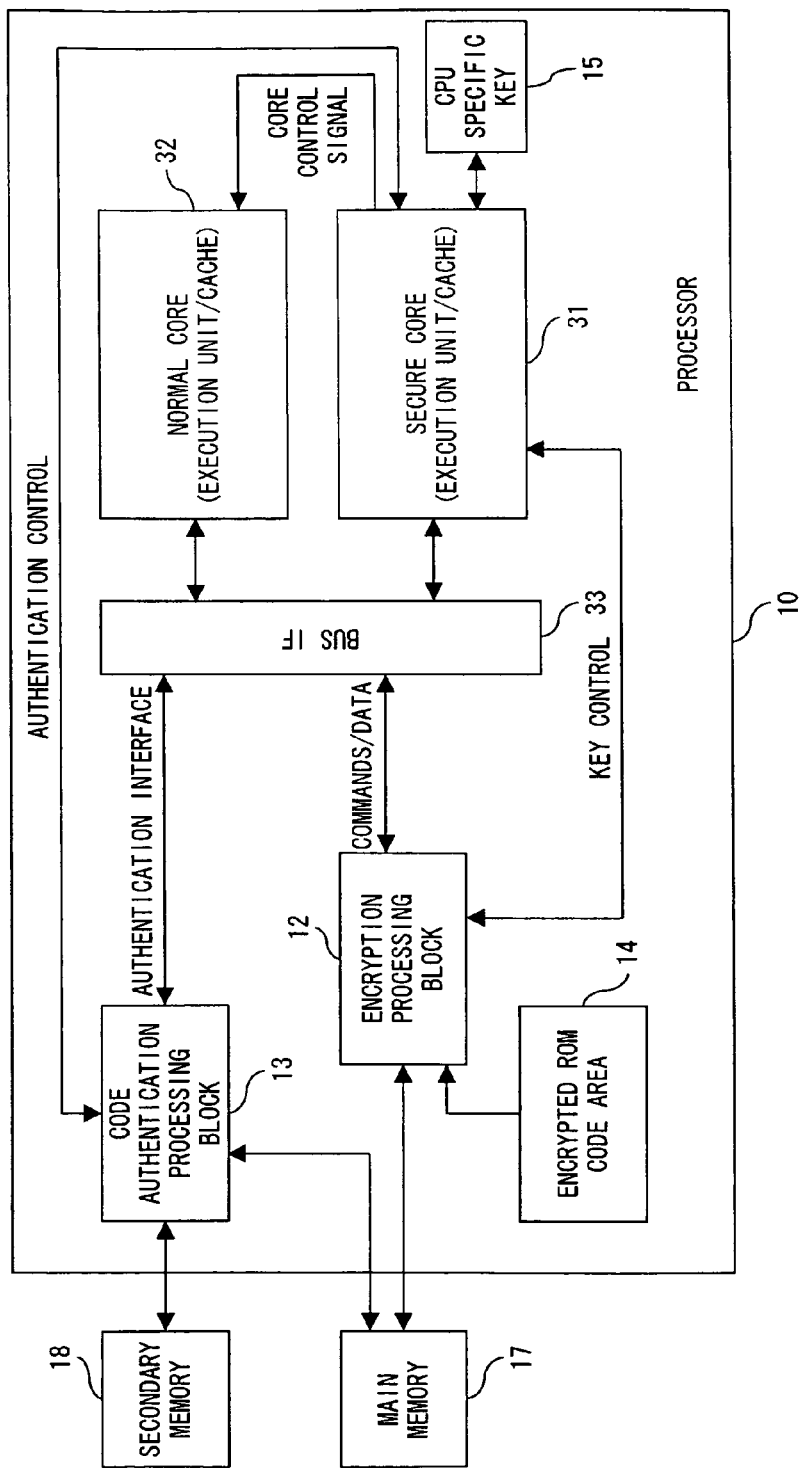
FIG. 14 is a block diagram showing both the basic configuration of the processor comprising a secure core and a normal core.

FIG. 14 is a configuration block diagram of the processor when the secure core and the normal core do not have equal relationships and when the normal core is controlled by the secure core in order to strictly apply security in the second embodiment. When compared to FIG. 12 in which the secure core 31 and the normal core 32 have basically equal relationships, the configuration components of the processor are identical, but the difference is that core control signals are given from the secure core 31 to the normal core 32. The actual examples of the core control signals include reset signals and interrupt signals.

Figure 15:
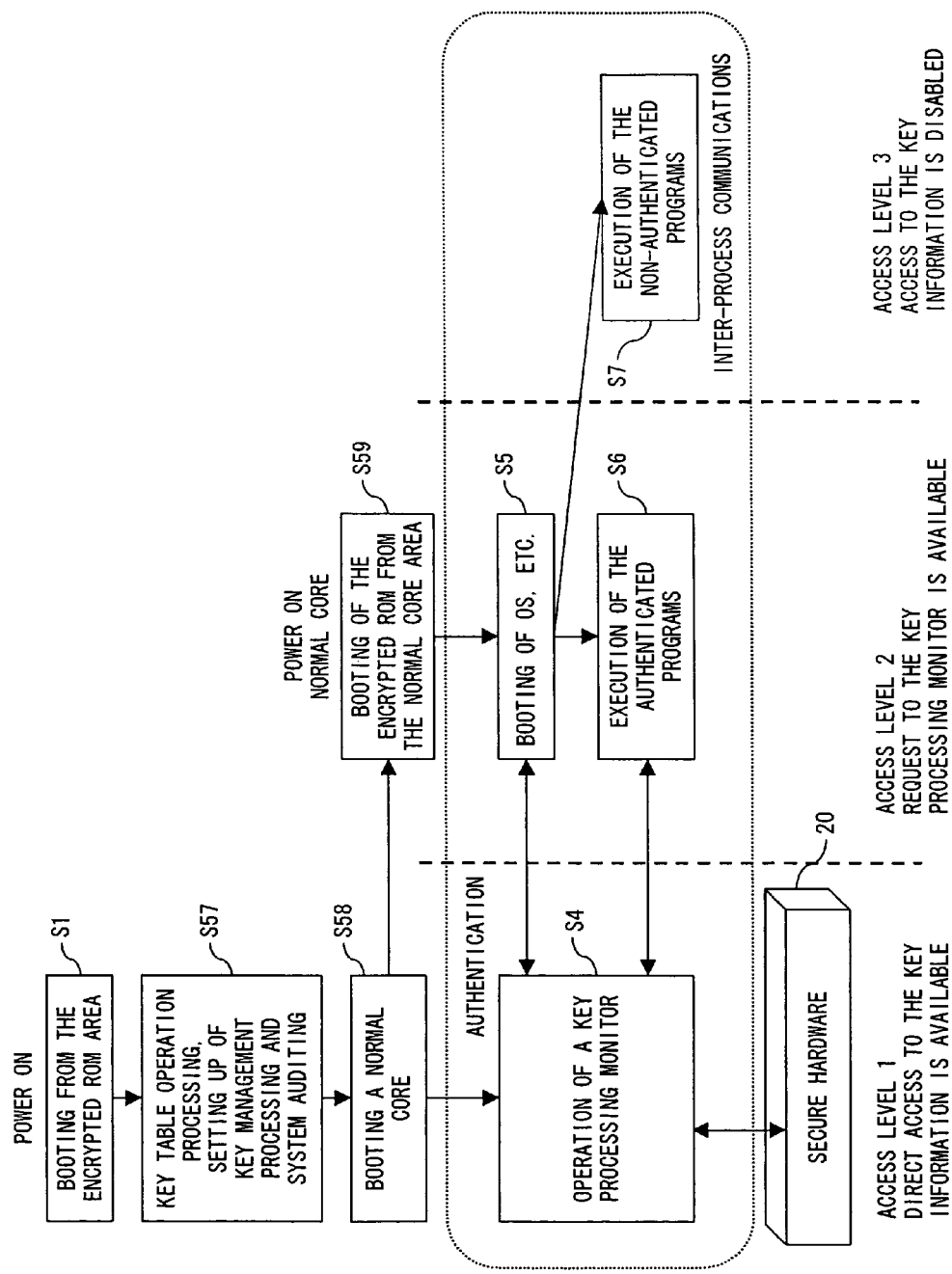
FIG. 15 is a basic flowchart of the processing in the processor shown in FIG. 14.

FIG. 15 is a flowchart of the entire processing by the processor shown in FIG. 14. At the side of the secure core 31 in this figure, a system auditing is further performed when setting up the key table operation processing, key management processing, and authentication processing block at Step S57 instead of Step S2, following the booting process at Step S1. In this system auditing, the presence of the changes in the system configuration and the presence of the changes in the programs on the secondary memory are verified in order to confirm that there are no problems with the security functions of the system and the system configuration.

Subsequently, the normal core is booted from the side of the secure core 31 at Step S58 and in response, the program stored in the encrypted ROM code area 14 is booted at Step S59 at the side of the normal core 32. The subsequent processes are the same as those in the case shown in FIG. 3.

Figure 16:
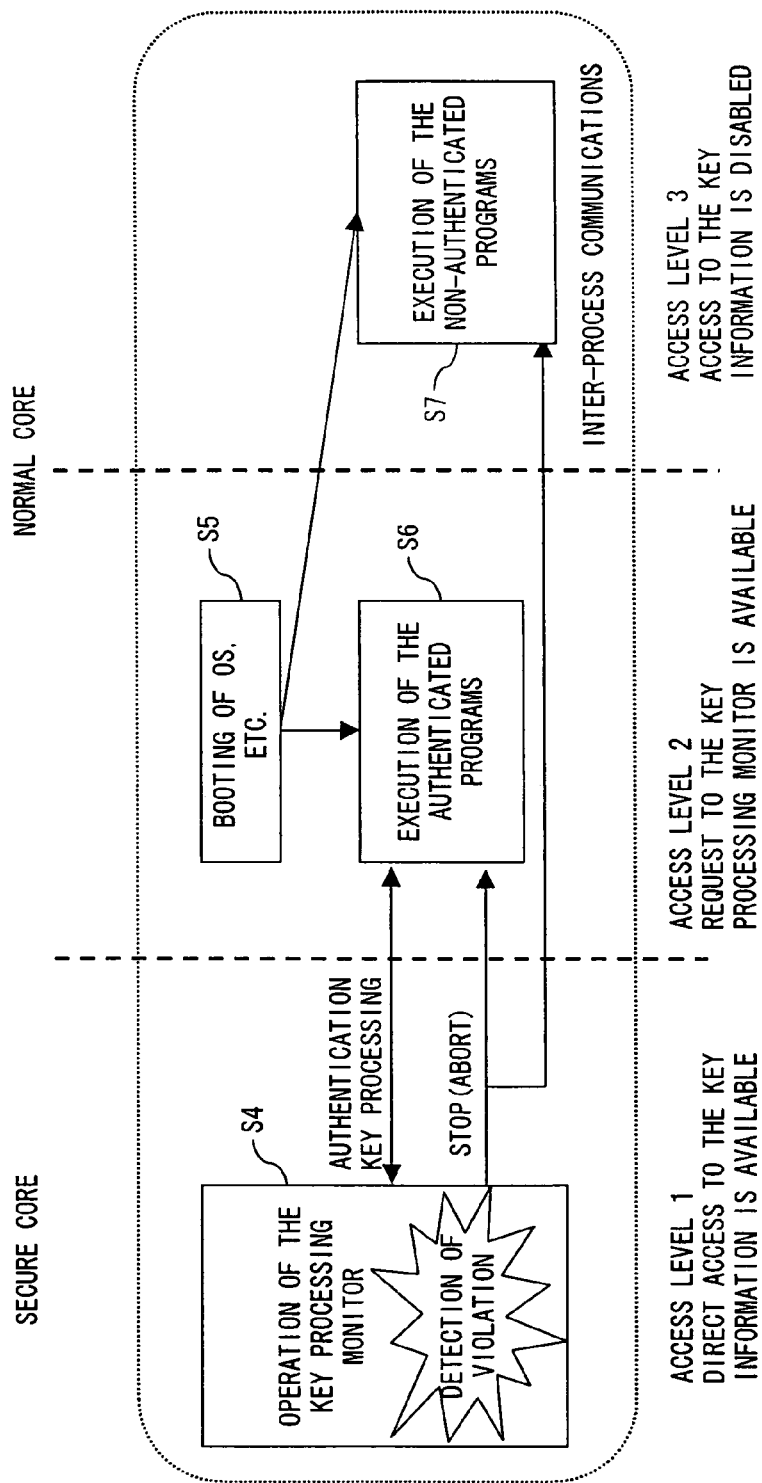
FIG. 16 is an explanatory diagram showing the abort control system for a normal core by a secure core in the processor shown in FIG. 14.

FIG. 16 is an explanatory diagram of the stop control processing of the normal core as one of the control processing of the normal core 32 by the secure core 31 in the processor shown in FIG. 14. In this figure, for example, when the authenticated program is performed at the side of the normal core at Step S6, a key processing is requested for authentication of the data is requested to the side of the secure core 31. When failure of authentication in the operation of the key processing monitor at Step S4 and violation in the security standards are detected, the processing by the normal core 32 such as execution of the authenticated programs at Step S6 and execution of the non-authenticated programs at Step S7 are aborted by an instruction from the side of the secure core 31.

Figure 17:
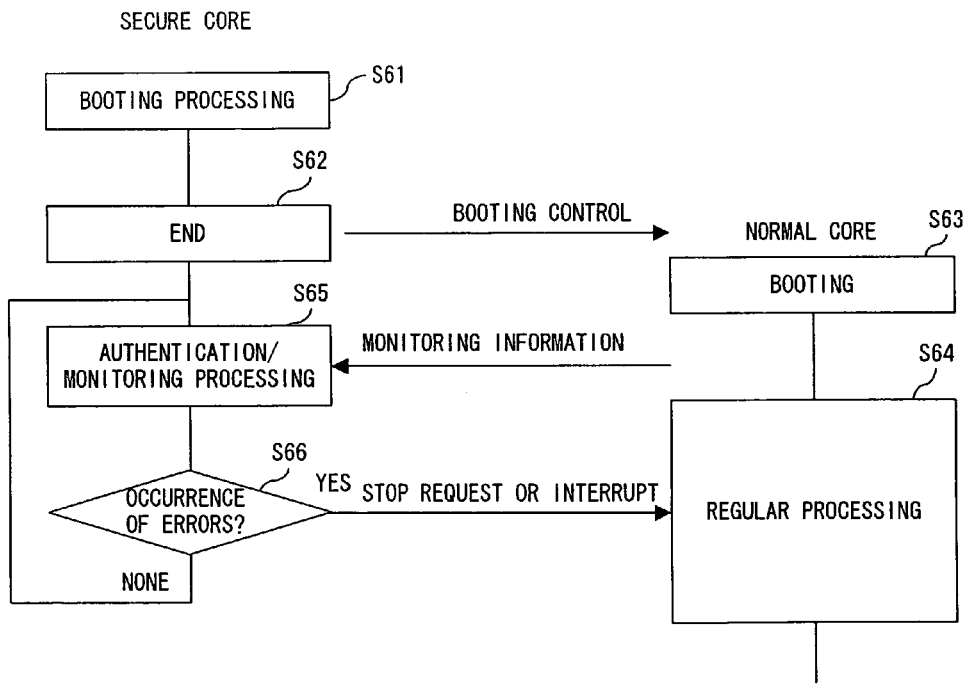
FIG. 17 is a flowchart showing the abort control processing for normal core by a secure core in the processor shown in FIG. 14.

FIG. 17 is a flowchart of the control processing of the normal core 32 by the secure core 31 as shown in FIG. 14. A booting is executed at the side of the secure core 31 at Step S61. When the process is completed at Step S62, a booting control of the normal core 32 is performed at the side of the normal core 32. Then, the normal core is booted at Step S63, and regular processing which does not require keys and authentication processing are executed at the side of the normal core at Step S64. At the tide of the secure core 31, an authentication/monitoring processing using the monitoring information sent from the side of the normal core 32 is always performed at Step S65. Whether or not errors are generated is determined at Step S66. If there are no errors, the subsequent processes after Step S65 are continued, but if there are errors, the processing at the side of the normal core 32 is aborted by requesting abort or an interrupt to the side of normal core 32. To control the normal core by the secure core, for example, reset signals as mentioned above can be used, but as another method, NMI (non-mask interrupt) for the CPU can be used.

Figure 18:
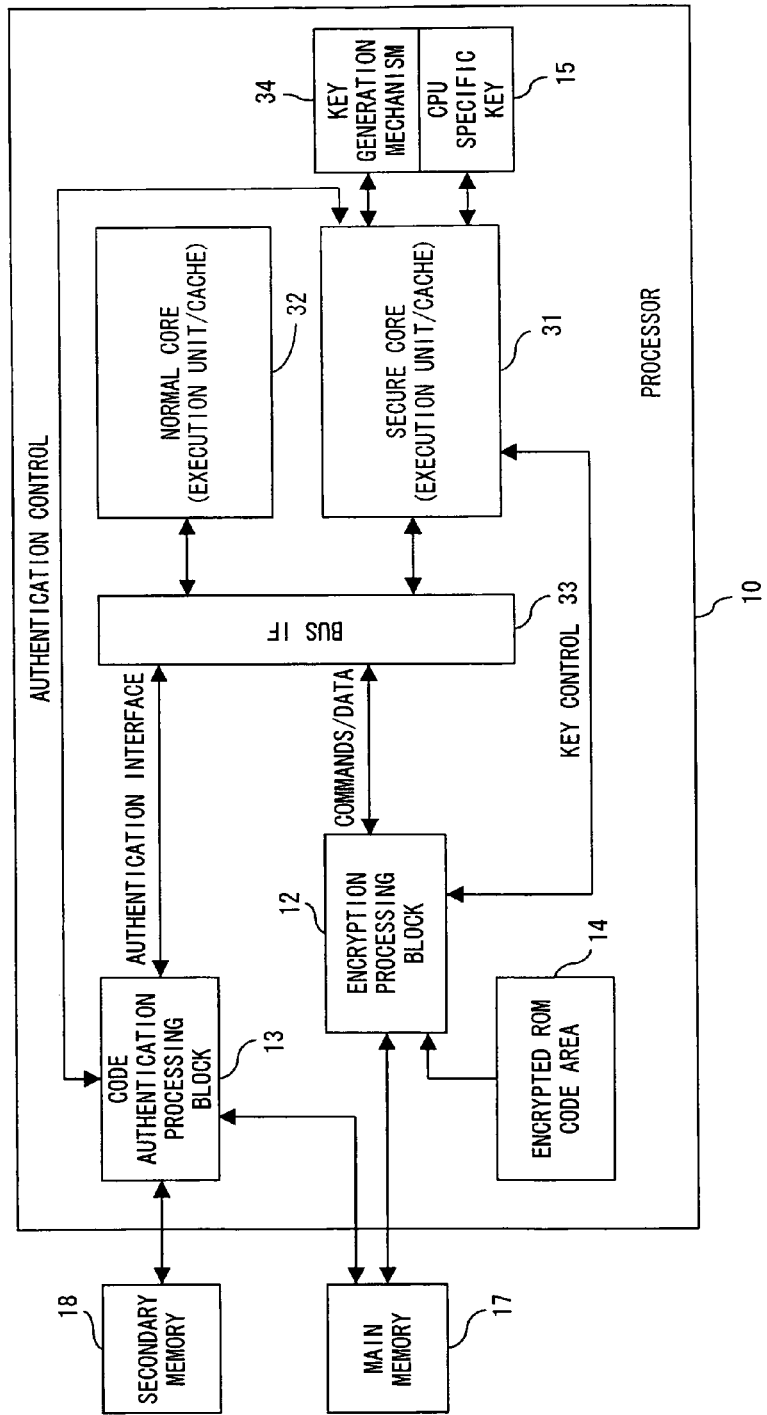
FIG. 18 is a configuration block diagram of the processor having a key generation mechanism corresponding to a secure core.

FIG. 18 is a configuration block diagram of the processor having a key generation mechanism in the second embodiment. In addition to the configuration shown in FIG. 12, the processor of FIG. 18 further comprises a key generation mechanism 34.

Figure 19:
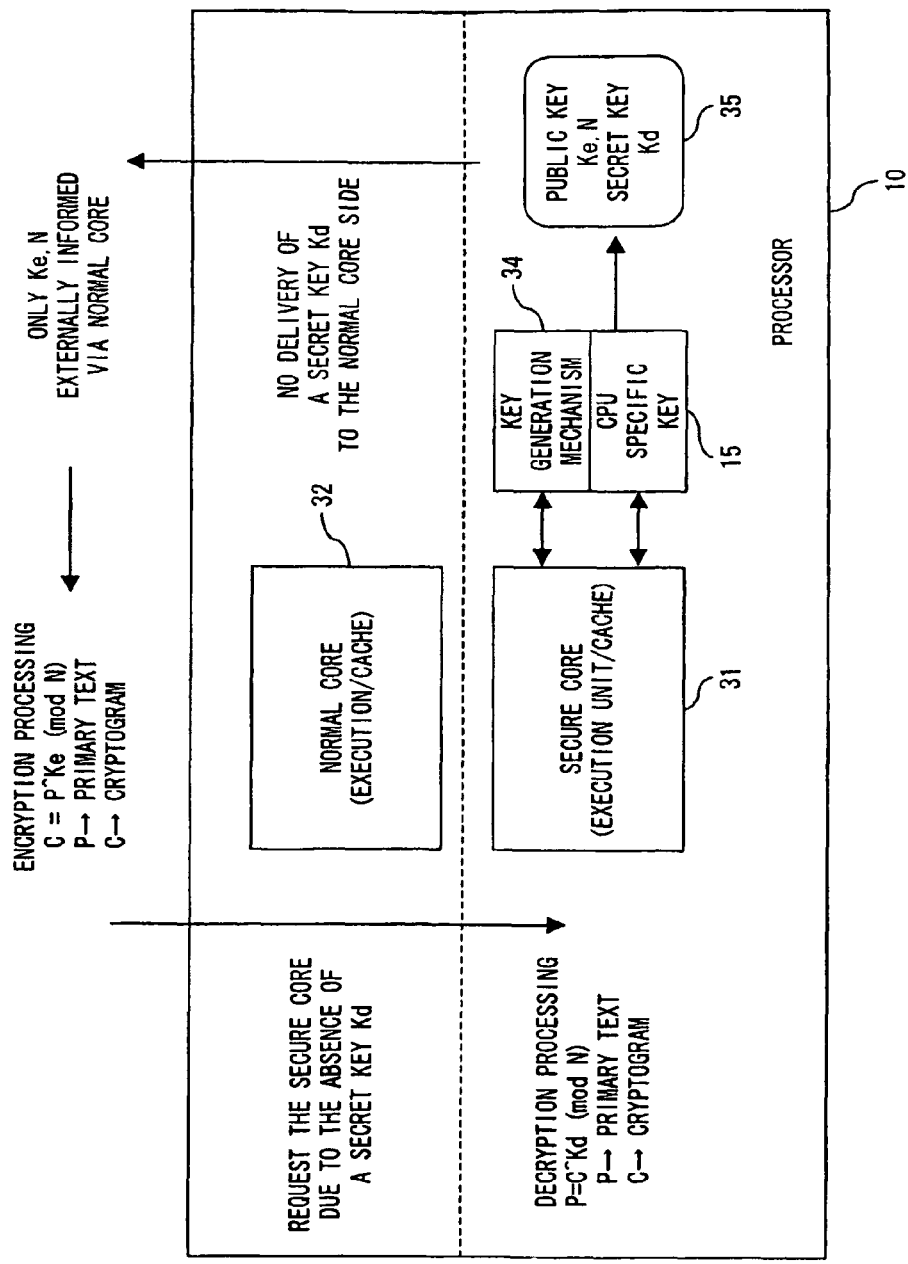
FIG. 19 is an actual explanatory diagram of a concrete example of the key processing system in the processor shown in FIG. 18.

FIG. 19 is an explanatory diagram for generation of a key by the secure core and an encryption processing using the generated key in the second embodiment. In this figure, the secure core 31 in the processor generates a public key Ke, N and a secret key Kd35 using the CPU specific key 15 and the key generation mechanism 34. For example, it notifies the public key Ke and N to the outside of the processor via the normal core 32. In this case, the secret key Kd is not delivered to the side of the normal core 32 and the normal core 32 can not execute any key processing other than the public key as mentioned previously.

If an encrypted statement C which has been encrypted using the public key and the original text P is entered externally to the normal core 32, the normal core 32 requests a decryption processing to the secure core 31 since the normal core 32 does not hold the secret key Kd. Subsequently, the secure core 31 decrypts the text P using the secret key Kd.

Figure 20:
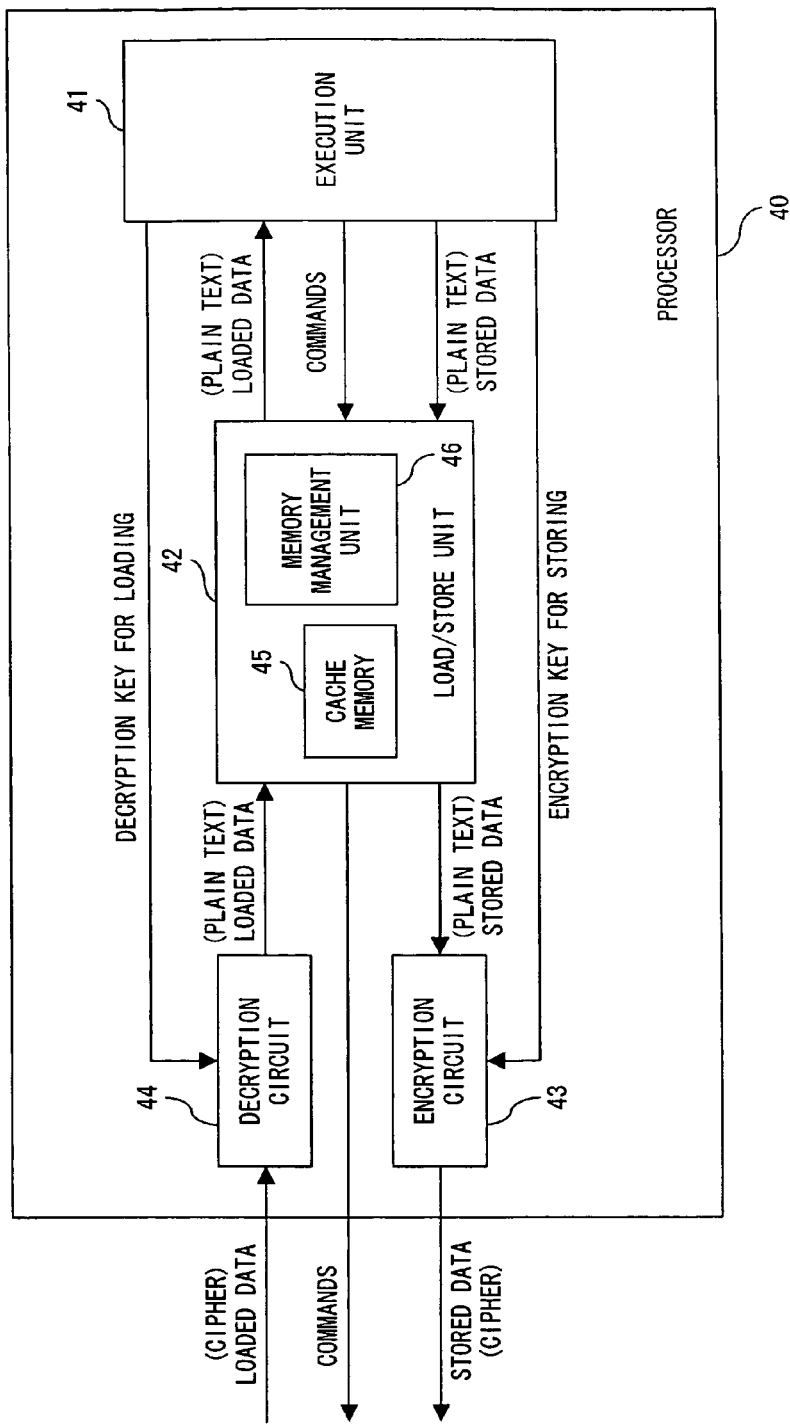
FIG. 20 is a block diagram showing the basic configuration of the processor in the third embodiment.

Next, the third embodiment of the invention is explained below. FIG. 20 is a basic configuration block diagram of the processor in the third embodiment. The processor 40 in this figure comprises an execution unit 41, a load/store unit 42, an encryption circuit 43, and a decryption circuit 44. In addition, the load/store unit 42 comprises a cache memory 45 and a memory management unit 46.

The third embodiment is a processor which executes basically secure operations as in the first and second embodiments. It is basically characteristic in that an encryption key for storing and a decryption key for loading are specified in the processor 40 from the execution unit 41 for the encryption circuit 43 which performs encryption of the stored data and for the decryption circuit 44 to decrypt the loaded data including the fetched commands as in the encryption processing block in the first embodiment.

In the third embodiment shown in FIG. 20, a plain text is given as a command and a stored data from the execution unit 41 to the load/store unit 42, and a loaded data is given as a plain text from the load/store unit 42 to the execution unit 41. The command is given to the main memory or to the secondary memory as explained in FIG. 2 via the load/store unit 42, and the stored data as a plain text are given to the encryption circuit 43, and then output to the main memory as an encrypted stored data. Or the encrypted loaded data input from the main memory are decrypted by the decryption circuit 44 to be given as loaded data as a plain text to the load/store unit 42.

Figure 21:
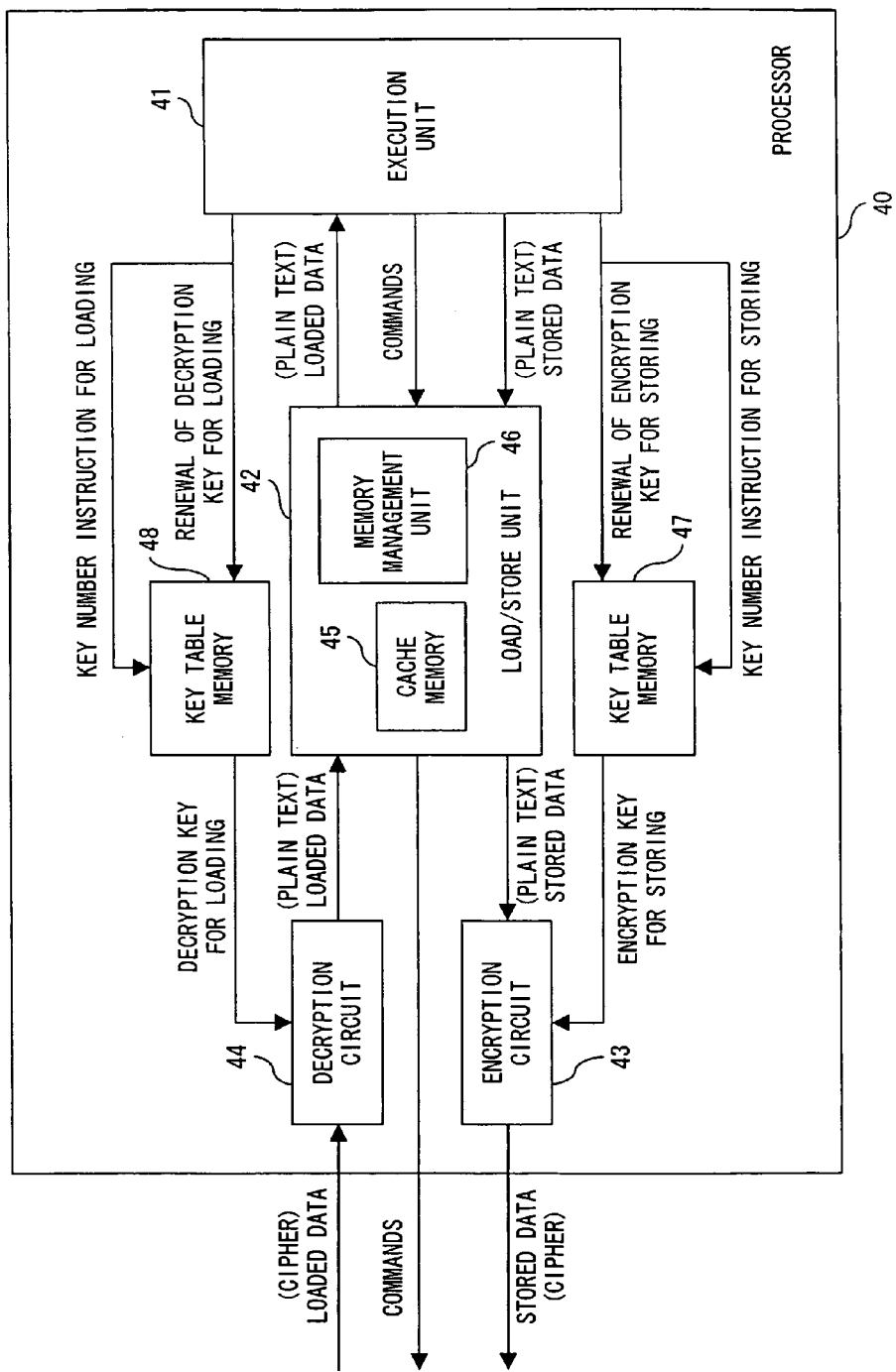
FIG. 21 is a configuration block diagram of the processor having a key table memory in the third embodiment.

FIG. 21 is a configuration block diagram of the processor having a key table memory storing the encryption key and decryption key in the third embodiment. In this figure, the key table memory 47 stores an encryption key for encryption of the stored data, and the key table memory 48 stores a decryption key for decryption of the loaded data. From the execution unit 41, a key number instruction for storing and a renewal instruction of an encryption key are given to the key table memory 47 and a key number instruction for loading and a renewal instruction for decryption key are given to the key table memory 48. The configuration of the key table memory will be described in detail later.

Figure 22:
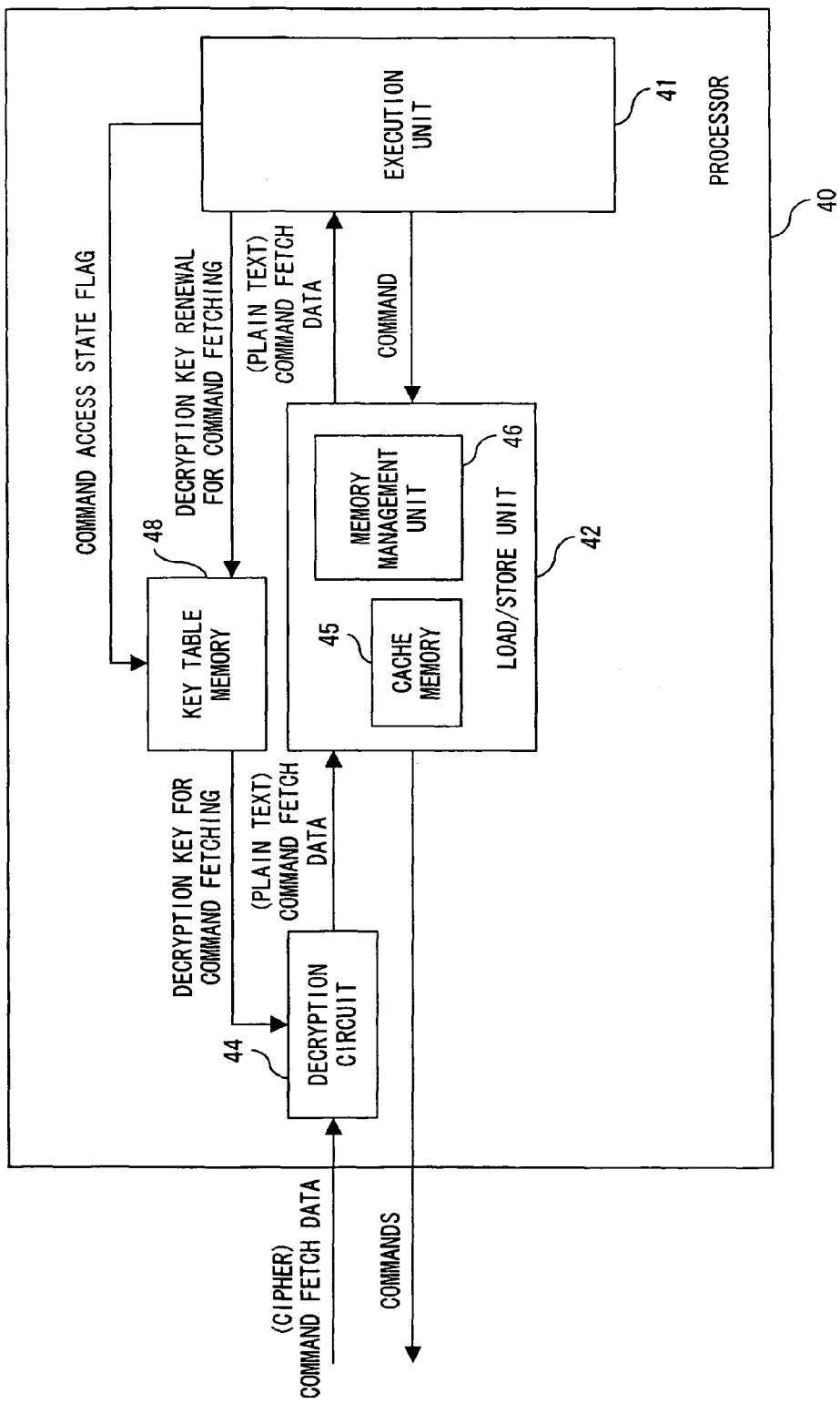
FIG. 22 is a block diagram showing the configuration of the processor in the command access state in the third embodiment.

FIG. 22 is a configuration block diagram of the processor having a key table memory storing a decryption key for command fetching in order to perform decryption of the command to be fetched in the third embodiment. In this figure, the execution unit 41 performs a processing in the command access state to fetch the commands stored in, for example, the main memory. For example, the command fetched data as loaded data from the main memory are given to the decryption circuit 44, and in this case, the execution unit 41 gives a command access state flag to the key table memory 48. The decryption circuit 44 performs decryption of the command fetched data using a decryption key for command fetching output from the key table memory 48, and the command fetched data as a plain text are given to the execution unit 41 via the load/store unit 42. From the execution unit 41, if desirable, a renewal instruction of decryption key for command fetching is given to the key table memory 48.

Figure 23:
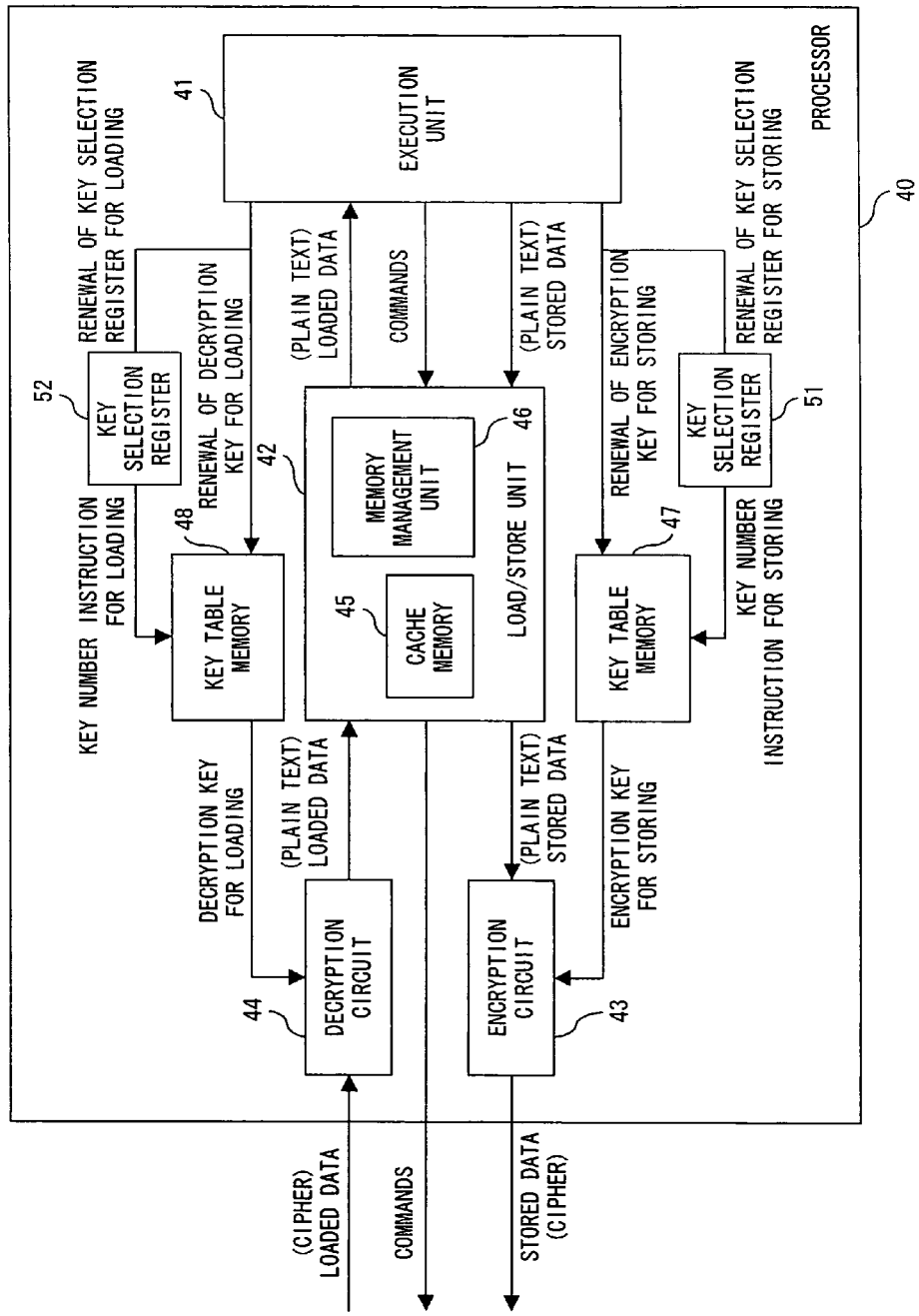
FIG. 23 is a block diagram showing the configuration of the processor having a key selection register corresponding to the key table memory.

FIG. 23 is a configuration block diagram of the processor having a key selection register which gives a key number instruction to be used for the key table memory in the third embodiment. In this figure, a key selection register 51 is installed to give a key number instruction for storing to the key table memory 47, between the key table memory 47 storing the encryption key for storing and the execution unit 41, and a key selection register 52 is installed to give a key number instruction for loading to the key table memory 48 between the key table memory 48 storing the decryption key for loading and the execution unit 41. A renewal instruction of a key selection register for storing is given from the execution unit 41 to the key selection register 51 and a renewal instruction of key selection register for loading is given from the execution unit 41 to the key selection register 52.

In contrast to the fact that in FIG. 21, a key number instruction is output in response to the respective execution command from the execution unit 41, a register renewal instruction is given at a certain interval of the commands in FIG. 23, and encryption/decryption is performed using the same key until the next renewal instruction is given. In addition, it is possible that both a direct route for giving the key number instruction from the execution unit to the key table memory, and an indirect route via the key selection register are installed such that a signal to give an instruction for which route of instruction the execution unit 41 should use in response to the execution command is given to the key table memory.

Figure 24:
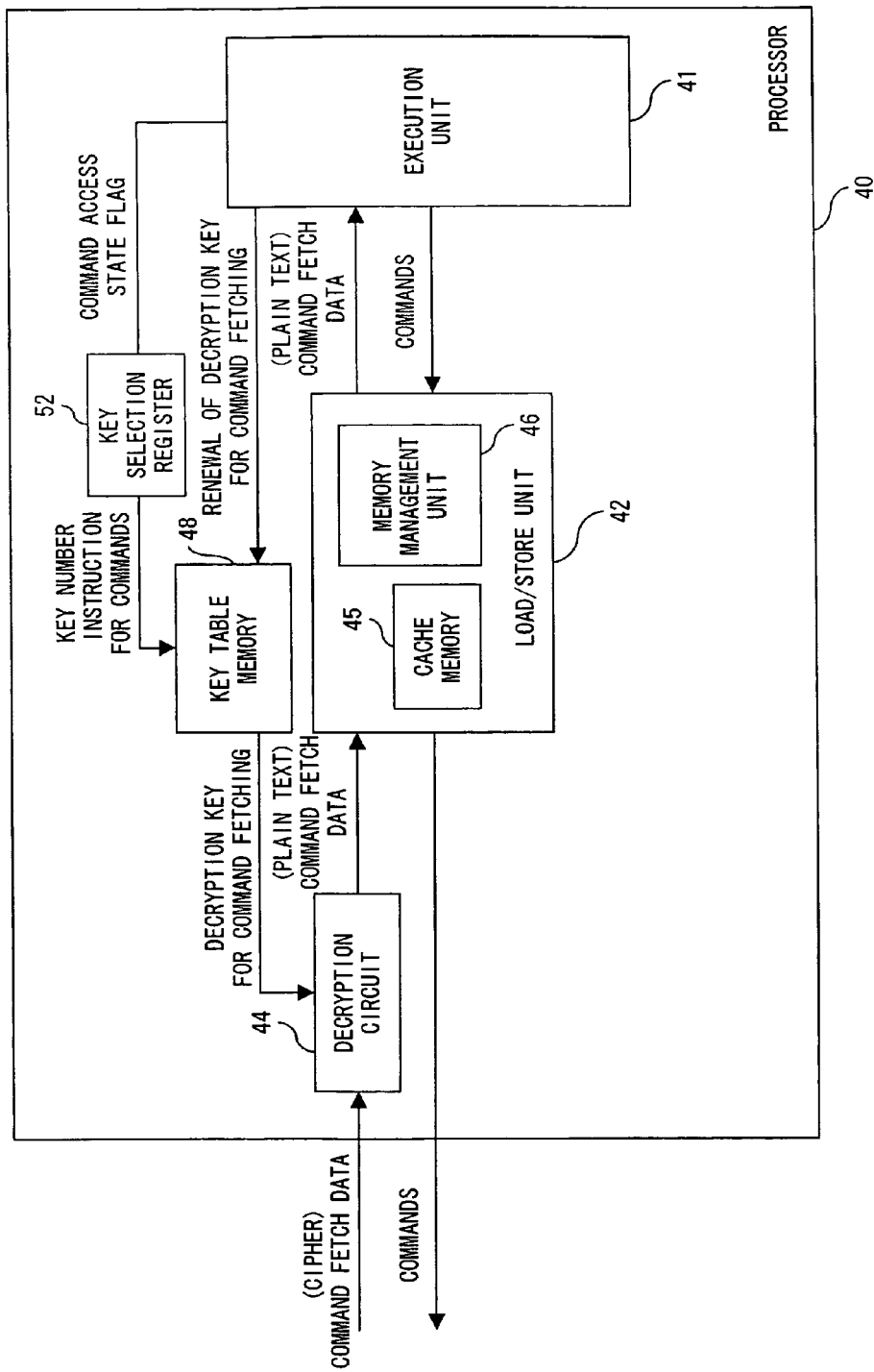
FIG. 24 is a configuration block diagram of the processor having the key selection register corresponding to the key table memory in the command access state.

FIG. 24 is a configuration block diagram of the processor having the key selection register corresponding to the command access state of the execution unit in the third embodiment. In this figure, as in FIG. 22, the execution unit 41 is in a command access state to fetch commands from, for example, the main memory and a command access state flag is given from the execution unit 41 to the key selection register 52, and the key selection register 52 gives a key number instruction for command fetching corresponding to the key table memory 48 storing the decryption key for command fetching.

Figure 25:
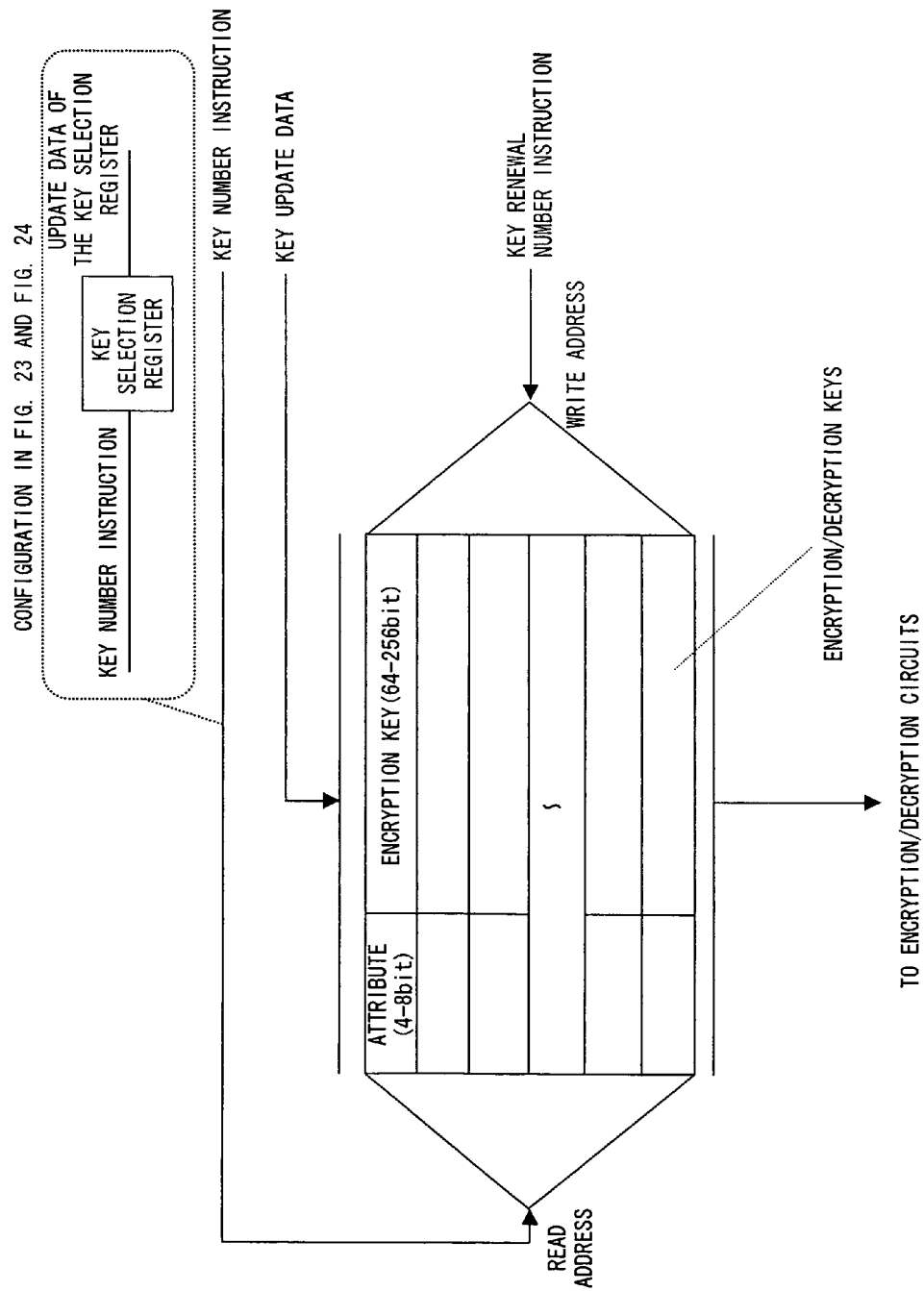
FIG. 25 is a diagram showing a configuration example of the key table memory.

FIG. 25 is an explanatory diagram of the configuration example of the key table memory in the third embodiment. In this figure, the corresponding encryption key and its attributes are stored in the key table memory. The execution unit 41 gives a key number instruction directly or via the key selection register to the key table memory, and the key number is used as read address. And an encryption key or a decryption key is given along with the specification information of the encryption method for the encryption circuit 43 or decryption circuit 44, or attribute data indicating the necessity of encryption. A key renewal number instruction given from the execution unit 41 is used as a write address and the key renewal data are written.

The attribute data of each entry indicate validity/invalidity of the entry, ON/OFF of encryption, and encryption methods and encryption modes, and an encryption key which depends upon the encryption methods. The data instructing ON/OFF of the encryption correspond to the instructions when loading and storing the plain text data without performing encryption/decryption as will be described later.

Figure 26:
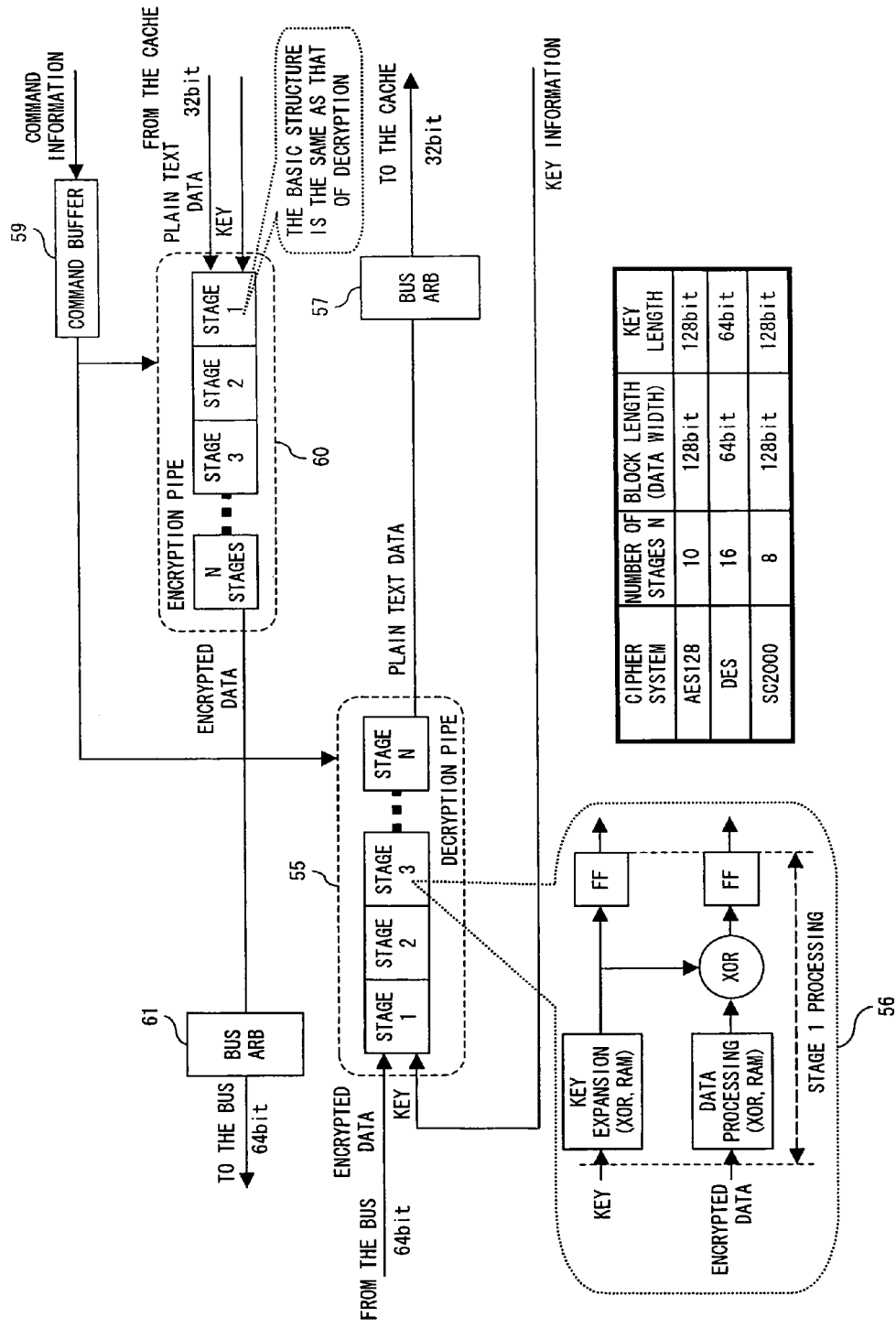
FIG. 26 is a block diagram showing a configuration example of the encryption circuit and the decryption circuit.

FIG. 26 is an explanatory diagram of the configuration example of the encryption circuit or decryption circuit in the third embodiment. For example, the decryption circuit 44 in FIG. 20 is basically configured with a decryption pipe 55 and a bus arbiter 57. The decryption pipe 55 operates in response to the input of the command information via the command buffer 59 from the execution unit 51. The decryption pipe 55 is an N-state pipe to decrypt to the plain text data, the encrypted data entered via the bus from, for example, the main memory. This N-stage pipe is formed by connecting N-stages of processing 56 which is a schematic example of a one step of common key encryption processing. The plain text data output from the decryption pipe 55 is then stored in, for example, the cache memory 45 shown in FIG. 20 via the bus arbiter 57.

The encryption circuit 43 basically comprises an encryption pipe 60 and a bus arbiter 61. For instance, a 32-bit plain text data is given from the cache memory 45 to the encryption pipe 60 and the encrypted data which are encrypted by the N-stage pipe using the encryption key specified from the execution unit 41 are output to the bus connected to, for example, the main memory via the bus arbiter 61. The operations of the encryption pipe 60 are controlled by the command information given from the execution unit 41 via the command buffer 59 as in the case of decryption pipe 55. In addition, the basic structure of the processing at each stage of the encryption pipe 60 is the same as that in the decryption pipe 55. Moreover, a variety of encryption methods including AES128, DES and SC2000 are available as encryption methods. As for AES methods, specifications of AES192 and AES256 have already been regulated.

For example, the bus arbiter 61 performs arbitration for the bus connected to the main memory or secondary memory device and has basically no relationship to the operations of the secure processor in the present invention.

FIG. 27 is a block diagram showing the configuration of an encryption circuit and decryption circuit in which a portion of the data is left as plain text data instead of performing encryption for the entire data, for instance, a data passing function is added so that the data are input and output between the main memory. In this figure, the basic configurations of the encryption circuit and the decryption circuit are the same as those in FIG. 26. However, at the side of the encryption circuit, the data which are not needed to be encrypted in the plain text data given from the cache memory 45 are given directly to the bypass selector 63 without going through the encryption pipe 60 and are stored in any of multiple bypass buffers 64 along with the encrypted data output from the encryption pipe 60 and then given to the bus connected to the main memory via the bus arbiter 61.

The selection by the bypass selector 63 for the plain text data or encrypted data is also controlled by the command information from the execution unit 41 via the command butter 59. Since it takes time to perform processing by the encryption pipe 60, it is possible for the plain text data not requiring encryption to pass the encrypted data to be given to the side of the main memory by the control using the bypass selector 63. The key which is necessary for encryption in FIG. 27 is given to the encryption pipe 60 via the key register 69.

For example, among the data carried from the bus connected to the main memory, the plain text data which have not been encrypted are directly given to the bypass selector 66 without going through the decryption pipe 55, stored in one of multiple bypass buffers 67 using the bypass selector 66 along with the plain text data which have been decrypted by the decryption pipe 55, and then output to the cache memory 45 via the bus arbiter 57.

Figure 28:
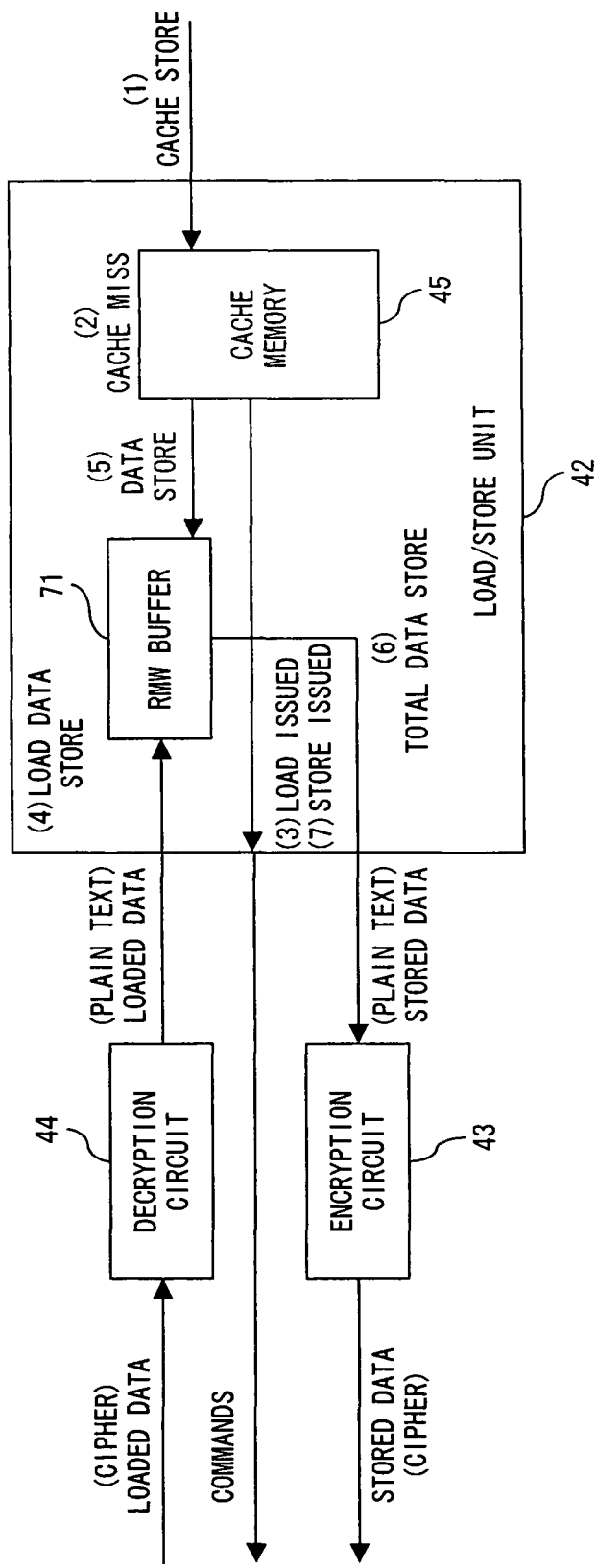
FIG. 28 is an explanatory diagram for the read modify right system corresponding to the load store unit in the cache through system.

FIG. 28 is an explanatory diagram of the read modify write system for the write-through cache system in the third embodiment. If the cache memory 45 uses a write-through system, the data are not stored in the cache memory 45 if cache errors occur while being stored and the data are directly stored in the main memory. If the size of the data to be stored is less than 1 byte, a 1 byte data is stored in the main memory. However, in the third embodiment, the stored data are basically encrypted initially by the encryption circuit 43 and then stored in the main memory. In the process of encryption, a certain amount of data is required as stored data so that even though the data are encrypted by 1 byte and stored in the main memory, it is difficult to perform proper decryption.

In the load/store unit 42 in FIG. 28, for example, if it is necessary to store 1 byte data in the main memory, the data in the length which is necessary for the encryption process are loaded from the main memory and combined with 1 byte data to be stored. And then, the combined data undergo a read modify write operation such that the combined data are encrypted and stored in the main memory.

That is, for instance, if the cache store command at (1) that 1 byte data should be stored in the cache is determined to be an cache error at (2), a load as a command is issued from the cache memory 45 to the main memory at (3), the loaded data of the plain text via the decryption circuit 44 are stored in the read modify write (RMW) buffer 71 at (4), and the data to be stored at (5) are given to the RMW buffer 71 at (5), the data to be stored and the loaded data are combined and the combined data are given to the encryption circuit 43 at (6), and a store as a command issued at (7) for the main memory.

Next, the fourth embodiment of the present invention will be explained below. The difference between the fourth embodiment and the third embodiment is as follows. In contrast to the fact that the key numbers of the encryption key used in the encryption circuit and of the decryption key used in the decryption circuit, for example, the key numbers are specified by the execution unit 41 in the third embodiment, the access addresses of the data to be stored or loaded are specified by the execution unit 41 when executing the commands by the execution unit 41, and an encryption key or a decryption key is selected based on the addresses.

Figure 29:
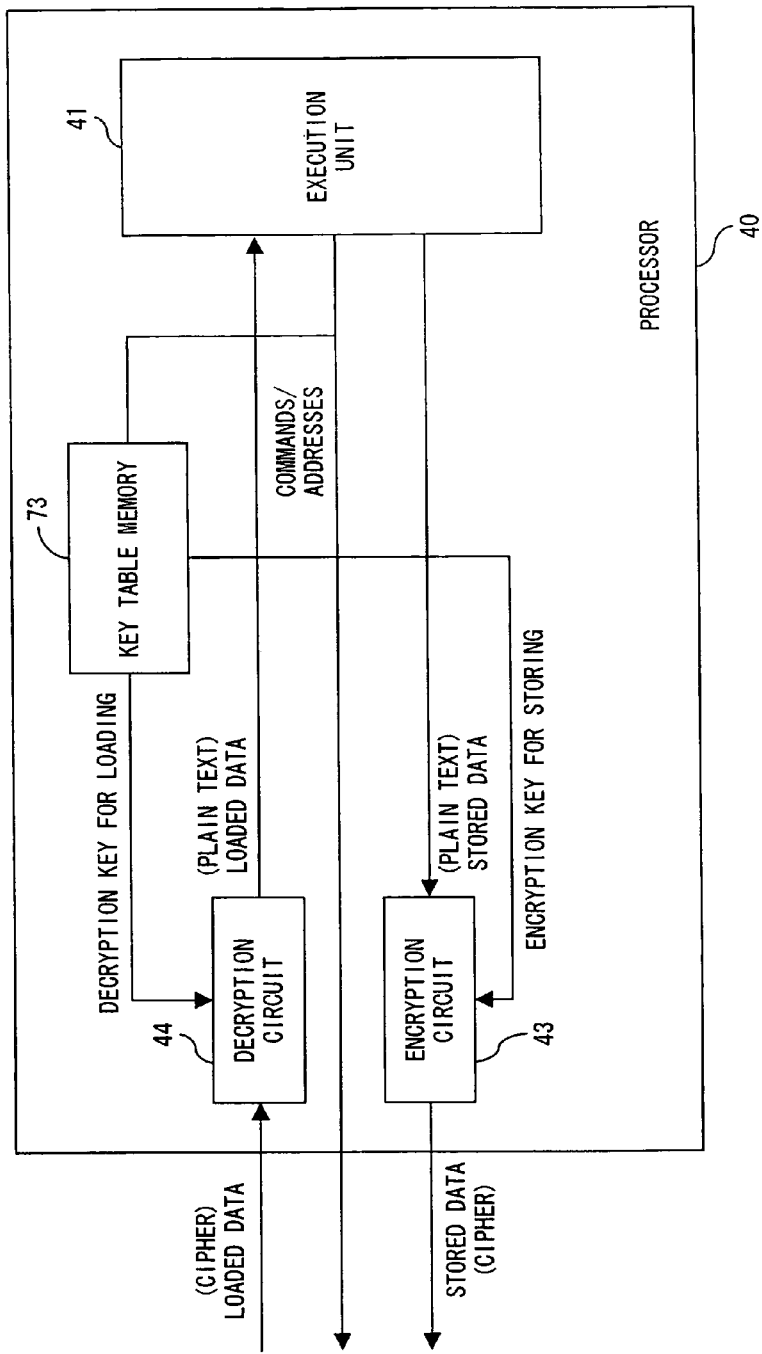
FIG. 29 is a block diagram showing the basic configuration of the processor shown in the fourth embodiment.

FIG. 29 is a basic configuration block diagram of the processor in the fourth embodiment. The processor 40 shown in the figure comprises a key table memory 73 which gives an encryption key for storing to the encryption circuit 43 and a decryption key for loading to the decryption circuit 44 in response to the addresses given by the execution unit 41, in addition to the execution unit 41, the encryption circuit 43, and the decryption circuit 44.

Figure 30:
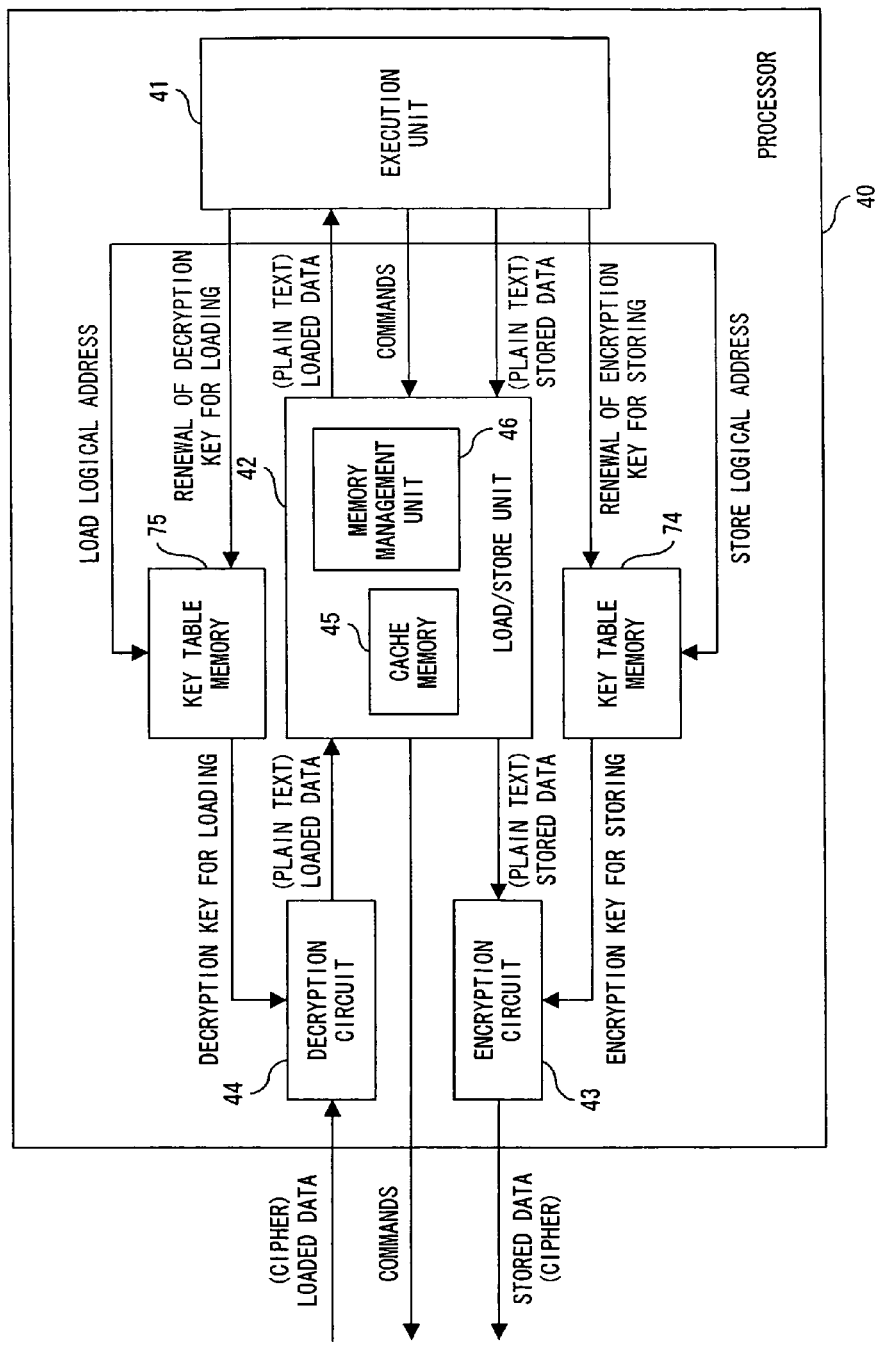
FIG. 30 is a configuration block diagram of the processor having a key table memory which logic addresses are given.

FIG. 30 is a configuration block diagram of the processor in which keys are selected in response to the logical addresses of the stored data or loaded data specified by the execution unit. Unlike the processor shown in FIG. 29, the processor 40 in this figure comprises a key table memory 74 for storing the encryption key for storing and a key table memory 75 for storing the encryption key for loading, as well as a load/store unit 42 which is equipped with a cache memory and a memory management unit 46, like as in the processor shown in FIG. 20. The addresses given from the execution unit 41 to the load/store unit 42, namely the addresses of the stored data or loaded data are logical addresses, and these logical addresses are then given to the key table memory 74 or 75 to select encryption keys for storing or decryption keys for loading. The selected keys are then given to the encryption circuit 43 or decryption circuit 44. From the execution unit 41, the renewal instruction of encryption key for storing is given to the key table memory 74 and the renewal instruction of decryption key for loading is given to the key table memory 75.

Figure 31:
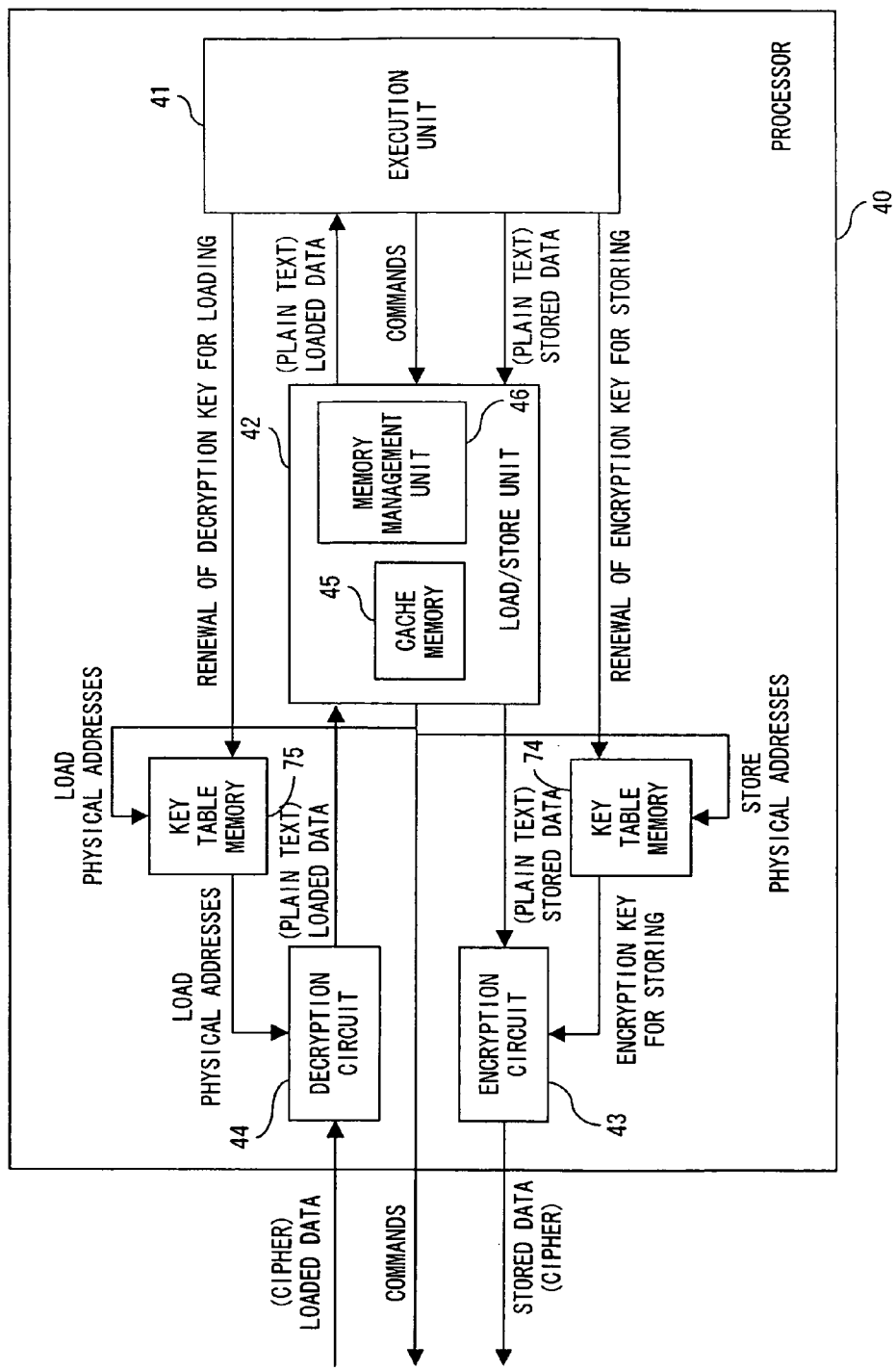
FIG. 31 is a configuration block diagram of the processor having a key table memory which physical addresses are given.

FIG. 31 is a configuration block diagram of the processor for which keys have been selected in response to the physical addresses of the data in the fourth embodiment. When compared to the processor shown in FIG. 30, physical addresses of the stored data or physical addresses of the loaded data are given from the load/store unit 42 respectively for the key table memory 74 or 75, and an encryption key for storing is given to the encryption circuit 43, and a decryption key for loading is given to the decryption circuit 44.

FIG. 32 is a configuration diagram of the key table memory in the fourth embodiment. When compared to FIG. 25 in the third embodiment, if 32 bits from 0.sup.th bit to the 31.sup.st bit are given as access addresses of the data from the side of the execution unit, the stored encryption keys are selected using these addresses as read addresses, and given along with the encryption attributes to the encryption circuit 43 or the decryption circuit 44. If different keys are used for every 4 k bytes as read addresses of the memory, addresses from the 12.sup.th bits to the 31.sup.st bits are used to select an encryption key. In this case, the 4 k bytes as will be mentioned later correspond to the size of 1 page in the main memory. If the 4 k bytes are called as address unit for encryption, the entry data of the key table memory include address tags after excluding bytes equal to the total number of entries multiplies the address unit. For example, if the number of total entries is 32 (5 bits), the addresses from the 17.sup.th bits to the 31.sup.th bits become the address tag.

Figure 33:
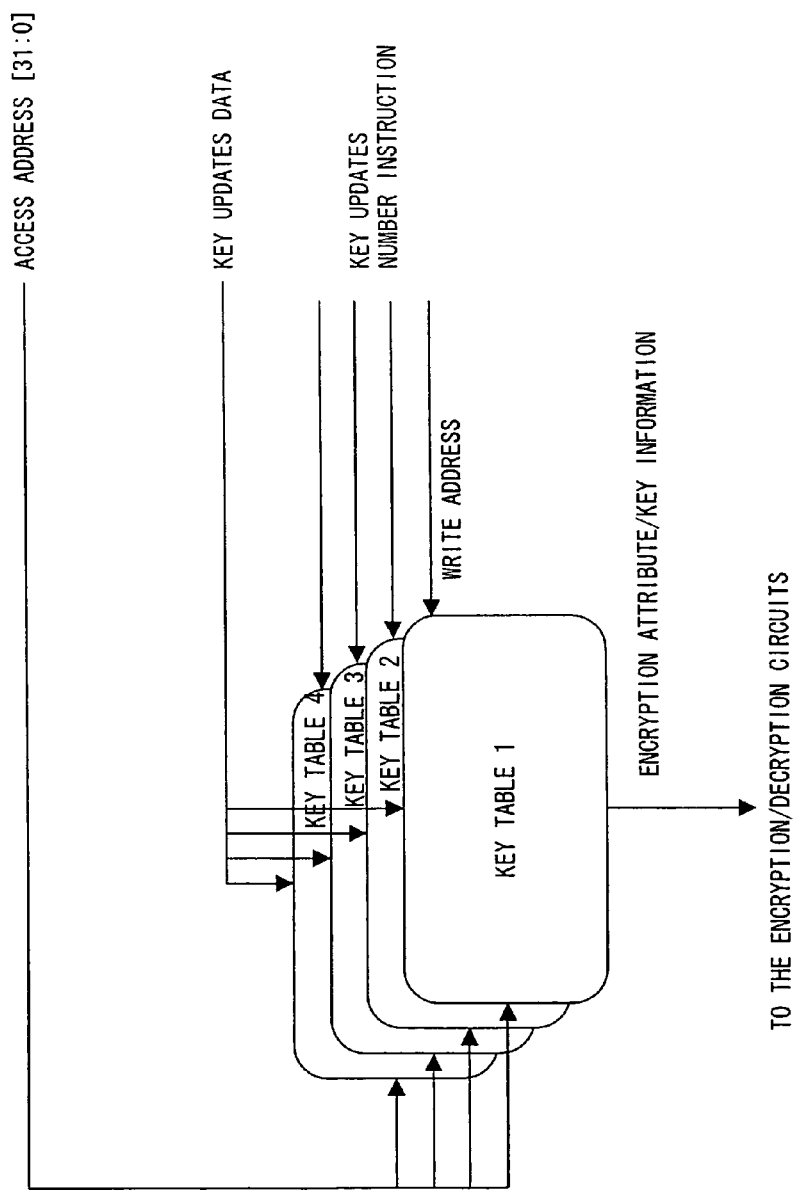
FIG. 33 is another diagram showing a configuration example (No. 2) of the key table memory in the fourth embodiment.

FIG. 33 is an explanatory diagram of the key table memory having a configuration of multiple ways in the third embodiment. The key table memory in this figure is comprised of multiple tables from the key table 1 to the key table 4, and keys and encryption attributes stored in one of the four tables corresponding to the access addresses given from the side of the execution unit are selected to be given to the encryption circuit 43 or decryption circuit 44.

FIG. 34 is an explanatory diagram of a configuration example of the key table memory using an associative memory system. In this figure, access addresses 32 bits are classified into any one in the range of target addresses corresponding to the encryption key stored by the comparison selector 77, the encryption keys corresponding to the classified range are selected to be given to the encryption circuit 43 and to the decryption circuit 44 along with encryption attributes. In FIG. 34, the address tags which are obtained by excluding the amount of address unit regardless of the total number of entries are included in the entries. If the address unit is 4 k bytes, addresses from the 12.sup.th bits to the 31.sup.st bits become the address tags.

Figure 35:
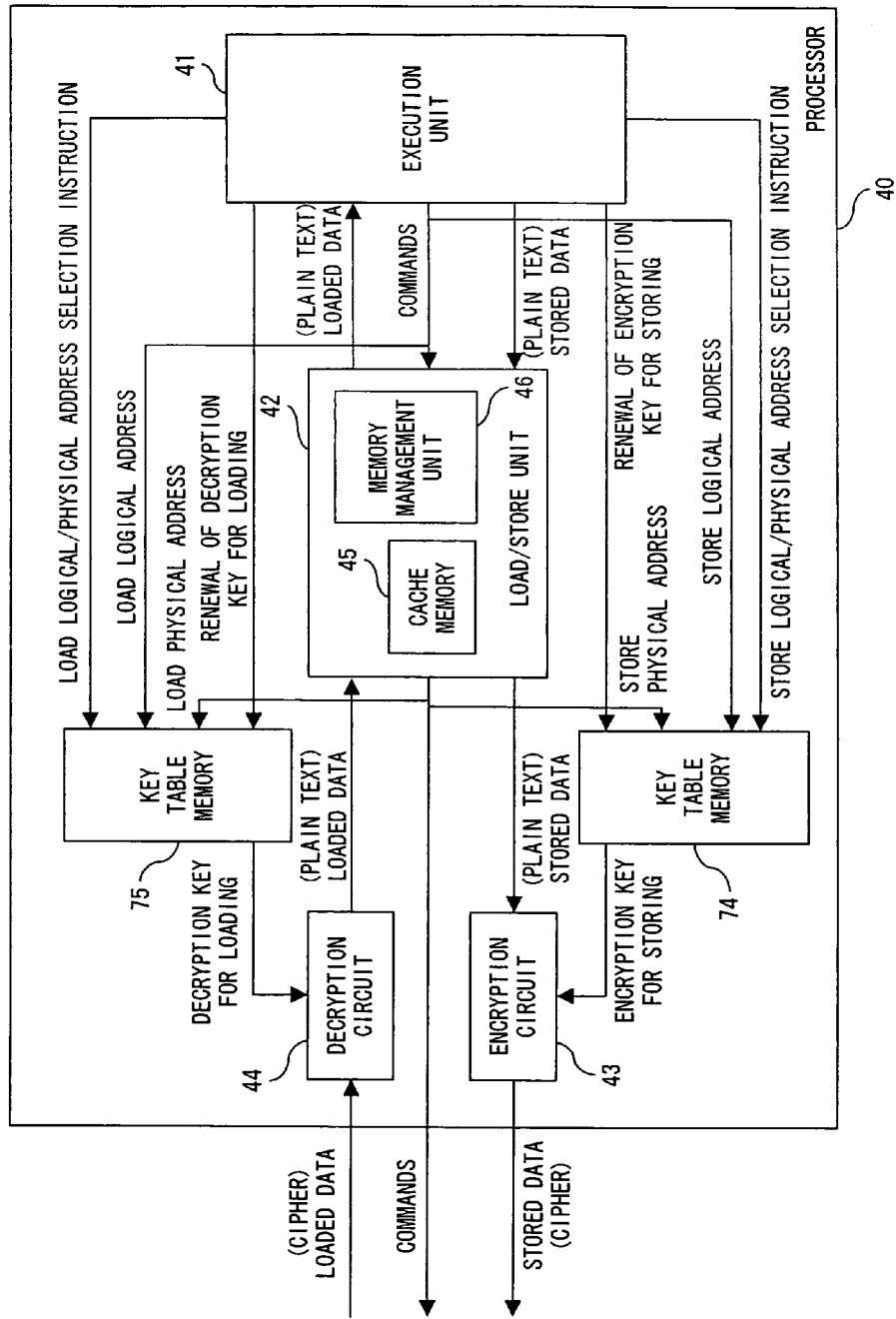
FIG. 35 is a block diagram showing a configuration of the processor comprising the key table memory which a logic address and a physical address are given.

FIG. 35 is a configuration block diagram of the processor in which keys are selected in response to either the logical addresses or physical addresses of the data in the fourth embodiment. In this figure, logical addresses of the data are given from the execution unit 41 or physical addresses are given from the load/store unit 42 to the key table memory 74 or 75, respectively. Alternatively, selection instructions of logical address and physical address for the stored data are given to the key table memory 74 from the execution unit 41. And, selection instructions of logical address and physical address for the loaded data are given to the key table memory 75 from the execution unit 41. In response to these selection instructions, keys corresponding to any of the logical addresses or physical addresses are selected and given to the encryption circuit 43 and the decryption circuit 44, respectively.

FIG. 36 is a configuration example of the processor comprising of a key selection register which gives selection instructions of logical address and physical address to the key table memory. When compared to FIG. 35, respective key selection registers 78 and 79 are installed between the execution unit 41 and the key table-memory 74 or 75, respectively, and selection instructions of logical address and physical address for the stored data, and selection instructions of logical address and physical address for the loaded data are output to the key table memory 74 and 75. From the execution unit 41 to the key selection registers 78 and 79, respective renewal instructions of key selection register are given.

Figure 37:
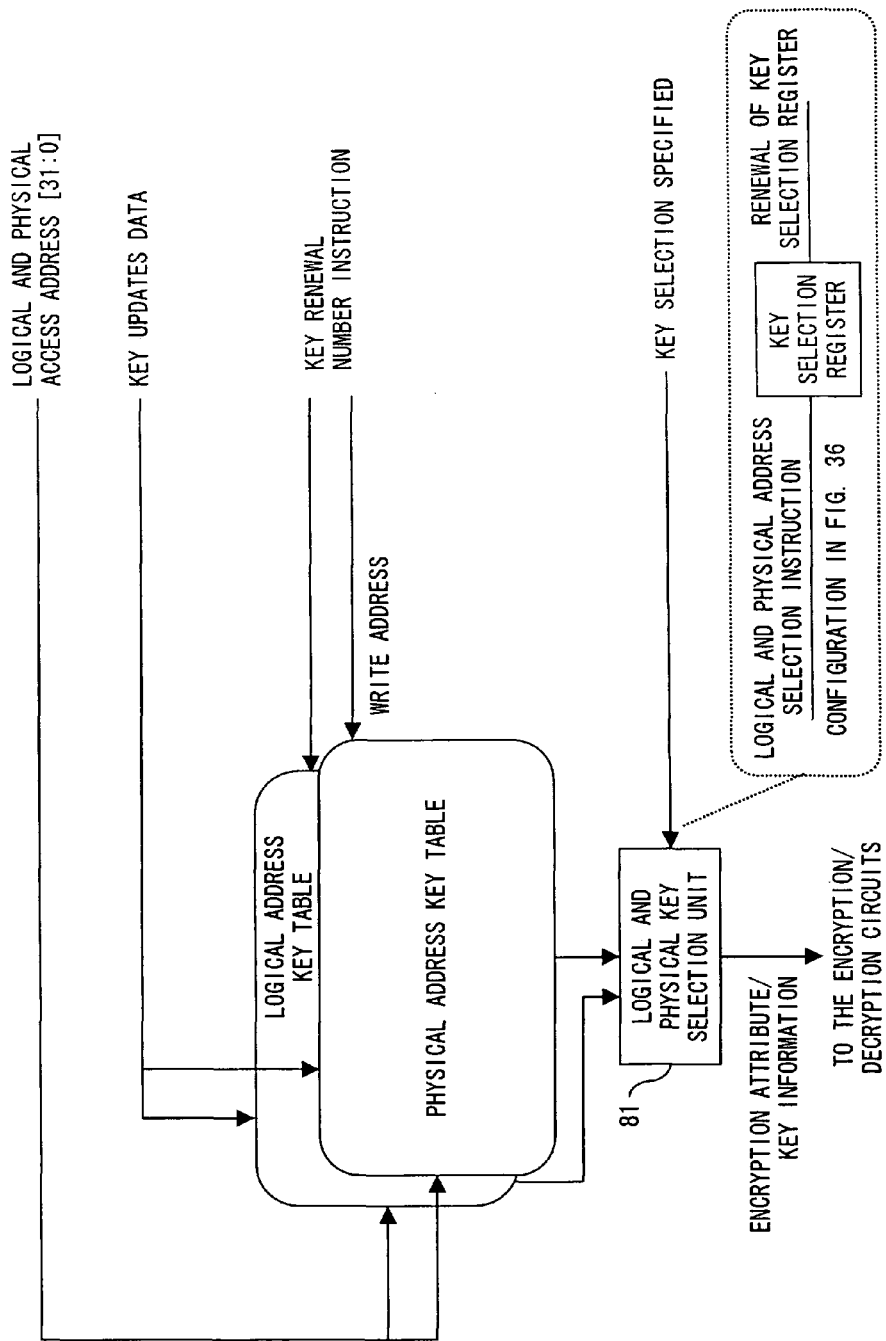
FIG. 37 is a diagram showing a configuration example of the key table memory shown in FIG. 35 and FIG. 36.

FIG. 37 is a configuration example of the key table memory in FIG. 35 and FIG. 36. In this figure, the key table memory has a physical address key table and a logical address key table, and a physical key and a logical key are output in response to the respective physical addresses and logical addresses. And, in response to the key selection instructions from the side of execution unit 41, or the selection instructions from the key selection register, either physical keys or logical keys along with encryption attributes are output to the encryption circuit 43 or decryption circuit 44 by the logical and physical key selection unit 81.

Figure 38:
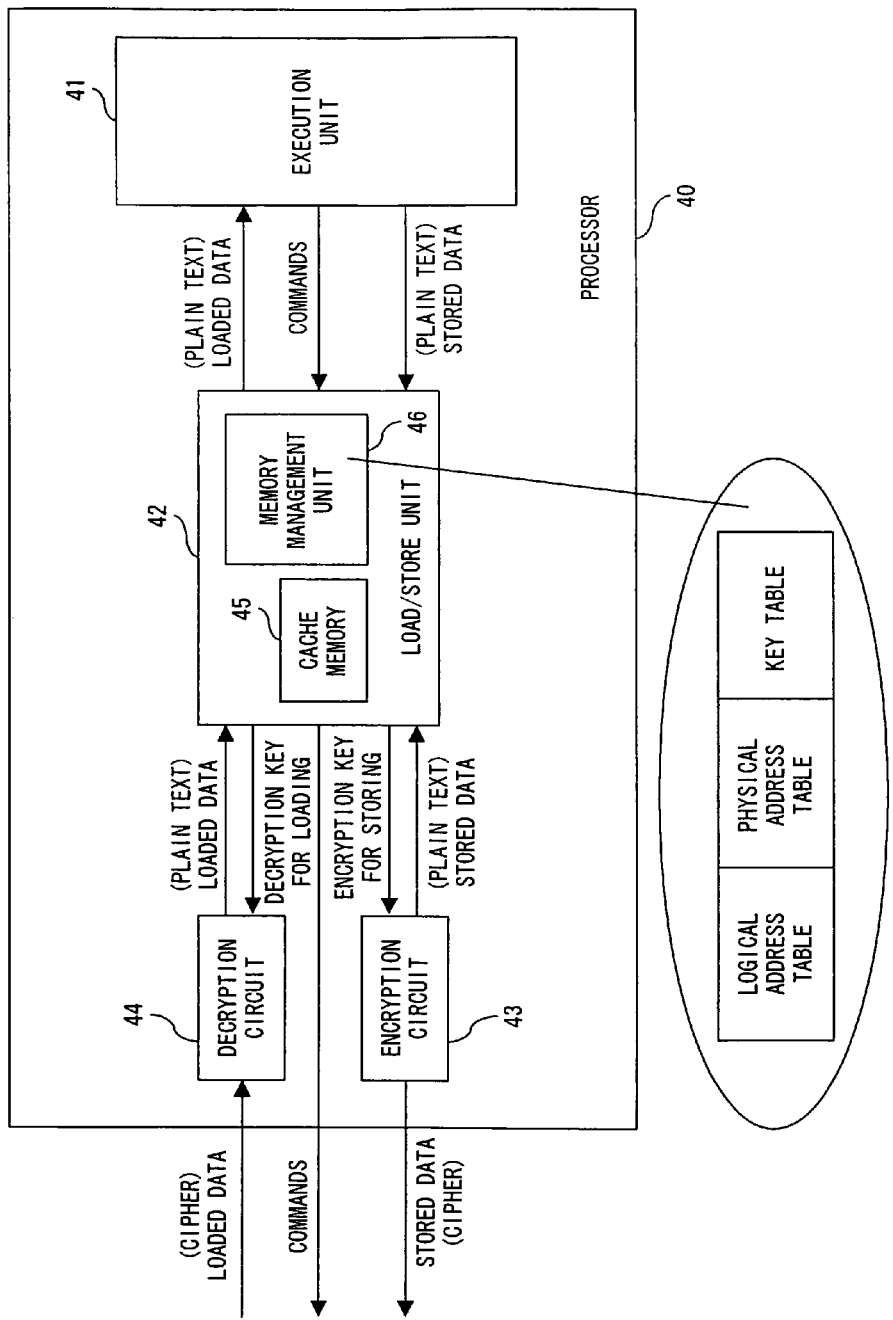
FIG. 38 is a block diagram showing a configuration of the processor having the key table within the memory management unit.

FIG. 38 is a configuration example of the processor having contents of the key table memory as a key table in a memory management unit (MMU) 46 inside the load/store unit 42 in the fourth embodiment.

Figure 39:
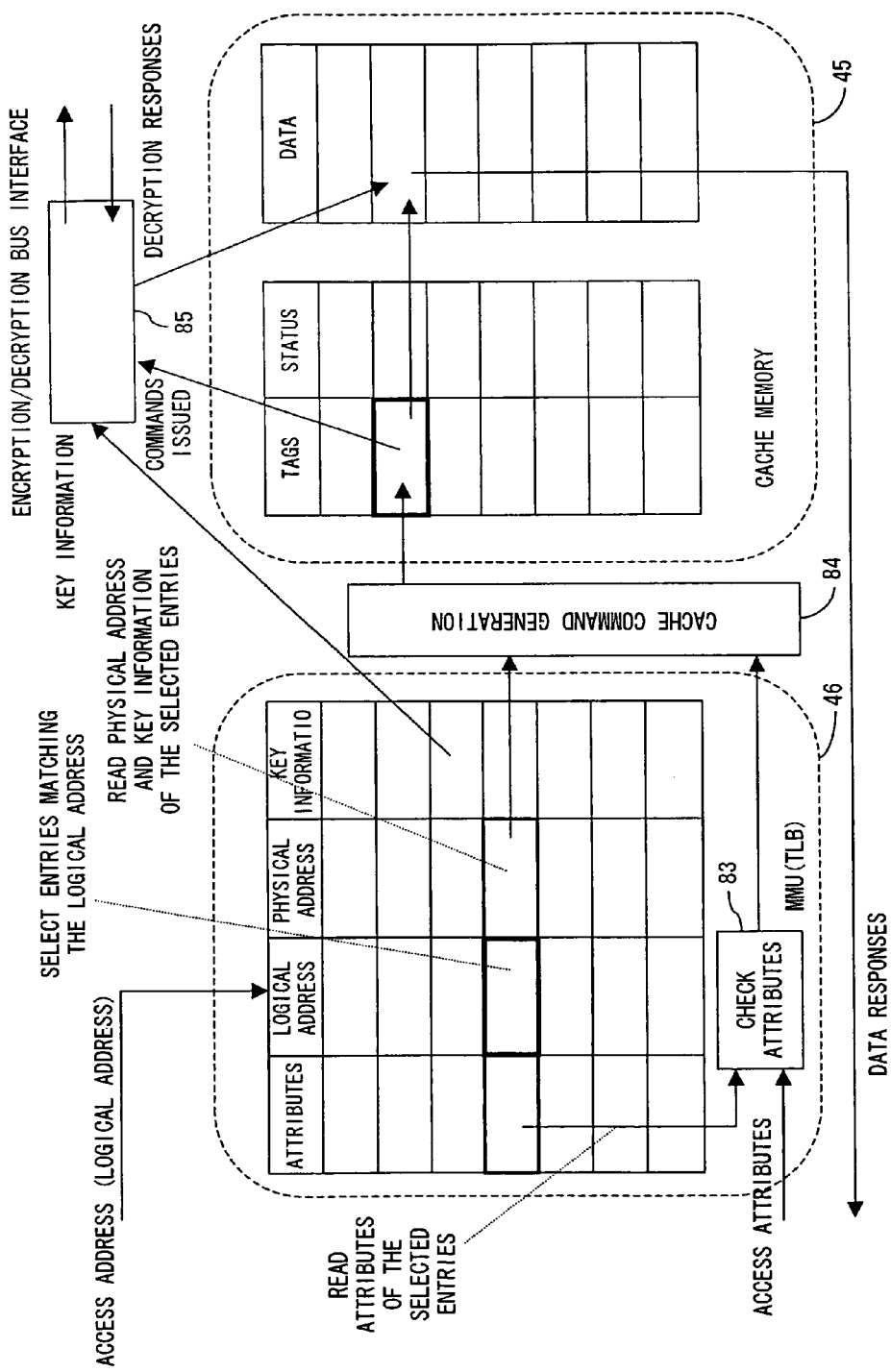
FIG. 39 is an explanatory diagram of the data access system shown in FIG. 38.
Figure 40:
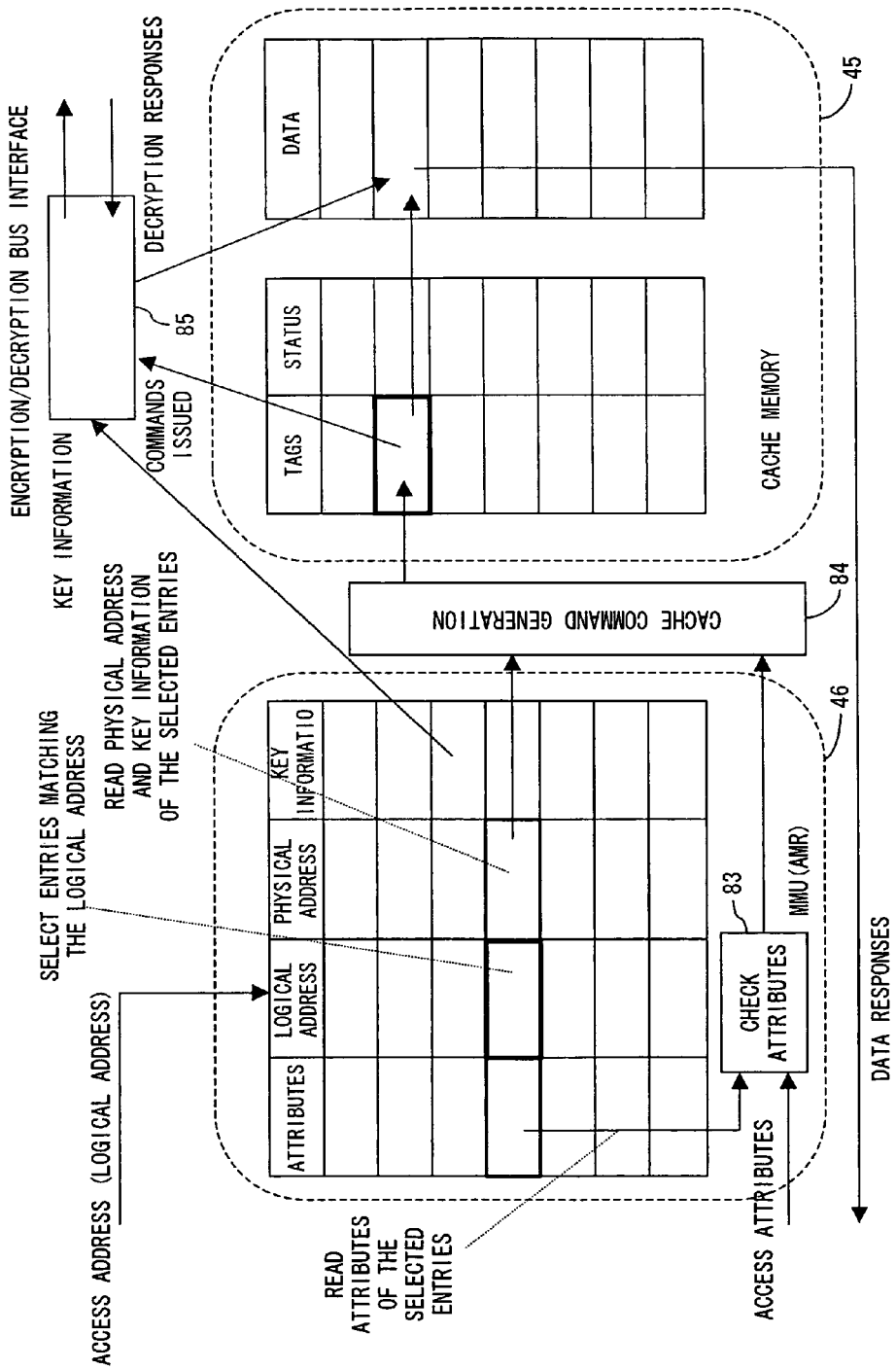
FIG. 40 is an explanatory diagram of the data access system in the case when a key table is installed in the address map register.

FIG. 39 and FIG. 40 are explanatory diagrams of a storage format of the key information in this memory management unit and a cache memory access system, respectively. Generally, correspondences between the logical addresses and physical addresses are stored in each entry in response to each page in the physical memory in the translation look aside buffer (TLB) inside the MMU 46. In FIG. 39, a key information corresponding to the page is stored in each entry of the TLB. For instance, if the data access address is a logical address, an entry which matches with the logical address is selected and the data attribute and access attribute in response to the entry are checked by the attribute check 83 and then a command generated by the cache command generation 84 is sent to the cache memory 45.

At the side of the cache memory 45, a tag is retrieved in response to the contents of the command received. In the case when cache hit, the data response is immediately returned to the side of the execution unit 41, whereas in the case when cache missed, a command corresponding to the tag is issued to the encryption/decryption bus interface containing encryption circuit 43 and decryption circuit 44. In this case, the key information and the physical addresses which are read from the entry are used, for instance, after the response data from the main memory are decrypted, the decrypted data are stored in the cache memory and then the data responses are returned to the execution unit 41.

FIG. 40 is an explanatory diagram of the key information storage format when an address map register (AMR) is installed in place of the TLB in the memory management unit. In this figure, the information corresponding to the storage contents of the TLB is stored in the register instead of memory. For instance, the page size can be variable so that a large data area can be covered by a single entry.

Figure 41:
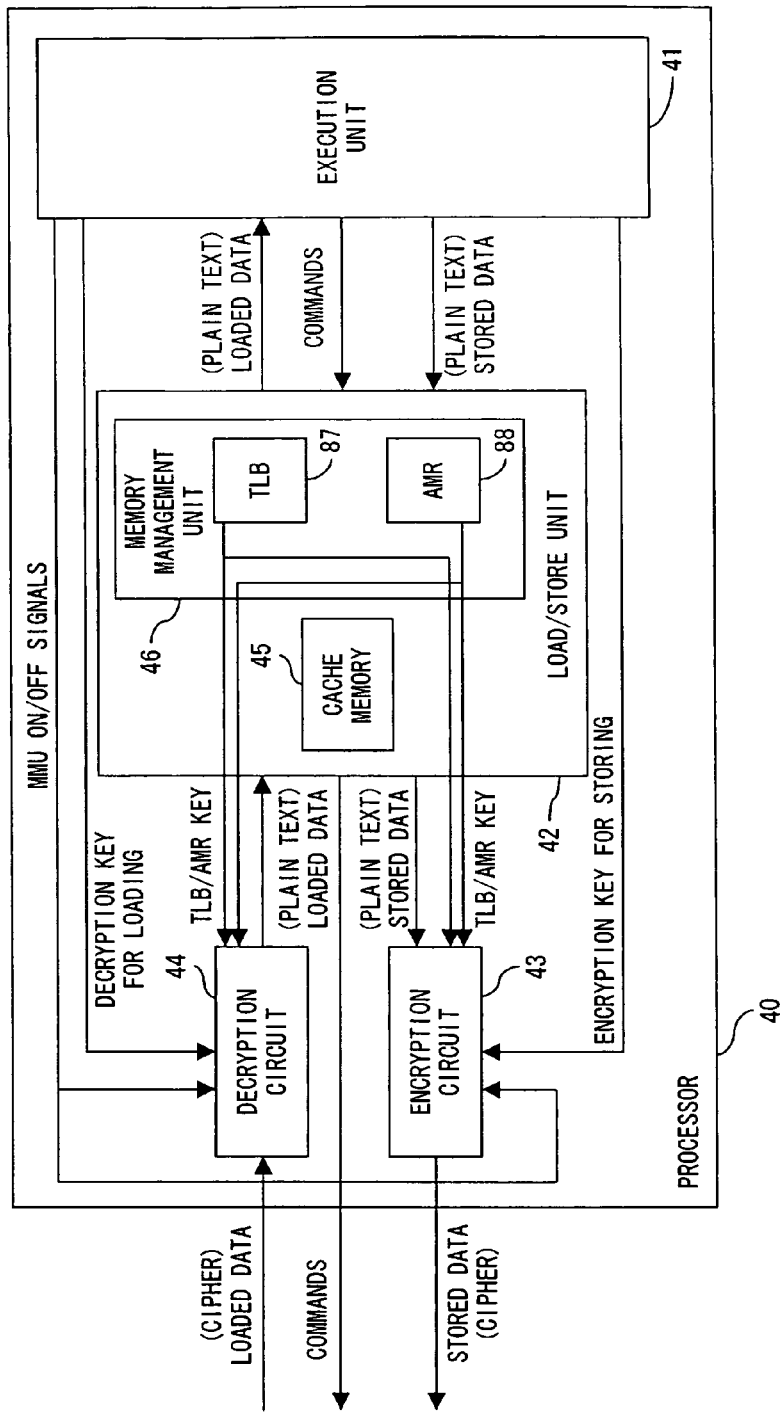
FIG. 41 is a block diagram showing a configuration of the processor for switching keys based on the ON/OFF state of the memory management unit.

FIG. 41 is a configuration example of the processor in which an encryption key is given from the execution unit 41 to the encryption circuit 43 and a decryption key is given to the decryption circuit 44 in such a state that the operation of the memory management unit (MMU) in the load/store unit is halted, namely in the OFF state. In this figure, the ON/OFF signal of the MMU is given to the encryption circuit 43 and to the decryption circuit 44. The encryption circuit 43 or the decryption circuit 44 uses a key given from the execution unit 41 if the signal is OFF, or it uses a key given from TLB 87 of the interior of the memory management unit 46 or AMR 88 if the signal is ON in order to execute encryption or decryption processing.

Figure 42:
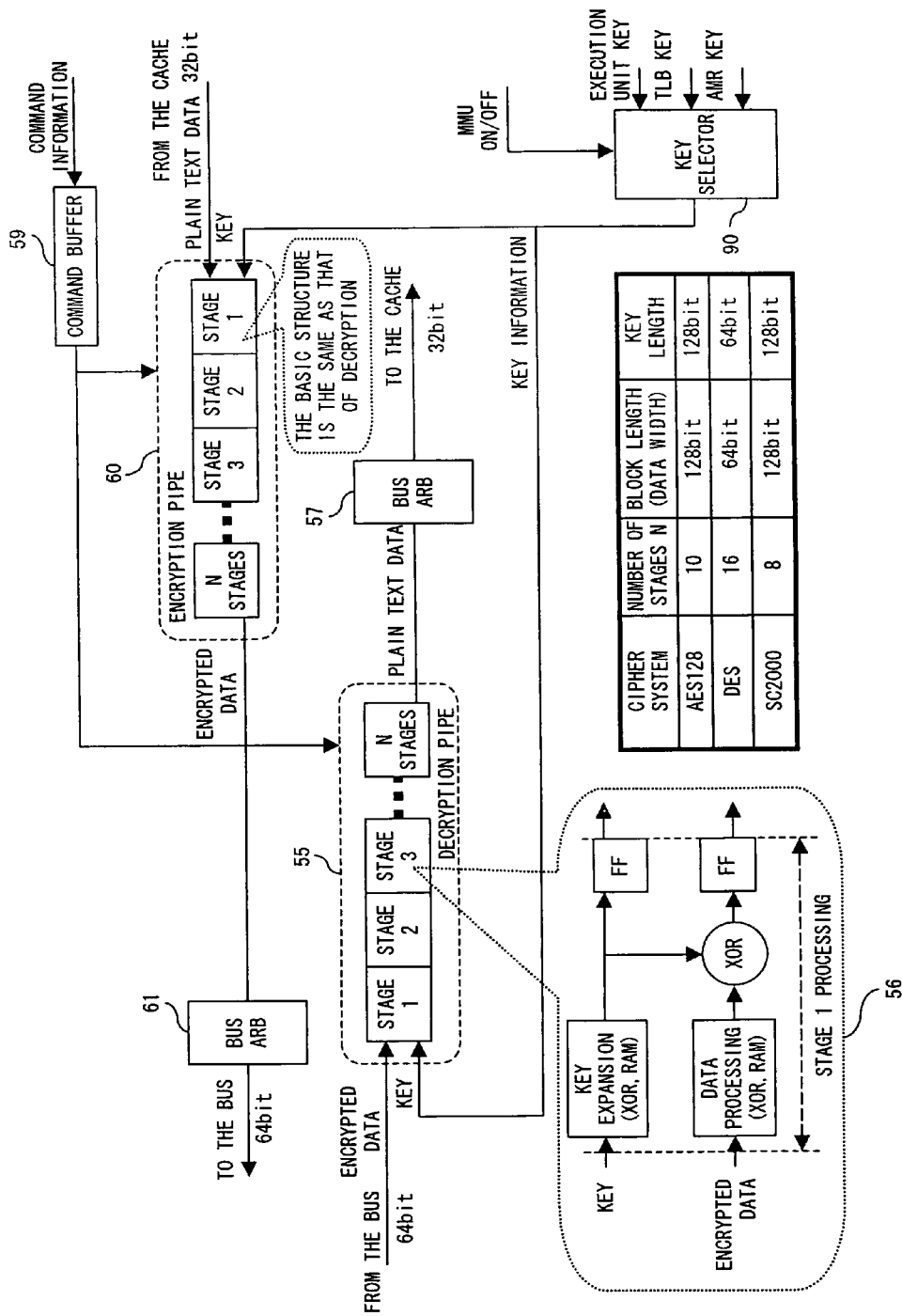
FIG. 42 is an explanatory diagram of an encryption/decryption system for switching keys based on the ON/OFF state of the memory management unit.

FIG. 42 is an explanatory diagram of the key switching system in the encryption circuit or in the decryption circuit in FIG. 41. In this figure, the configuration of the encryption circuit or the decryption circuit is basically the same as FIG. 26 in the third embodiment, but a key selector 90 is added. A key given from the execution unit is selected by the key selector 90 at the time of OFF and a key given from TLB or AMR is selected by the key selector 90 at the time ON according to the values of the MMU ON/OFF signals given from the execution unit, and the selected key is then given to the encryption pipe 60 or the decryption pipe 55.

FIG. 43 is an explanatory diagram of the I/O signals of the execution unit in the third or fourth embodiments. In FIG. 20 in the third embodiment, the essential signals include a load encryption key, a store encryption key, a stored data and a command as output signals, and loaded data as input signals (circle marks), and access addresses and load/store status signals are signals which are present structurally (triangle marks).

In FIG. 21, the output signals of a load key number instruction instead of a load decryption key and those of a store key number instruction are essential. In addition, due to the fact that renewal of the key table memory has an equal value to the register access in view of the execution unit, register-related I/O signals also become essential.

In FIG. 22, the I/O signals corresponding to the command access status are necessary, and the execution status signal as an output signal, and the command fetched data as an input signal are considered as essential.

In FIG. 23 and FIG. 24, a key selection register is added in addition to those used in FIG. 20 and FIG. 21, register-related I/O signals are also essential.

The following explanation is simplified and only a characteristic portion is explained. In summation of FIG. 21, FIG. 22, and FIG. 23, in addition to the I/O signals when the three cases are combined, supervisor/user status signals indicating that which of supervisor and user the process to be performed corresponds to, and context, that is, the data of the process ID (identifier) are added. These supervisor/user status signals and context ID data are used for selecting the encryption keys and decryption keys in addition to the key number instruction signals output from the execution unit in the third embodiment.

Those after FIG. 29 correspond to the fourth embodiment. The access addresses to the data become the essential output signals. Further, the key selection instruction signals for selecting either logical addresses or physical addresses are also output in FIG. 35 and FIG. 36.

In FIG. 38, because a key table is added to the TLB in the memory management unit, the register-related signals are present from the aspect of configuration. In addition, the figure shows the cases when supervisor/user status signals and context ID data are added. These added signals are used for selecting encryption keys and decryption keys as well as access addresses in the third embodiment.

FIG. 41 includes a case when using a key output from the execution unit is used in response to the values of the status signals indicating ON/OFF of the memory management unit (MMU) and a case when using a key output from the TLB is used. As a result, all the I/O signals become essential as well as supervisor/user status signals and context ID data.

As mentioned above, in the third and fourth embodiments, keys are specified from the execution unit for encryption/decryption of the data and instruction codes so that an encryption processing can be performed at such a level corresponding to the commands to be executed. Also, due to the specification of encryption/decryption keys by the key selection register or access addresses, an encryption processing can be carried out for every program units or for every access, thus, a processing to be performed can be selected in response to diverse situations.

Next, the fifth embodiment of the present invention will be explained below. The fifth embodiment demonstrates a more precise configuration in order to implement secure operation of the secure processor presented as the first embodiment. Setting of an authentication key and operations such as authentication of the process in order to further improve reliability of the process (programs) will be explained in detail below corresponding to its configuration.

Figure 44:
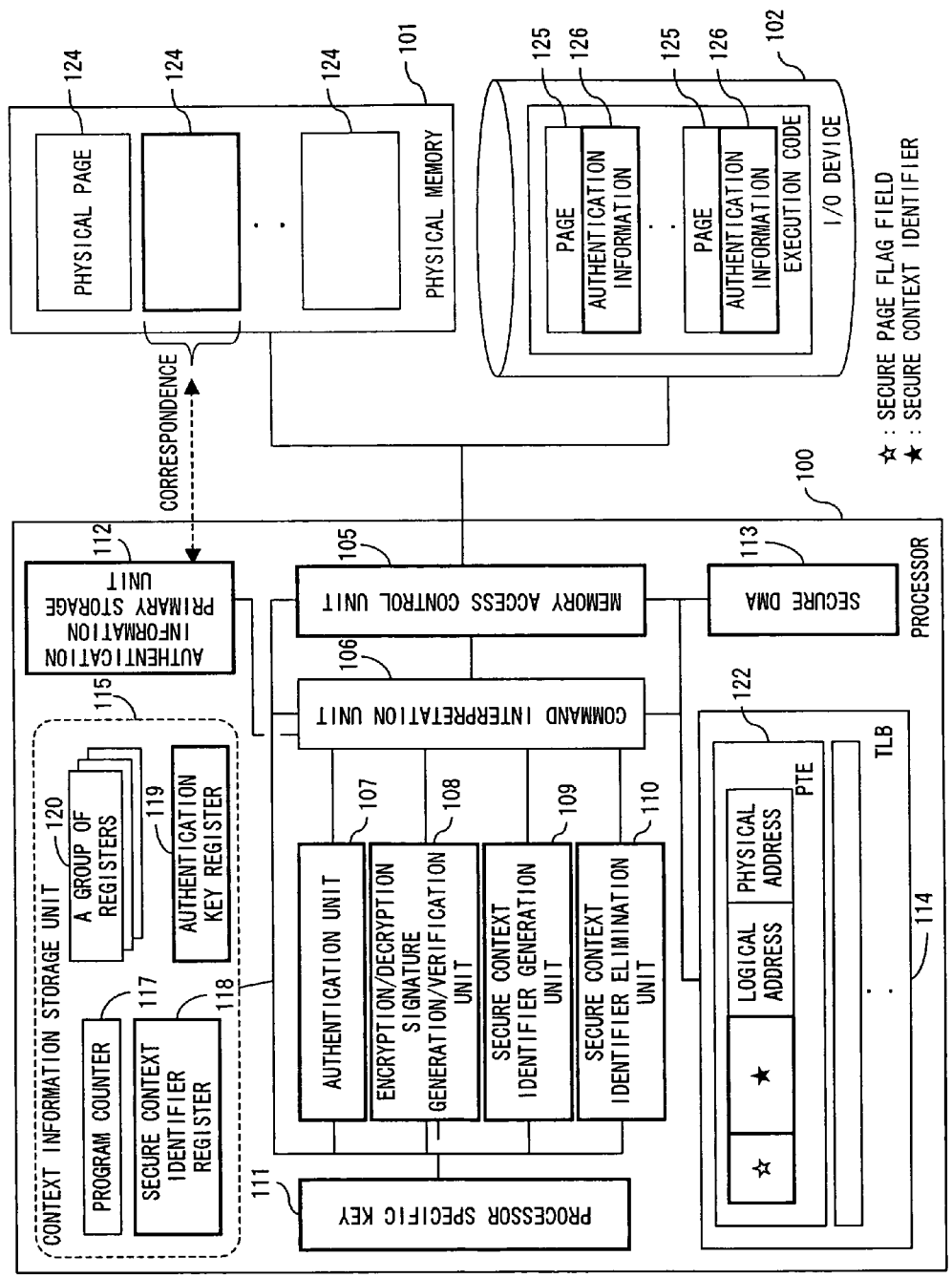
FIG. 44 is a detailed configuration block diagram of the processor system in the fifth embodiment.

FIG. 44 is a functional configuration diagram which is necessary in the processor in order to explain the fifth embodiment. In this figure, the processor 100 is connected to a physical memory 101, for instance, a main memory 17 in FIG. 2, an I/O device 102, for instance, a secondary memory 18.

The processor 100 comprises a memory access control unit 105 which controls accesses to a physical memory 101 and an I/O device 102, a command interpretation unit 106 which interprets the commands to be executed, an authentication unit 107 which performs an authentication of the page storing the execution code, an encryption/decryption and signature generation/verification unit 108 which performs, for instance, encryption/decryption of the page which has been authenticated, a secure context identifier generation unit 109 which generates a secure context identifier corresponding to a process, namely a context, when generating the process a secure context identifier elimination unit 110 which eliminates the corresponding identifier when eliminating the process, a processor specific key 111 which is used for encryption an authenticated information primary storage unit 112 which stores the authenticated information corresponding to the physical page stored in, for instance, the physical memory 101, and a secure DMA 113 for direct memory accessing when accessing the memory.

The interior of the processor 100 comprises the translation look aside buffer (TLB) 114 as explained in FIG. 39 and a context information storage unit 115. TLB 114 stores the page table entry (PTE) 122 which indicates correspondences between the logical addresses and physical addresses with reference to, for instance, physical page. And the context information storage unit 115 comprises a program counter (a counter to retain the value of the program counter) 117, a secure context identifier register 118 storing the secure context identifier, an authentication key register 119 storing the key required for authentication, and a group of registers 120.

Also, the physical memory 101 stores, for instance, the execution codes for every unit of physical page 124, and the I/O device 102 stores execution codes and the data are stored in the format which authenticated information 126 is added for every unit of page 125. In the seventh embodiment, the authentication of the execution code of the context (process) whose the secure context identifier is stored in the secure context identifier register 118 is carried out using an authentication key stored in the authentication key register 119.

FIG. 45 is an explanatory diagram of a method of generating a secure context identifier corresponding to the context when a program operated on the processor, for example, a program used by users, is activated and a context generation command is issued. The context generation command is given to the command interpreting unit 106 in the processor, a secure context identifier is generated by the secure context identifier generation unit 109 in response to the results of the interpretation, and its value is set in the secure context identifier register 118. In the fifth embodiment, the system is configured so that the value can be set in the secure context identifier register 118 only by this method. Therefore, it is impossible to tamper the secure context identifier so as to disguise another context. The context is a concept basically based on object-oriented programming. More generally, it corresponds to the execution status of a process, that is, the execution status of a program. In the fifth embodiment, the term "context" is used instead of process.

FIG. 46 is an explanatory diagram for an actual method of generating a secure context identifier. A random number generator 127 as shown in this figure or a monotonous increment counter 128 can be used for its generation. The probability that the same values are generated as random numbers is not zero and after the initial one cycle, the counter values present the same values. Thus, strictly, uniqueness as an identifier can not be guaranteed. However, it is possible to substantially avoid the occurrence of such a problem by using a secure context identifier with a sufficiently long bit length.

Alternatively as shown in the figure, the existing context ID of the processor can be combined with an output of the random number generator 127 at the joint unit 129, or with an output of the monotonous increment counter 128 to generate a secure context identifier. The existing context ID is an arbitrary value which is set up by the OS and its uniqueness is not generally guaranteed.

Figure 47:
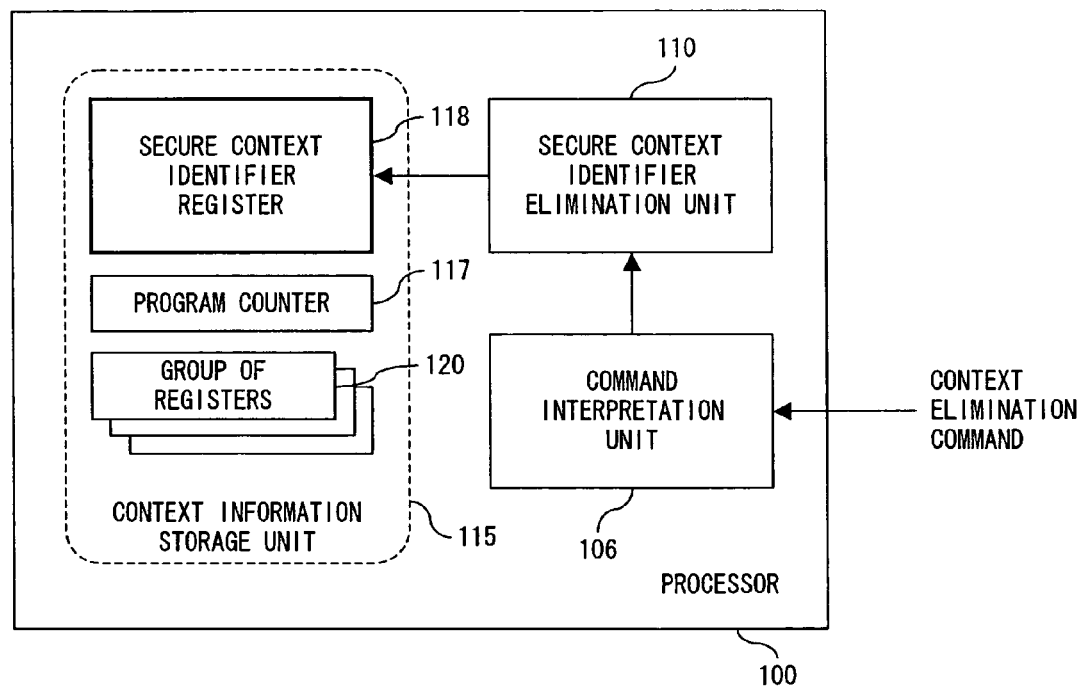
FIG. 47 is an explanatory diagram of a system for eliminating the secure context identifier.

FIG. 47 is an explanatory diagram of a method of eliminating the secure context identifier. In this figure, when the program operated on the processor issues a context elimination command, the processor makes the contents of the secure context identifier register 118 invalid. The method of invalidation can be achieved by 0 clearance or a storage area is given for a flag expressing valid/invalid in the register and then the flag can be set to be invalid.

Figure 48:
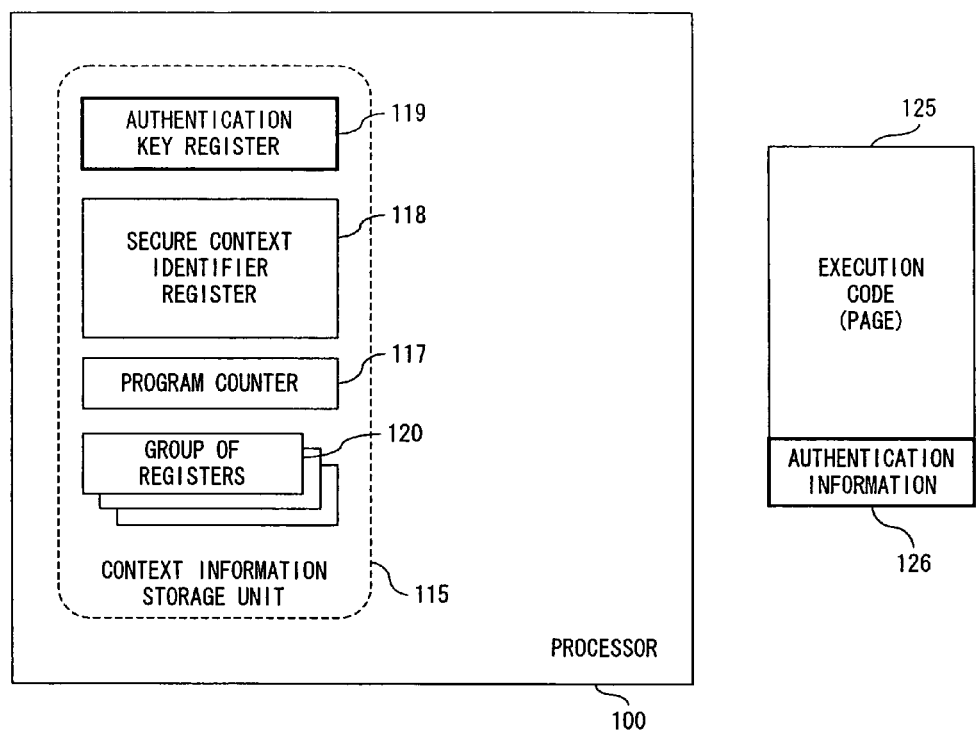
FIG. 48 is an explanatory diagram of authentication information added to the execution codes.

FIG. 48 is an explanatory diagram of authentication, for example, information 126 to be added to the execution code 125 for every unit of page in FIG. 44. In the authentication key register 119 in the context information 115 within the processor, a key is stored for an authentication processing of the execution code 125 by using the authentication information 126 is stored. For example, if an electronic signature by RSA is used as the authentication information, a RSA public key is used as an authentication key, but if SHA (secure hash algorithm)-1 HMAC (hash-based message authentication code) are used as a shared key system, the authentication key is a value of 20 bytes.

A key is stored in the authentication key register 119 when a context is generated by the OS, namely at the stage when the context information is initialized, while checking legitimacy of the authentication key at the same time. If the authentication key itself is generated by a hostile person and the authentication information corresponding to the malicious execution code is generated using this key, the authentication processing itself succeeds without any problem and the authentication functions by the processor become disabled. Therefore, how the legitimacy of the authentication key is guaranteed is an important subject of concern.

Figure 49:
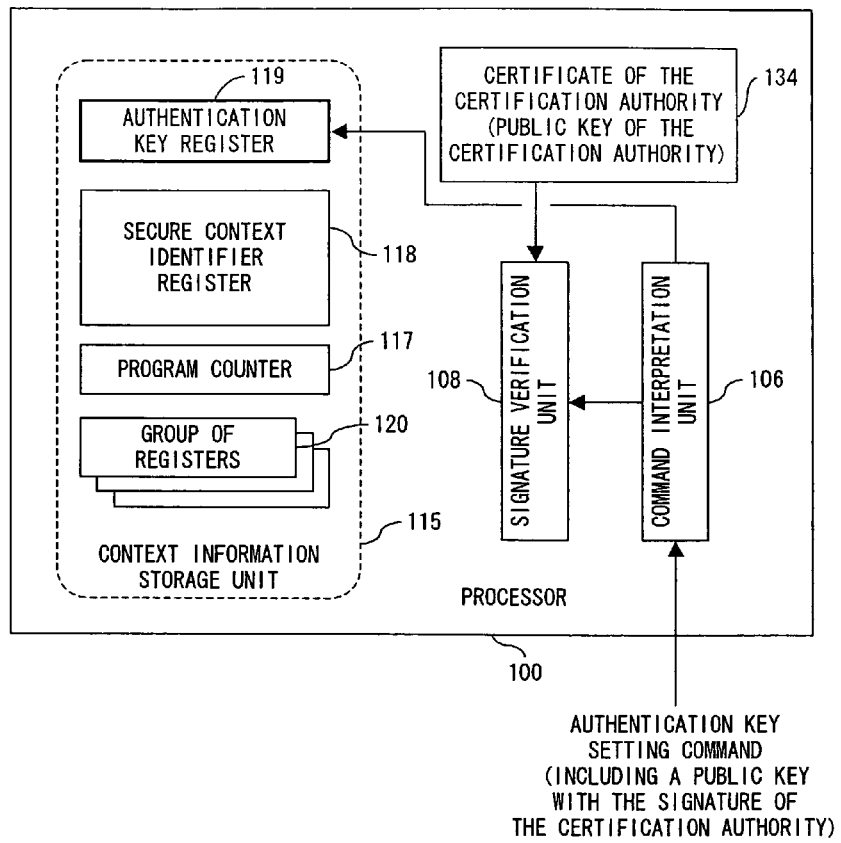
FIG. 49 is an explanatory diagram of a storage system for a public key to the authentication key register.

FIG. 49 is an explanatory diagram of a key setting system in the authentication key register in the case when the authentication key is a public key. In this figure, the authentication key used is assumed to be a RSA public key, and a certificate of the certification authority which is a public key of the certification authority 134 is, for instance, embedded in the processor when shipped from the factory so that subsequent replacement and modification are disabled. The authentication key to be set in the authentication key register 119 is given in the form of a signature by the certification authority secret key. For example, when the context is generated, an authentication key setting command is given to the processor, its command is interpreted by the command interpretation unit 106, and an authentication key is stored in the authentication key register 119 after the authentication key is verified by the signature verification unit 108. As a result, only the public key signed by the certification authority is set up in the authentication key register.

Figure 50:
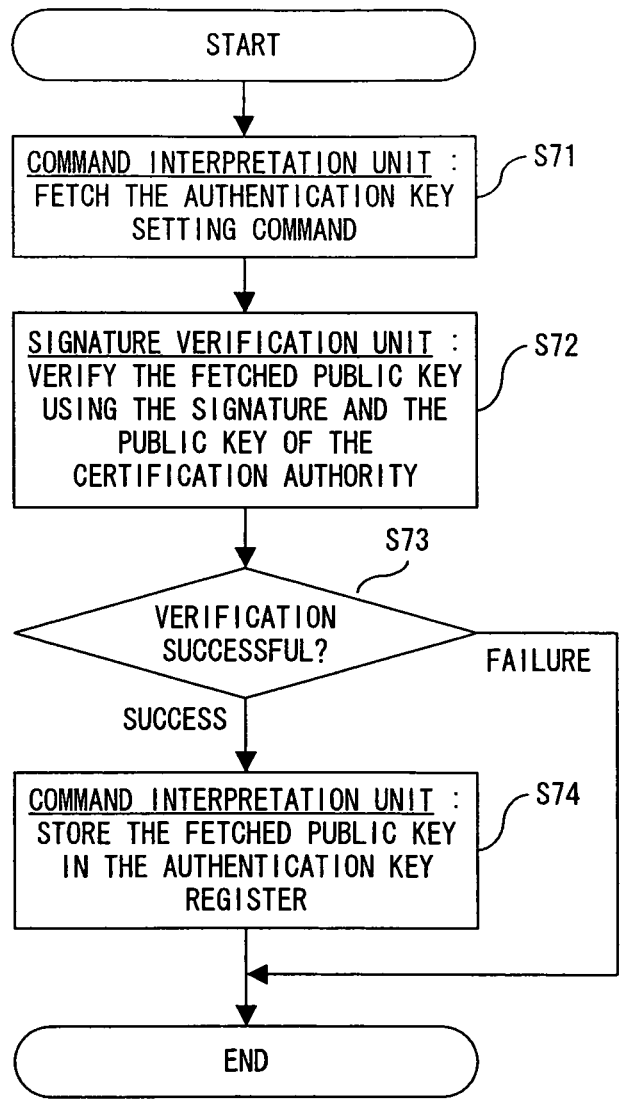
FIG. 50 is a flowchart of a storage processing for a public key to the authentication key register.

FIG. 50 is a flowchart of the authentication key setup processing in FIG. 49. In this figure, initially an authentication key setup command is fetched by the command interpretation unit 106 at Step S71, the fetched public key is verified using a signature and the public key of the certification authority by the signature verification unit 108 at Step S72. Whether or not the verification is successful is determined at Step S73. If it succeeds, the public key included in the setup command fetched by the command interpretation unit 106 is stored in the authentication key register 119 and the processing is terminated. While if verification fails, the processing is terminated immediately.

Figure 52:
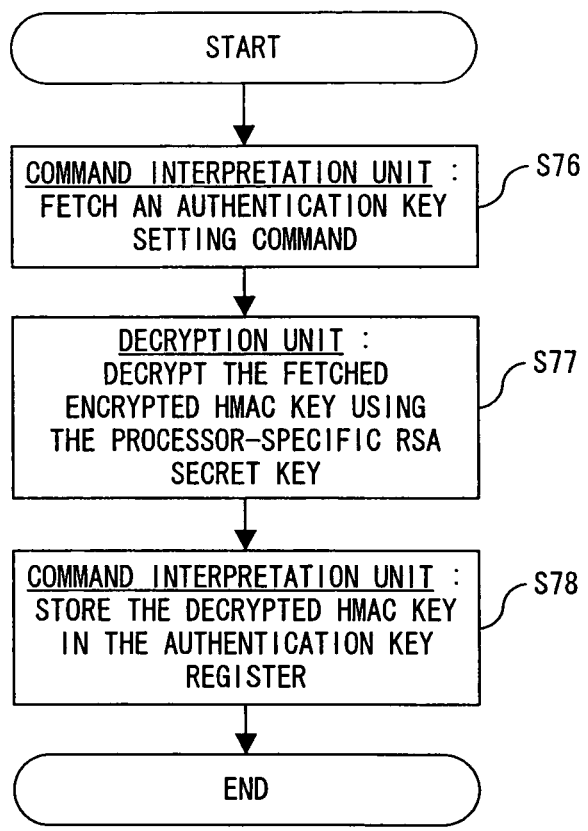
FIG. 52 is a storage processing flowchart of an encrypted shared key to the authentication key register.

FIG. 51 shows a key setup system in the case when the authentication key is a shared key and FIG. 52 is a flowchart of the key setup processing. If a shared key is used as an authentication key, it is necessary to receive an authentication key by a secure method from the side which adds the authentication information to the execution code. In this case, it is assumed that a HMAC key which has been encrypted using the RSA public key is received along with the authentication key setup command and then stored in the authentication key register 119 after decryption using a decryption unit 108 using a processor-specific RSA secret key 137 at the processor side.

In the flowchart shown in FIG. 52, an authentication key setup command is fetched by the command interpretation unit 106 at Step S76, the encrypted HMAC key included in the command is decrypted by the decryption unit 108 using the processor-specific RSA secret key 137 at Step S77, the decrypted HMCA key is stored in the authentication key register 119 by the command interpretation unit 106 at step S78 and then, the processing is terminated.

Figure 53:
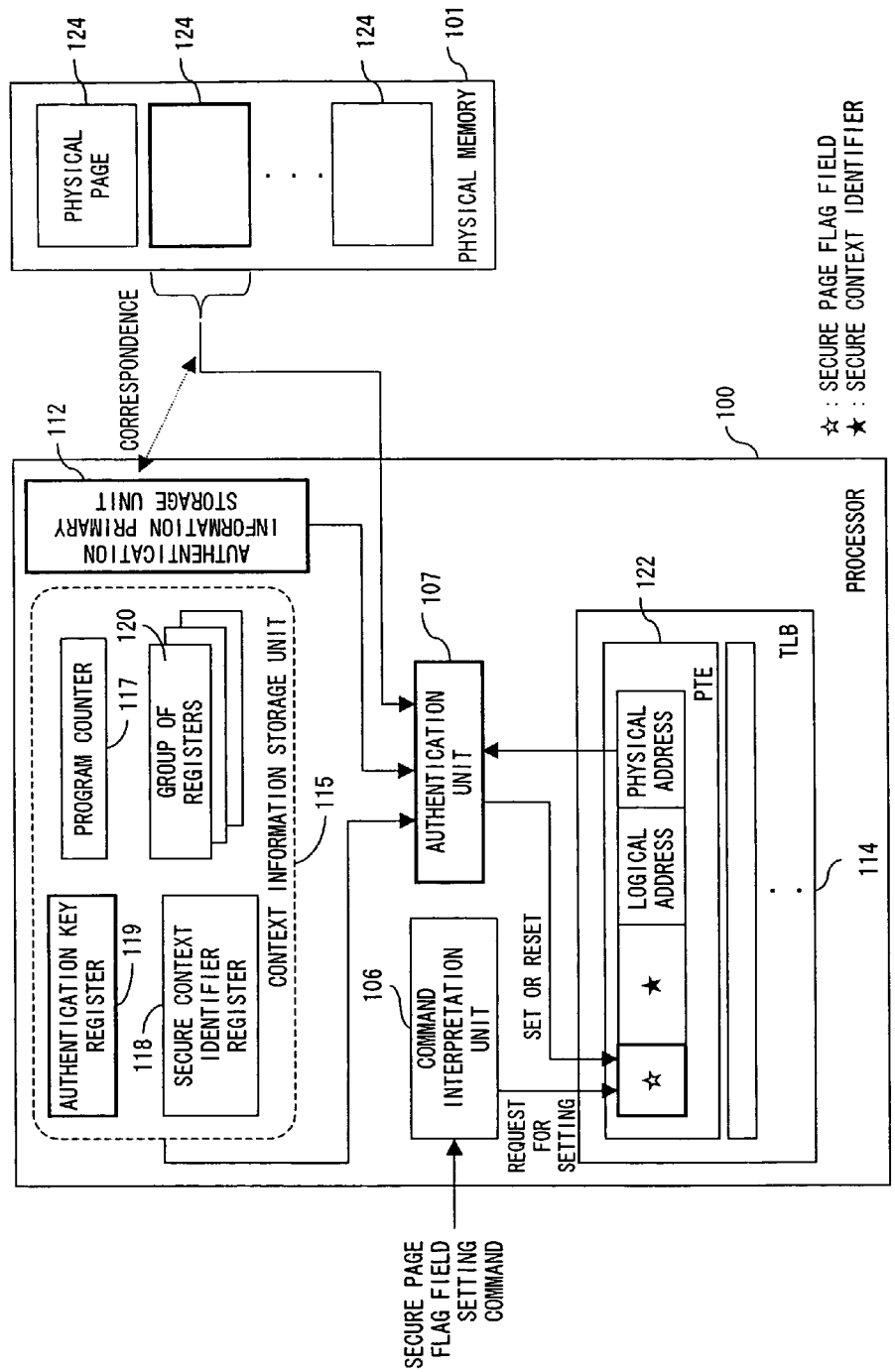
FIG. 53 is an explanatory diagram of a processing system at the time of paging-in to the physical memory.
Figure 54:
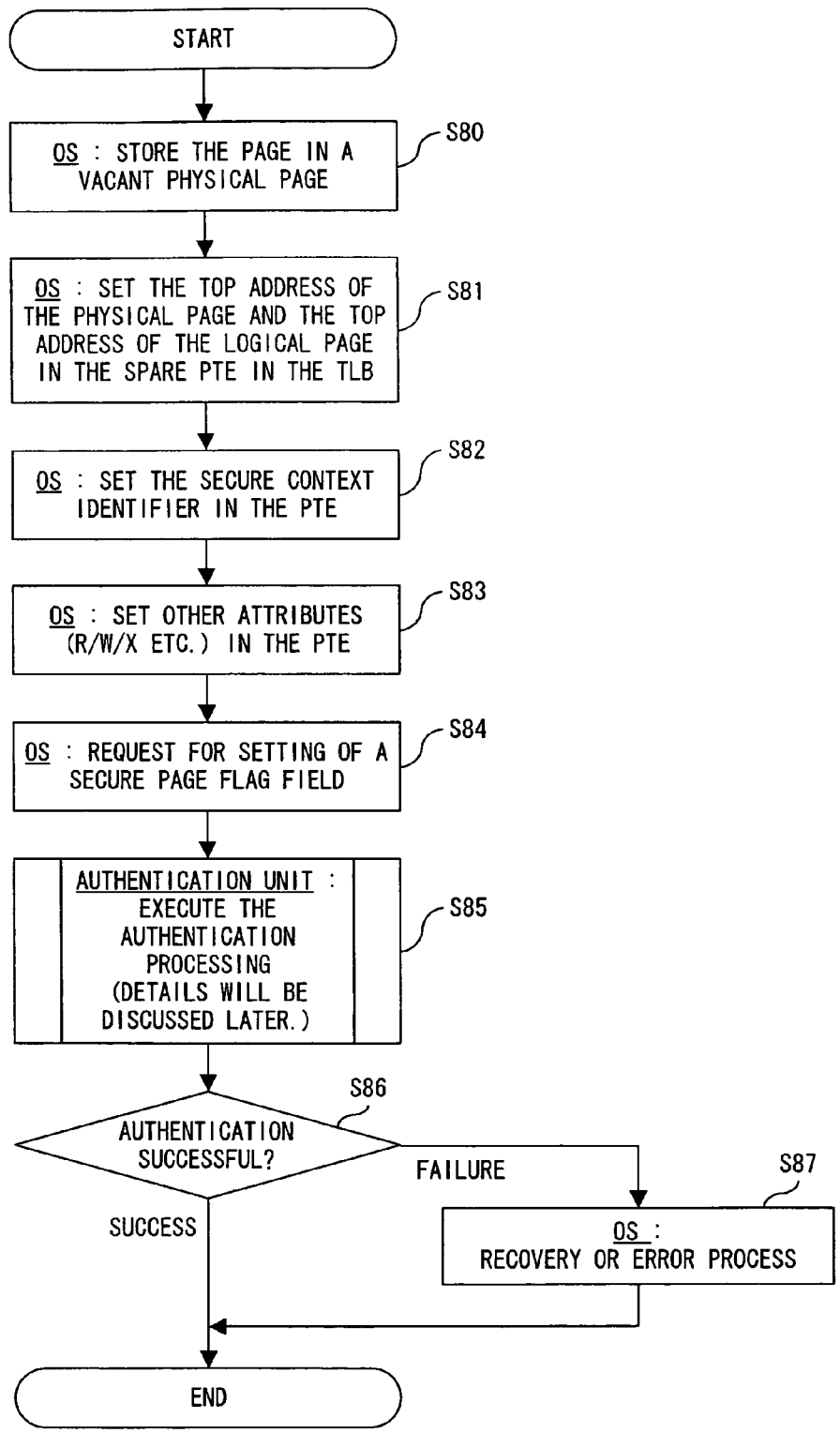
FIG. 54 is a processing flowchart at the time of paging-in to the physical memory.

FIG. 53 is an explanatory diagram of a paging-in system in which an execution code of the context whose secure context identifier has been generated is stored in the main memory, namely in a physical page of the physical memory 101, and the physical page is authenticated in order to enable to start execution of the processing. FIG. 54 is a flowchart of the paging-in processing.

In this paging-in processing, initially the execution code is stored in the physical page and various data in the page table entry (PTE) are setup by the OS, the OS requests as an authentication request for the context, namely the physical page that the authentication unit 107 sets up a secure page flag field. The physical page is authenticated by the authentication unit 107 in response to the request, and a flag of the secure page flag field is set up such that use of PTE becomes enabled.

Once the processing starts in the processing flowchart in FIG. 54, the execution code is stored in the spare physical page by the OS at Step S80, the top address of the physical page and the top address of the corresponding logical page are set as a physical address and a logical address in the PTE in the TLB by the OS at Step S81, and the value of the secure context identifier is set in the PTE at Step S82. For example, as explained in FIG. 45 and FIG. 46, on the assumption that the secure context identifier which is generated when the context generation command is issued and the secure context identifier which is stored in the secure context identifier register 118 can be read by the OS, the OS sets up the read secure context identifier in the PTE.

Subsequently, if desirable, read/write attributes for that page are set in the PTE by the OS at Step S83, and the OS requests the authentication unit 107 as a hardware to set up a secure page flag field at Step S84. It is primarily assumed that the OS itself has already been authenticated and setting a secure page flag field is basically an OS task, but, here, the authenticated OS requests the hardware to set up a flag.

At Step S85, an authentication processing is executed at the authentication unit 107. The details of this processing will be described later. In this processing, the physical page is authenticated using an authentication key of the context corresponding to the secure context identifier and the authentication information stored in the authentication information primary storage unit 112. Then, whether or not the authentication succeeds is determined at Step S86. If it succeeds, the flag of the secure page flag field is set up and its PTE becomes available for use. In contrast, if it fails, the flag of the secure page flag field is reset and its PTE is disabled for use, and a recovery or error processing is carried out by the OS at Step S89.

The primary target of the processing shown in FIG. 54 is a processor which can directly set a value for the PTE in the TLB. However, for example, in the processor wherein a value is set for PTE on the main memory and the TLP acts as a cache, the processes from Step S80 to Step S83 are carried out for the PTE on the main memory and the operations after Step 84 are carried out at a time when the contents are stored in the cache in the TLB.

Figure 55:
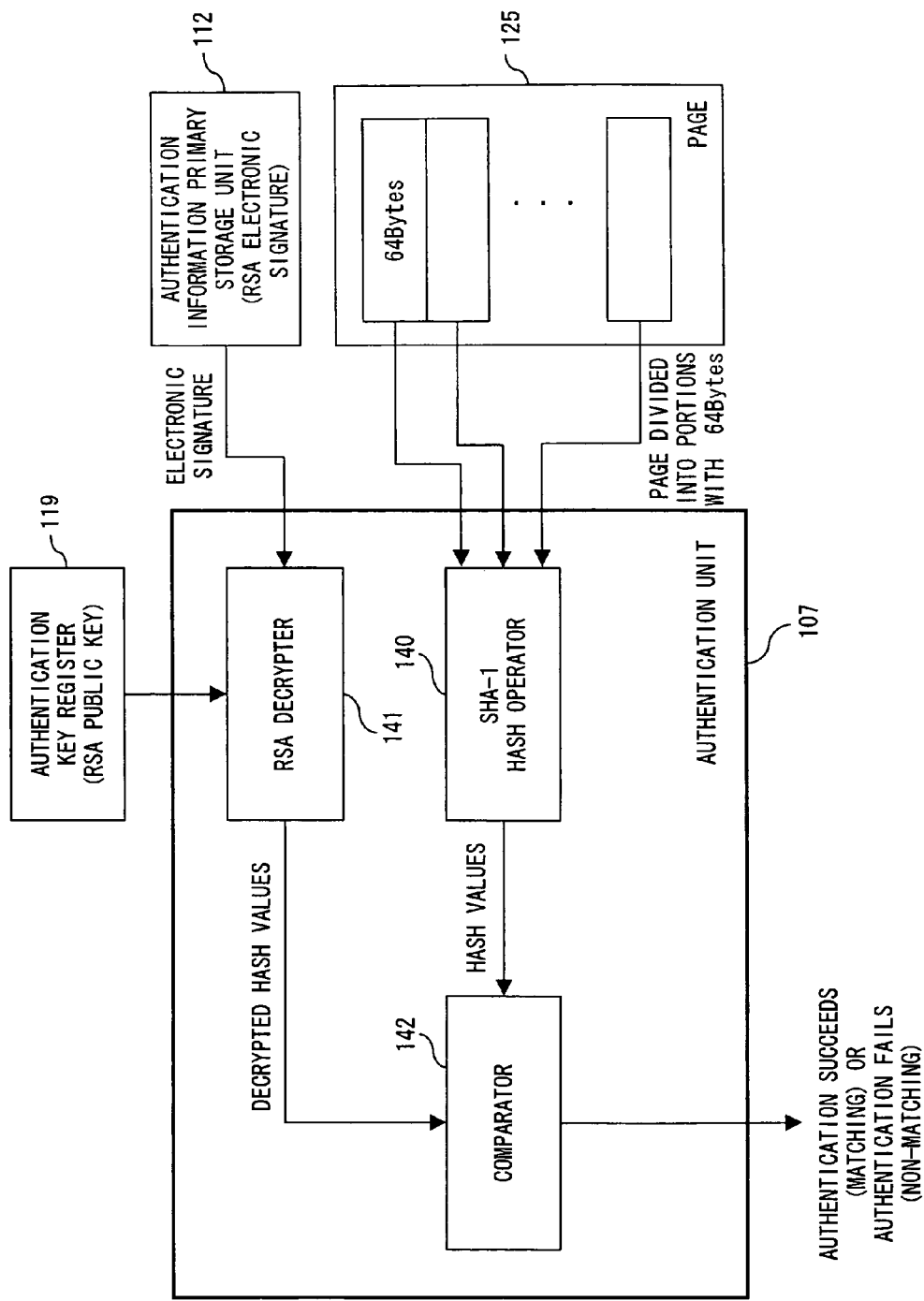
FIG. 55 is a block chart showing the configuration of the authentication unit.

FIG. 55 is a configuration example of the authentication unit 107 shown in FIG. 53, and FIG. 56 is a flowchart of the authentication processing at Step S85 shown in FIG. 54. In this case, a SHA-1 hash value is calculated for the entire page and compared with the results of decryption of the electronic signature. As shown in FIG. 56, it is naturally possible to implement the operation of the authentication unit 107 as a processing by software rather than by hardware.

In FIG. 55, the physical page 125 is divided in a portion of 64 bytes which is given to the SHA-1 hash operator 140, where the hash values on the entire page are calculated and given to the comparator 142. In contrast, the RSA electronic signature stored in the authenticated information primary storage unit 112 is given to the RSA decryption device 141 along with the RSA public key stored in the authentication key register 119 and the decrypted hash values as its output are compared with the output of the SHA-1 hash operator 140 by the comparator 142. The authentication is determined to be successful if they match each other, whereas it is determined to be a failure if they do not match each other.

In the authentication processing shown in FIG. 56, the physical page is read by 64 byte units at Step S90, a hash operation is carried out at Step S91, and whether it reached the end of the page is determined at Step S92. If it did not reach the end of the page, the processing at Step 90 and after is repeated.

If it reached the end, the electronic signature proceeds with the decryption processing using the RSA public key at Step S93 and the results of decryption are compared with the results of hash operation at Step S94. If they match each other, a secure page flag field is set up at Step S95, whereas if they do not match each other, the secure page flag field is reset at Step S96 to end the processing.

As mentioned above, in the fifth embodiment, the execution code is authenticated when paging-in the execution code into the physical memory (main memory) and a secure page flag indicating that the authentication was successful is set up.

Figure 57:
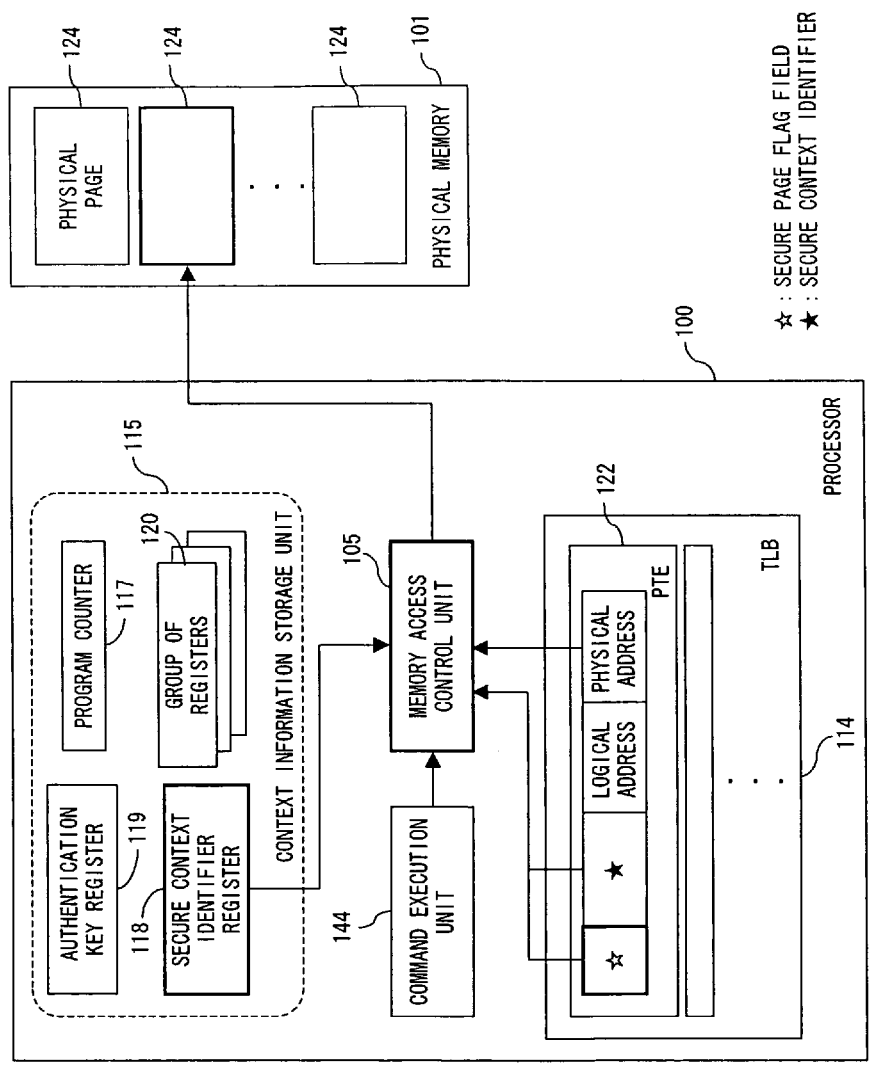
FIG. 57 is an explanatory diagram for an access check system by the memory access control unit when using pages in the fifth embodiment.

Next, the memory access control when executing the commands on the physical page in the present invention will be explained with reference to the sixth embodiment. FIG. 57 is an explanatory diagram of a memory access control system when executing the commands on the physical page. In this figure, if a meaningful value is present in the secure context identifier register 118, and if a secure page flag field of the PTE 122 is set up, and if the value of the identifier stored in the secure context identifier register 118 and the value of the context identifier on the PTE 122 match each other, execution of the commands on the physical page 124 is permitted. This control is carried out by the memory access control unit 105. In this case, checking read/write attributes of the data and supervisor attributes corresponding to the physical page are not directly related to the contents of the present invention and are performed separately.

Figure 58:
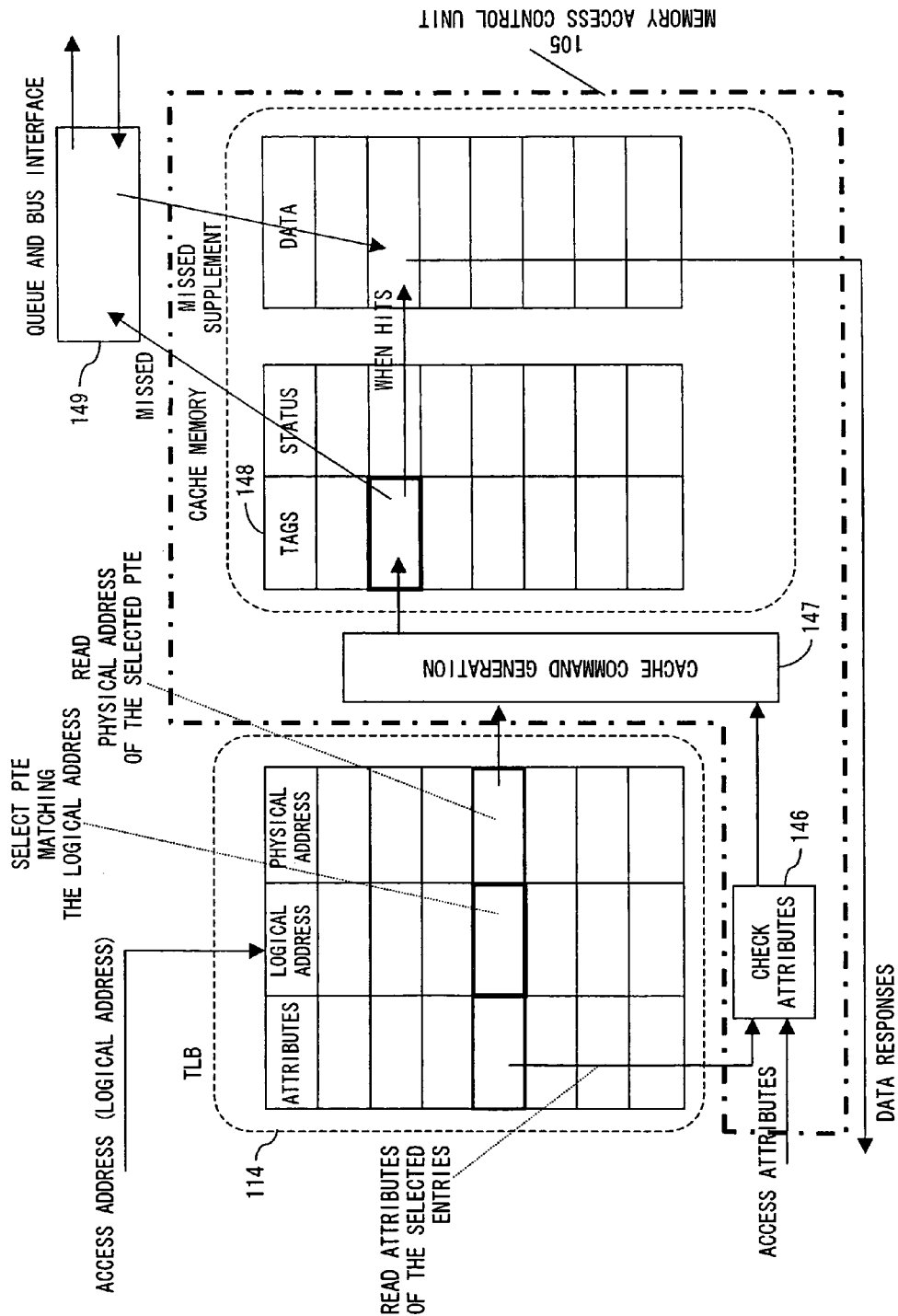
FIG. 58 is a diagram explaining the operational example at the memory access control unit.

FIG. 58 is an explanatory diagram of the operational example of the memory access control unit 105. In this figure, the contents enclosed by the thick dotted line correspond to the memory access control unit 105. In addition, the secure page flag field and the secure context identifier are included as attribute data of the PTE in the TLB 114.

As in FIG. 39, if an access is made using the logical address as an access address, the attribute data of the PTE selected by this address are read and compared with the access attribute by an attribute check 146. If the checked results are OK, a cache command 147 is generated using the physical address read corresponding to the logical address and the attribute checked results, and for example, a tag 148 in the cache memory 45 is retrieved, and the data response is directly returned in the case when the cache is hit. Whereas in the case when the cache is missed, for example, the data loaded from the main memory are stored in the cache memory via the queue and bus interface 149, and the data response is returned to the execution unit.

Figure 59:
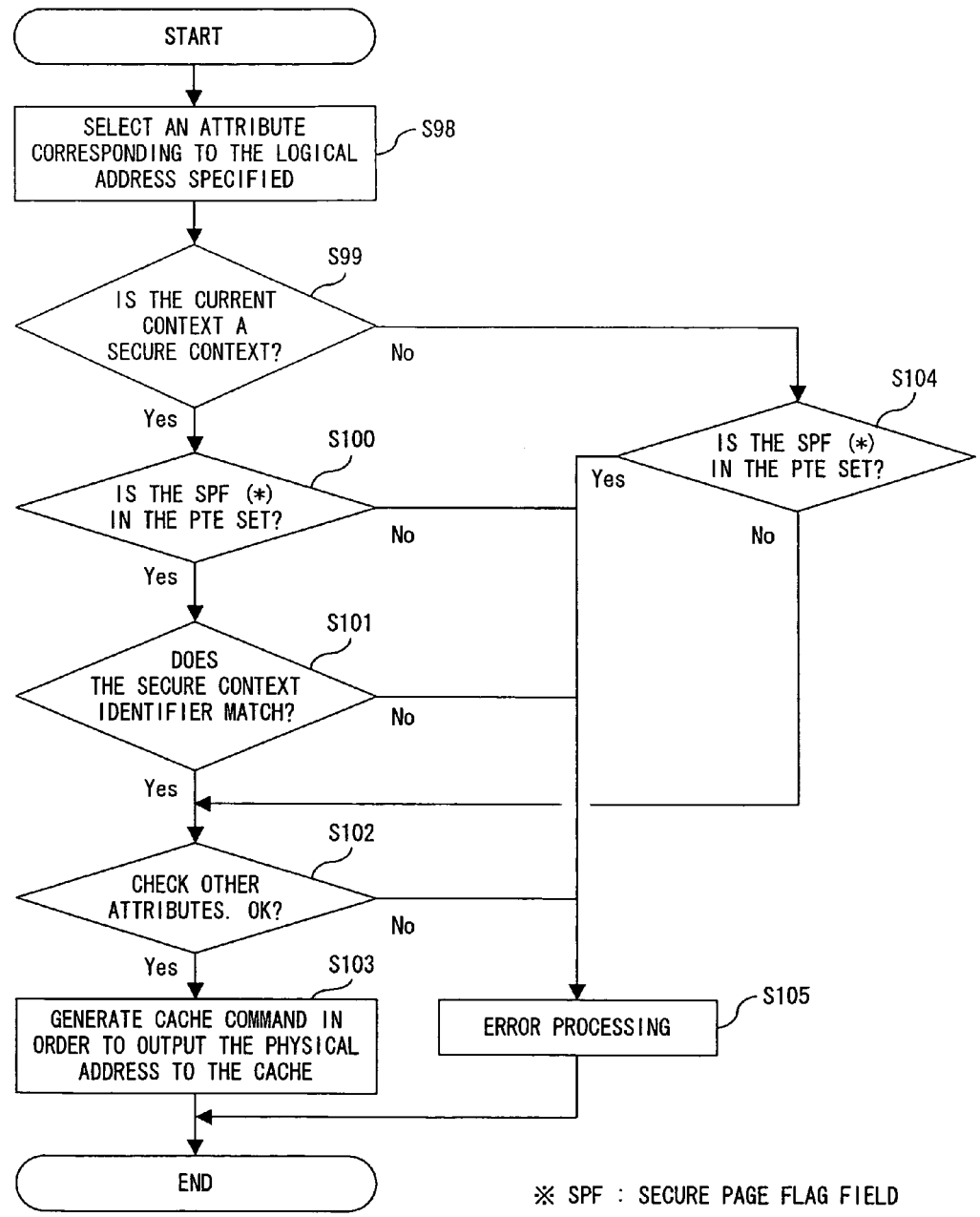
FIG. 59 is a processing flowchart of a memory access control unit when fetching instructions.

FIG. 59 is a processing flowchart of the memory access control unit 105 when fetching the commands. If a logical address is output for command fetching by the command execution unit 144 shown in FIG. 57, attribute data of the PTE corresponding to the logical address specified at Step S98 are selected. And whether or not the current context, namely the context to be currently executed is a secure context, that is, whether or not the context has a valid secure context identifier is present, is checked at Step S99. If the current context is a secure context, whether or not a secure page flag field (SPF) of PTE corresponding to the context is set up is checked at Step S100. If it is set up, whether or not the secure context identifier of the current context, namely the identifier stored in the secure context identifier register 118 matches with the secure context stored in the PTE is determined.

If matching, read/write attribute and supervisor attribute as page attributes corresponding to the context are checked at Step S102. If it is OK, a cache command is generated for outputting the physical address to the cache for command fetching at Step S103 to end the processing.

If the current context does not have an effective secure context identifier at Step S99, whether or not a secure page flag field (SPF) in the corresponding PTE is set up is determined at Step S104; if it is not set up, no secure context identifier is set up and the same execution code as normal without authentication should be processed and it shifts to the processing at Step S102. If the results of the decision at Step S100 and S102 are NO, it will be treated as an error processing at Step S105 to terminate the process. A process of dissociating the logical address into the top address of the logical page and the offset values in the page and a process of adding the top address of the physical page and its offset values are necessary, but these processes are not directly related to the present invention and an explanation will be omitted.

Figure 60:
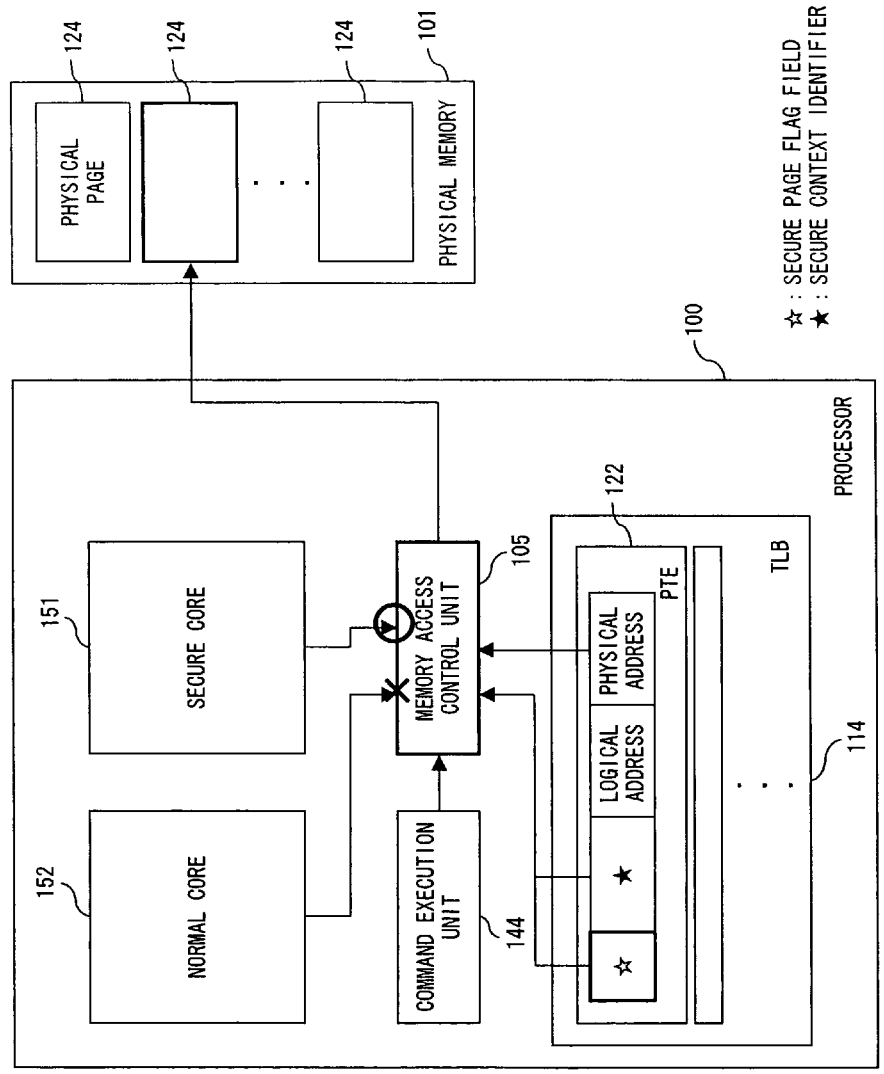
FIG. 60 is a diagram explaining an access control system when using pages from the secure core and the normal core.

FIG. 60 is an explanatory diagram of a memory access control system in the processor having a secure core and a normal core. In this figure, the normal core 152 performs only the conventional processes, which are not related to the processes by the encryption processing block 12 and the code authentication processing block 13, as those shown in FIG. 12 in the first embodiment, while the secure core 151 can execute secure operations including the authentication control of the code authentication processing block including the control of the operations by the encryption processing block which are not explained in FIG. 44.

In FIG. 60, with the control by the memory access control unit 105, the secure core 151 is allowed to use the physical page corresponding to the PTE in which a secure page flag field has been set up, but it is controlled that the normal core cannot use the page.

In FIG. 44, the code authentication processing block controlled by the secure core includes the memory access control unit 105, which corresponds to an authentication unit 107, an encryption/decryption, signature generation/verification unit 108, a secure context identifier generation unit 109, a secure context identifier elimination unit 110, a processor-specific key 111, an authenticated information primary storage unit 112, a secure DMA 113, a secure context identifier register 118, an authentication key register 119, and a secure page flag field and a secure context identifier in the PTE 122.

In FIG. 60, basically the secure core 151 executes only the execution codes in the physical page in which the authentication processing is completed and a secure page flag field is set up in the PTE, and the normal core 152 executes only the regular codes which have not been authenticated. However, it is possible that the normal core can be configured so that the authenticated codes in addition to the regular codes can be executed by the normal core.

Figure 61:
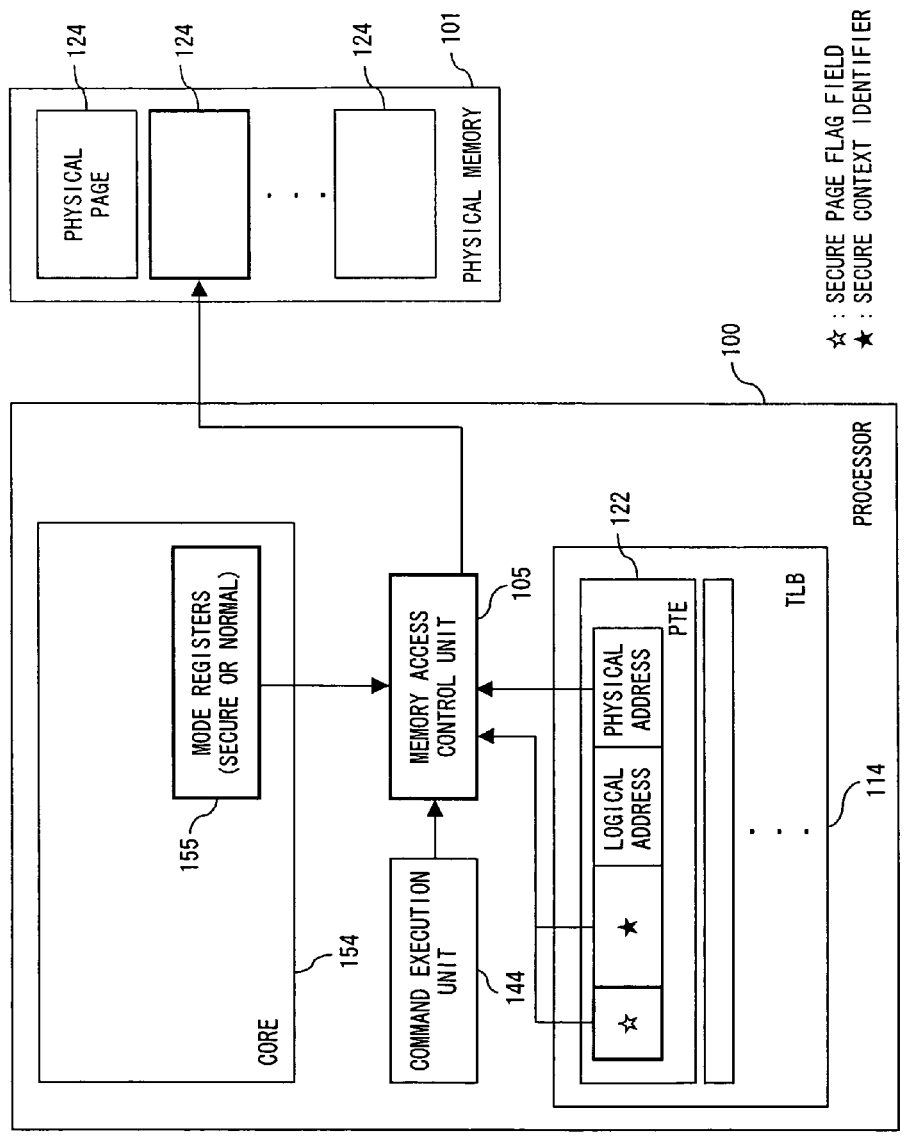
FIG. 61 is a configuration diagram of a processor having a mode register for switching between the secure mode and the normal mode.

FIG. 61 is a configuration block diagram of a processor having a core of switching between the secure mode and the normal mode. In this figure, a mode register 155 is installed in the core 154 and the page in which a secure page flag field is set up can be used only in the case of a secure mode. Switching between the secure mode and the normal mode can be carried out by a method using an interrupt as a trigger as in the case of switching between the normal user mode and the kernel mode, but another method can be used.

Figure 62:
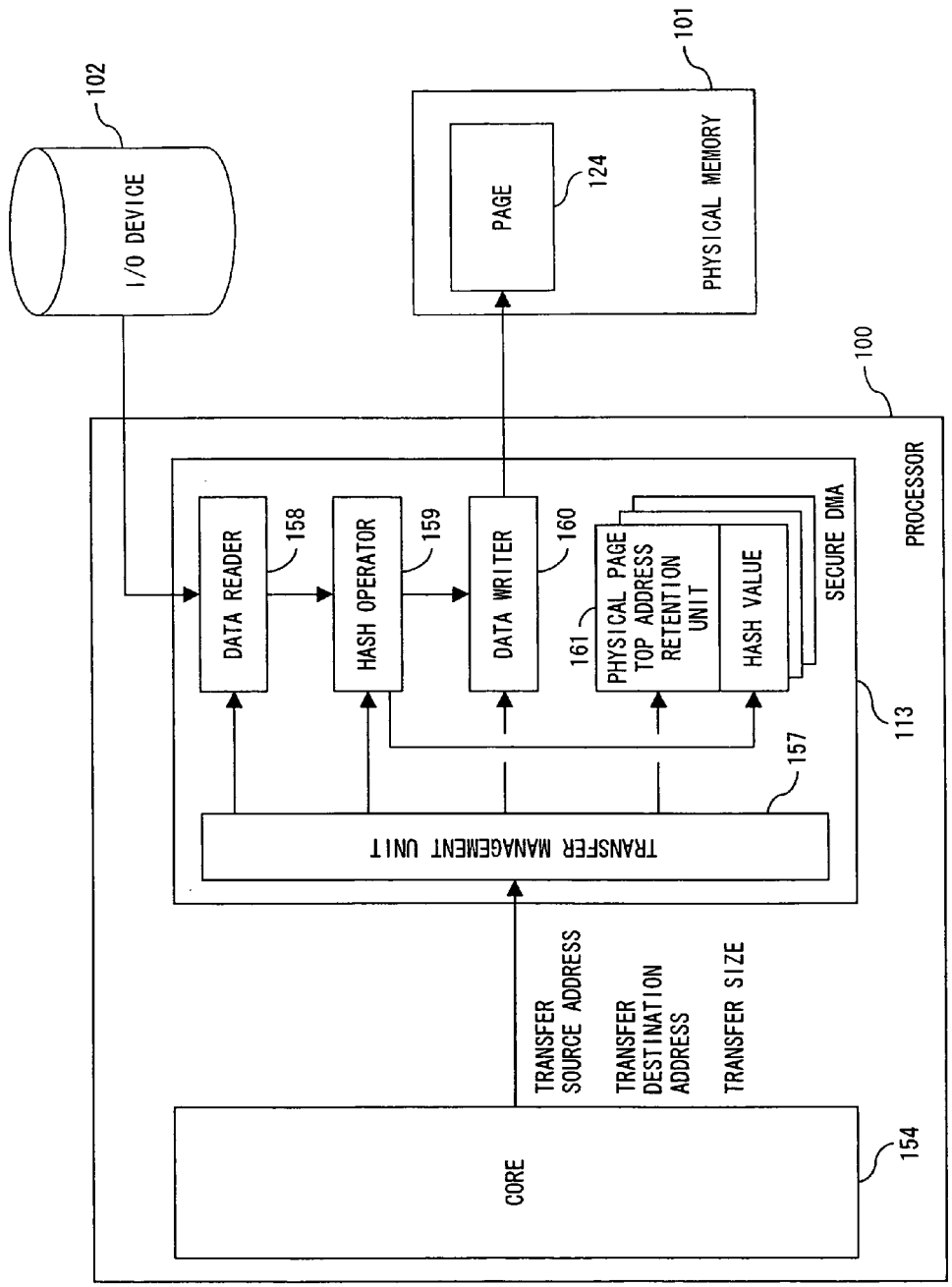
FIG. 62 is a block diagram showing the configuration of the secure DMA.
Figure 63:
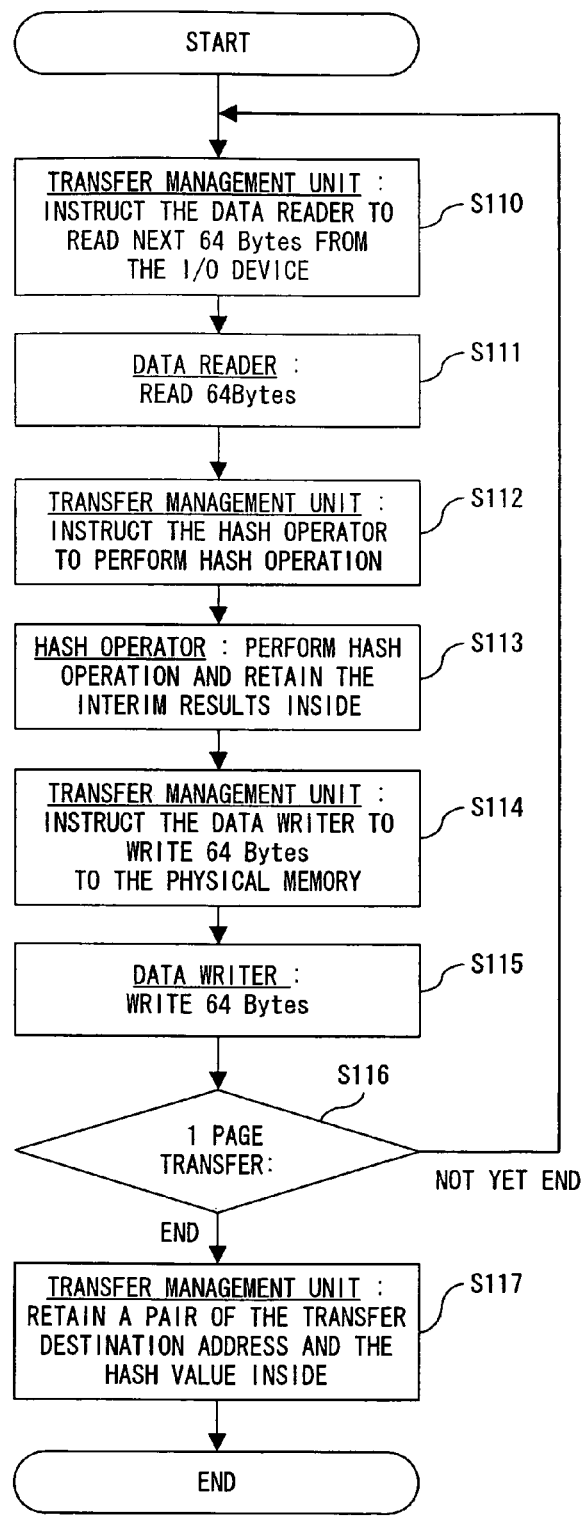
FIG. 63 is a flowchart of a data transfer processing using the secure DMA.

FIG. 62 is an explanatory diagram of a page data transfer system to the physical memory 101 using the secure DMA 113 in FIG. 44, as a memory access control system. FIG. 63 is a flowchart of a data transfer processing using the secure DMA 113. For example, in the paging-in processing in FIG. 53 and FIG. 54, page data as execution codes are initially stored in the physical page and these execution codes are then authenticated. However, since an authentication processing requires a processing such as calculation of the hash values, in this embodiment, the hash values are calculated at each transfer unit of the page data, and the results of the calculation are retained as interim results of the hash operation. These processing are repeated, and the hash operation is completed at the end of transfer so that the results can be used in the subsequent authentication processing.

The secure DMA 113 in FIG. 62 comprises a transfer source address of the data from the core 154, transfer destination address, a transfer management unit receiving the transfer size 157, a data reader 158 which reads data from the I/O device 102, a hash operator 159 for carrying out hash operation, a data writer 160 which writes page data in the physical memory 101, and a physical page top address retaining unit 161 which retains the top address of the physical page and the hash values for the page.

When a processing starts in FIG. 63, the following procedures are taken. Using the program operated on the core 154, generally by the transfer management unit 157 which received instructions such as the transfer source address from the OS. The data reader 158 is instructed to read the next 64 byte data from the I/O device 102, and the 64 byte data are read by the data reader 158 at Step S111. The hash operator 159 is instructed to perform hash operation by the transfer management unit 157 at Step S112 and the hash operation is performed by the hash operator 159 at Step S113. The interim results are retained and, a data writoe 160 is instructed to write 64 byte data to the physical memory 101 is instructed by the transfer management unit 157 at Step S114 and the 64 byte data are written in the physical memory 101 by the data writer 160 at Step S115. Whether or not the data transfer of one page is completed is determined at Step S116. If it is not completed, the processes from Step S110 are repeated, whereas if it is completed, a pair of hash values and the physical page top address as a transfer destination address is given by the transfer management unit 157 to a retention unit 161 to end the processing.

Figure 64:
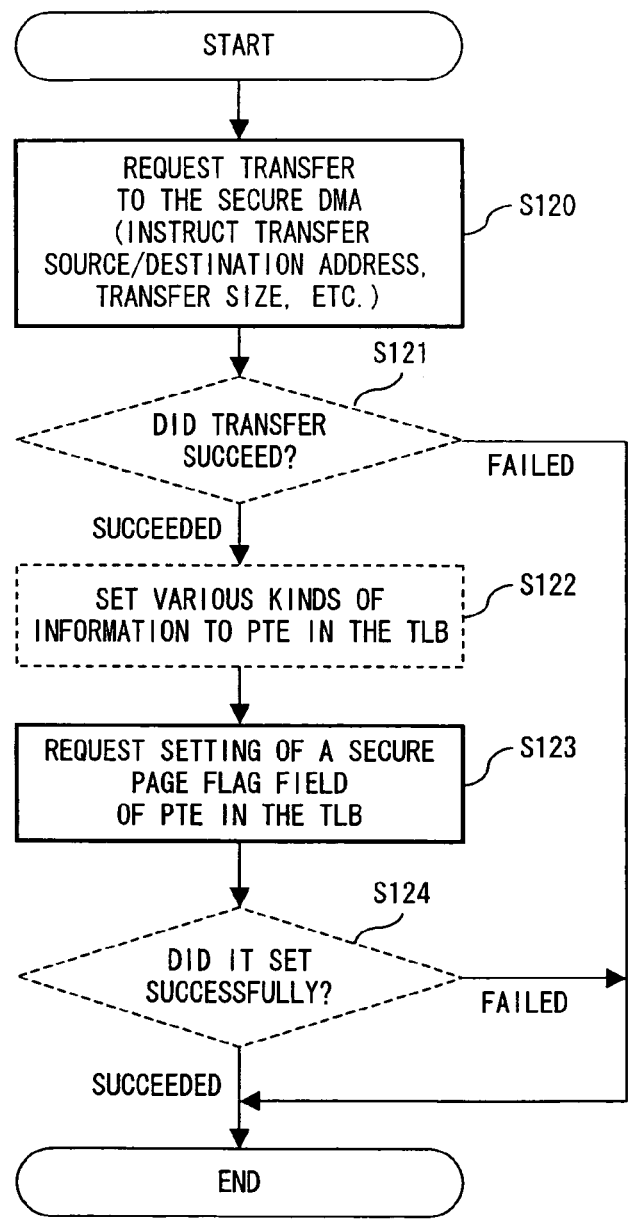
FIG. 64 is a flowchart of a processing at the time of paging-in by the OS.

FIG. 64 is a processing flowchart when executing codes including the memory access control. This figure is a processing flowchart during the paging-in typically by the OS and a characteristic point of the present invention is the processes enclosed by the bold line. When a processing starts, initially the transfer source/destination address, transfer size are instructed to the secure DMA 113 at Step S120 and whether or not the transfer succeeds is determined at Step S121. If it is successful, a variety of information are set up in the PTE within the TLB at Step S122 like as in Steps S81 through S83 shown in FIG. 54, and a request is made to set up a secure page flag field at Step S123 like as in Step S84. After an authentication process is executed at the authentication unit, whether or not a flag is set successfully is determined at Step S124. If it is successful, the processing ends. If the transfer fails at Step S121, or if setting fails at Step S124, the processing terminates immediately.

As mentioned above, according to the sixth embodiment, an accessing even of the execution codes which have been successfully authenticated is only allowed after checking the secure context identifier and the secure page flag field.

Finally, the seventh embodiment of the present invention will be explained with reference to FIG. 65 through FIG. 74. In the seventh embodiment, when context information and PTE corresponding to the context switches is evacuated to, for example, in the main memory, encryption for protecting data or addition of falsification detection information are carried out. For example, in the first embodiment, the authenticated execution codes are encrypted and then stored in the physical memory. In contrast, in the seventh embodiment, the context information is encrypted before being stored in the physical memory.

Figure 65:
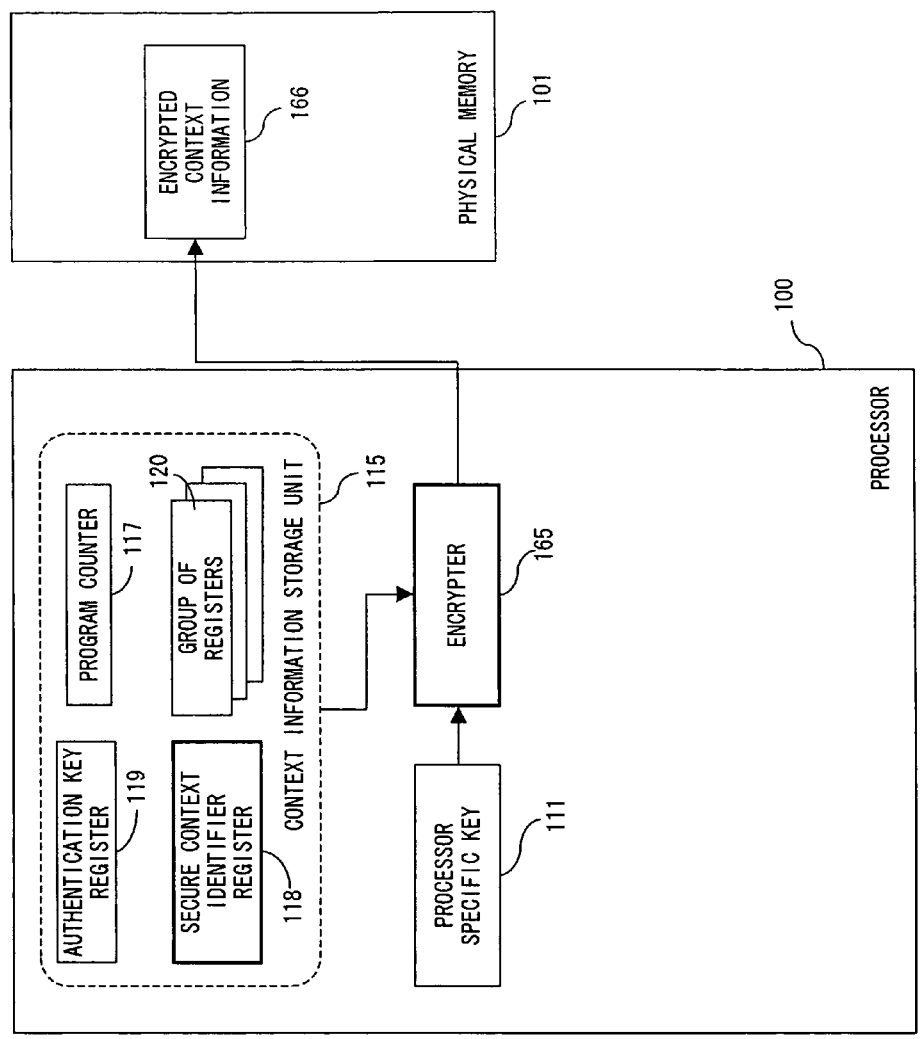
FIG. 65 is an explanatory diagram of a context information encryption system in the seventh embodiment.

FIG. 65 is an explanatory diagram of an encryption method for the context information. In this figure, the entire context information stored in the context information storage unit 115 as explained in FIG. 44 is encrypted using the processor-specific key 111 by an encryption device 165 and the encrypted context information 166 is then stored in the physical memory 101.

Figure 66:
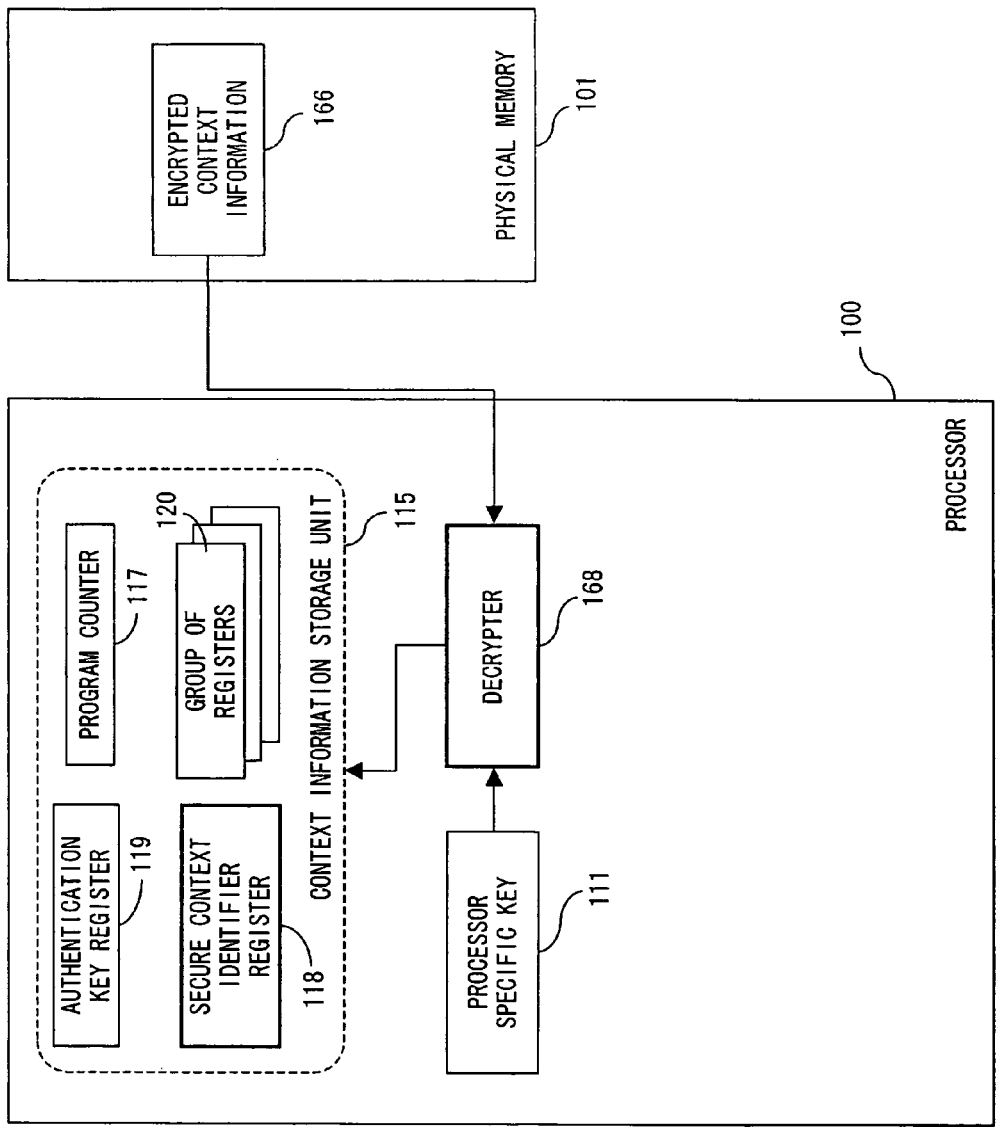
FIG. 66 is an explanatory diagram of a decryption system for the context information.

FIG. 66 is an explanatory diagram of a decryption method for the corresponding context information shown in FIG. 65. The encrypted context information 166 stored in the physical memory 101 is decrypted by a decryption device 168 using the processor-specific key 111 when it becomes necessary by the context switch and the decrypted context information is stored in the context information storage unit 115.

Figure 67:
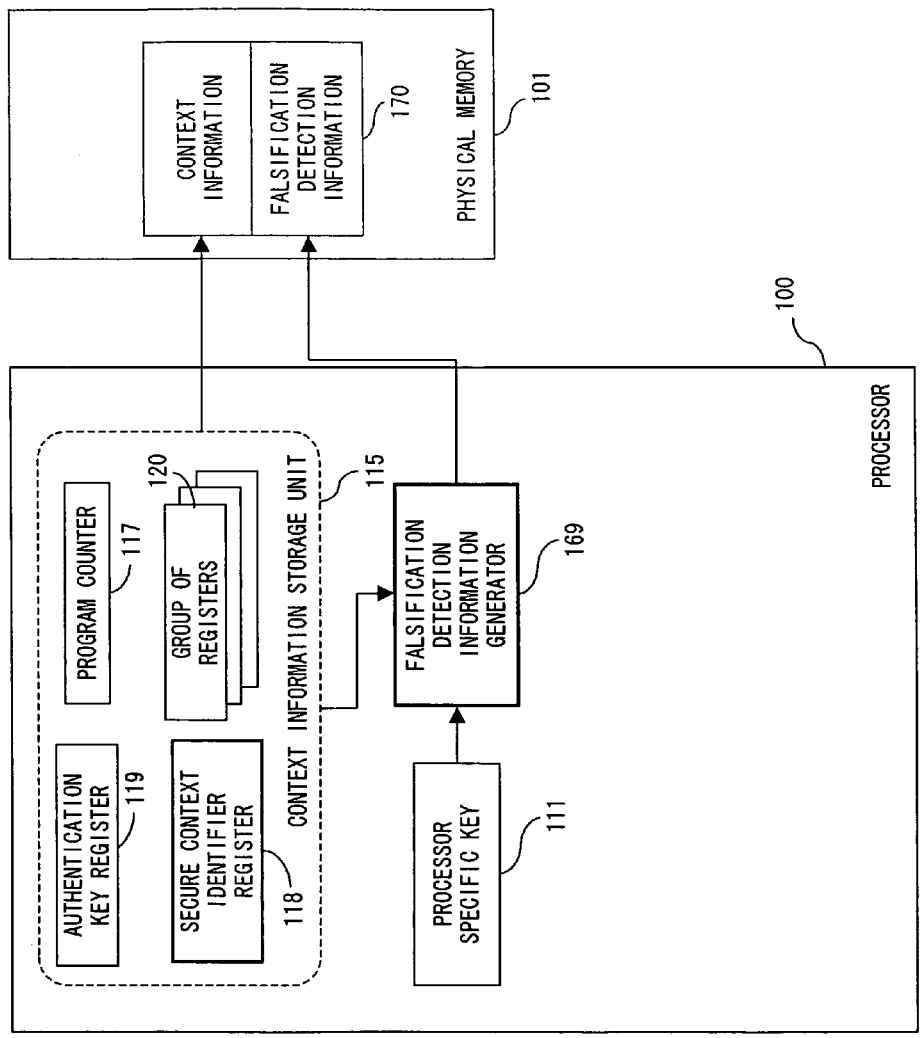
FIG. 67 is an explanatory diagram of a falsification detecting information adding system for the context information.

FIG. 67 is an explanatory diagram of a system of adding falsification detection information to the context information. For the context information stored in the context information storage unit 115 in this figure, falsification detection information 170 is generated by an falsification detection information generator 169 using the processor-specific key 11 and stored in the physical memory 101 along with the context information.

Figure 68:
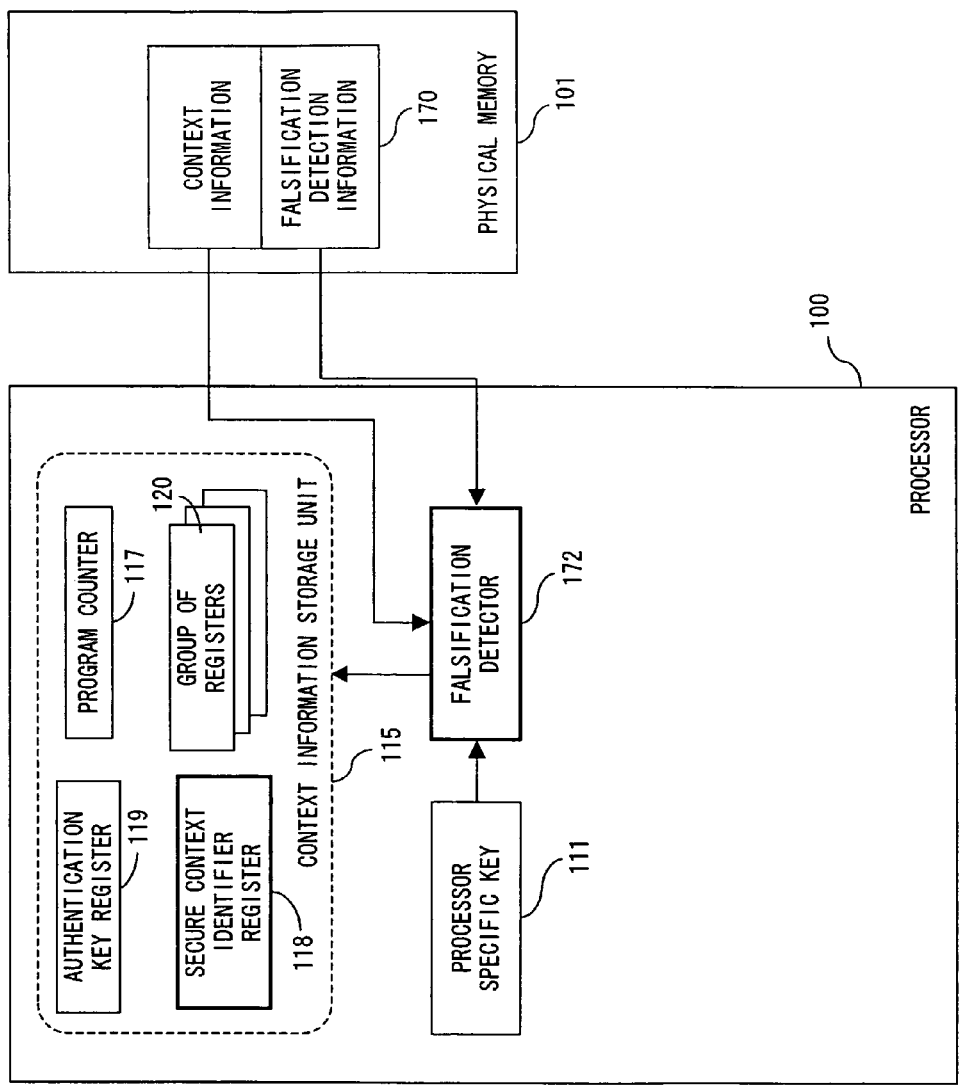
FIG. 68 is an explanatory diagram of a falsification detecting system of the context information.

FIG. 68 is an explanatory diagram of an falsification detection system for the context information using the corresponding alternation detection information shown in FIG. 67. In this figure, using the falsification detection information 170 added to the context information, an falsification using the processor-specific key 111 is detected by an falsification detector 172.

Figure 69:
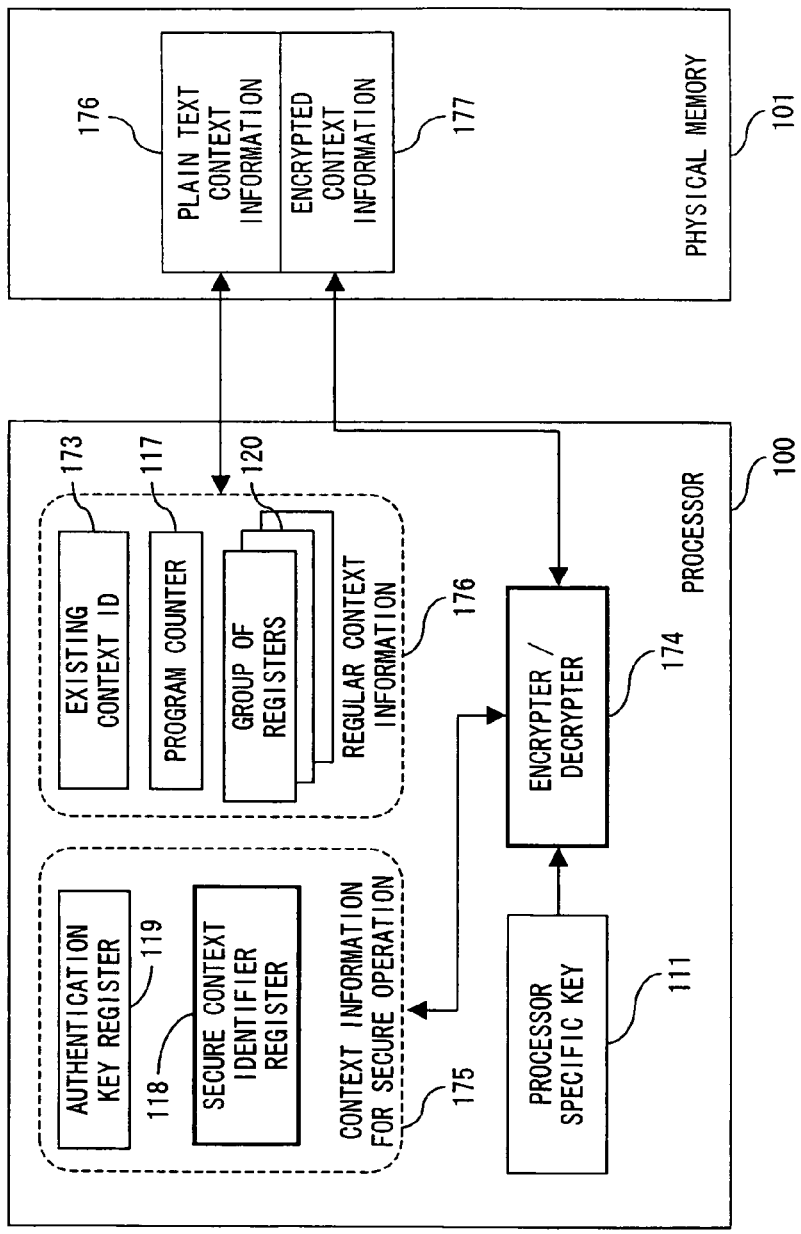
FIG. 69 is an explanatory diagram of an encryption system for the context information for secure operations.

FIG. 69 is an explanatory diagram of a context information encryption system for encrypting only context information 175 for secure operation among the contest information stored in the context information storage unit 115, when context information which is needed for secure operation is differentiated from the regular context information. According to this method, a regular context information 176, namely the context information such as existing context ID is treated without encryption as before without modifications in the portions in the core of the processor as much as possible so that only the contents of storage in the authentication key register 119 and the in the secure context identifier register 118 are encrypted as the context information for secure operation 175.

For the existing context ID, it is possible to store the same value as the secure context identifier as operation of the OS. For example, if the OS is rewritten by malicious codes, there is no guarantee that the values of the two identifiers become identical. If the processor is configured such that the processor can be operated only when the same values are achieved, a security that the processor will not be operated unless the same values are achieved is retained and there will no more problems.

In FIG. 69, only the context information for secure operation 175 is encrypted using the processor-specific key 111 by the encrypter/decrypter 174 so that the encrypted context information 177 is stored in the physical memory 101, while the regular context information 176 remains as a plain text context information 176 to be directly stored in the physical memory 101.

Figure 70:
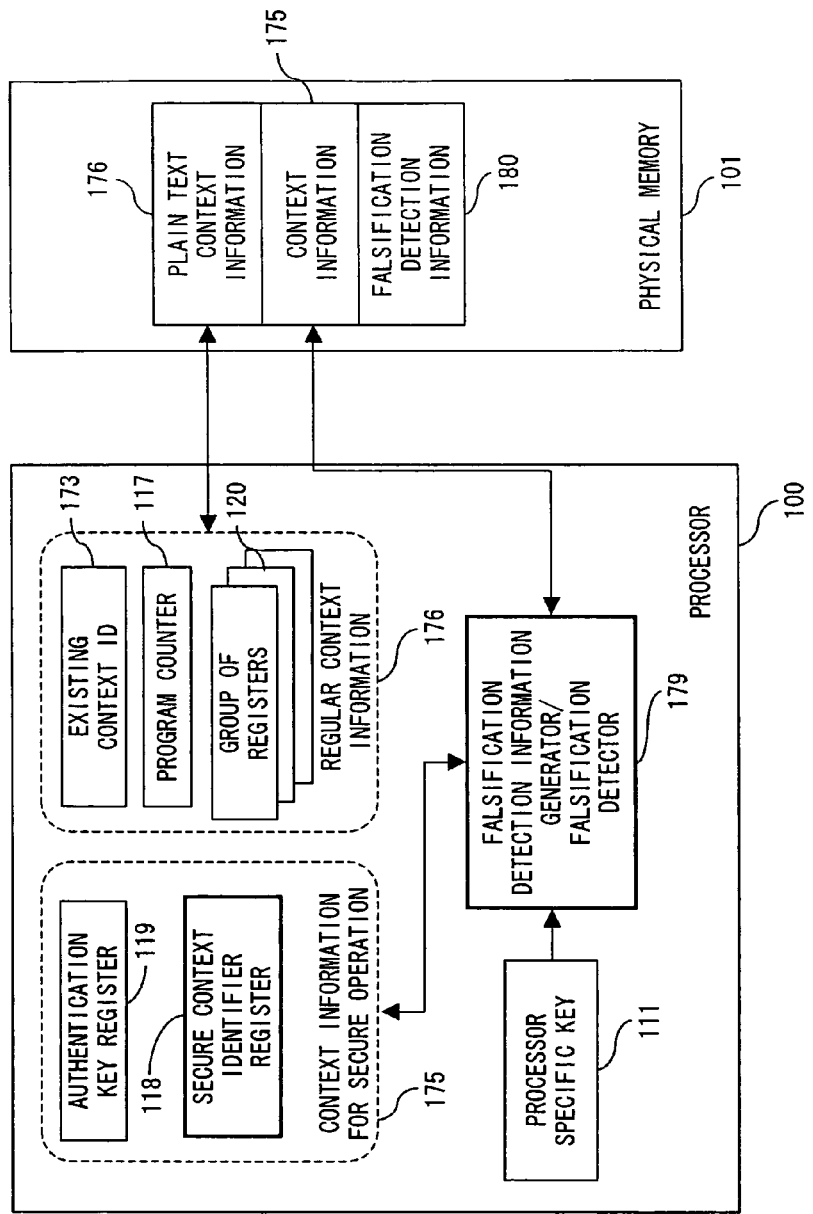
FIG. 70 is an explanatory diagram of a falsification detecting information adding system for the context information for secure operations.

FIG. 70 is an explanatory diagram of a context information storage system which stores falsification detection information added to the context information for secure operation 175 in the physical memory 101. In this figure, falsification detection information 180 is generated for the context information for secure operation 175 using the processor-specific key 111 by an falsification detection information generator/falsification detector 179, and is stored in the physical memory 101 along with the contest information for secure operation 175 and regular context information, namely plain text context information 176. In this case, encryption has not been applied to the values of program counters and the values of the register group as regular context information, but in order to further improve reliability, it is naturally possible to apply encryption to the regular context information or to add falsification detection information.

Figure 71:
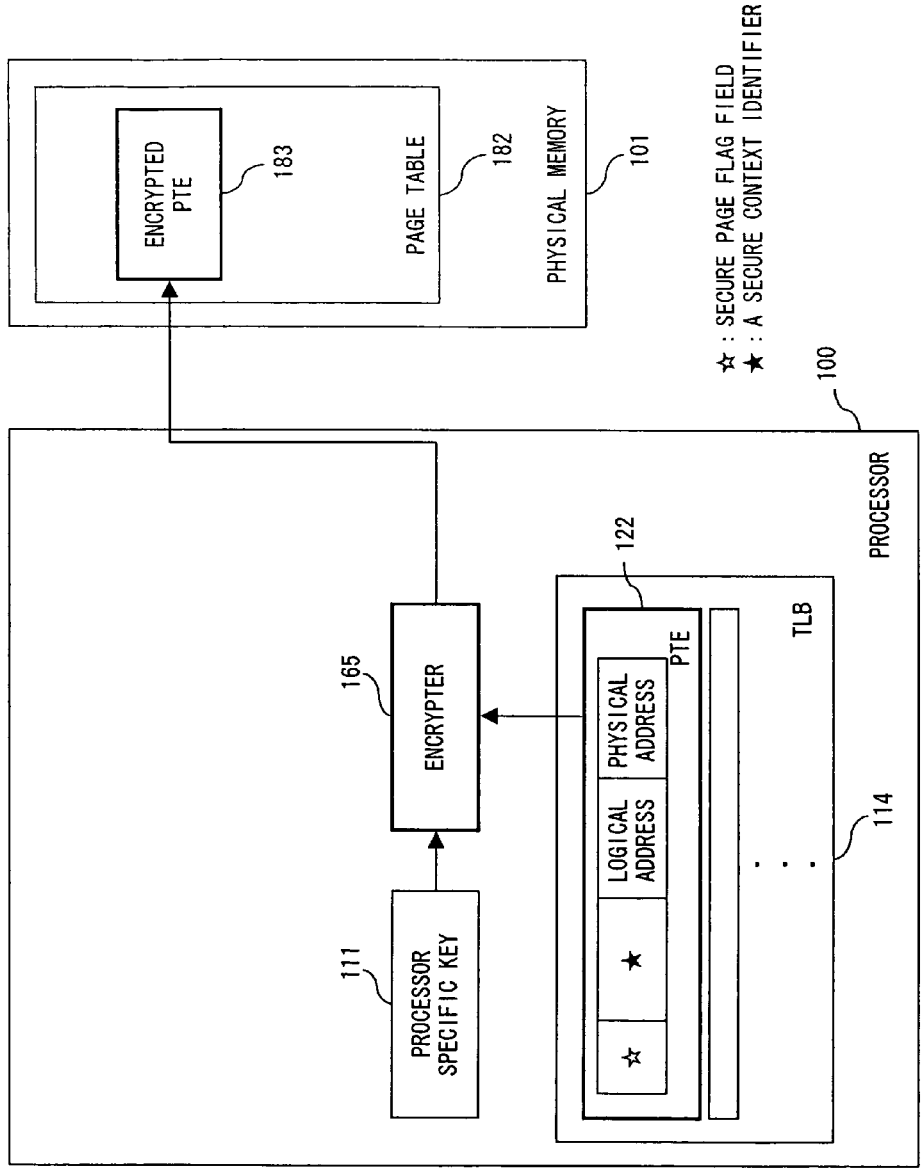
FIG. 71 is an explanatory diagram of an encryption system of the page table entry.

FIG. 71 through FIG. 74 are explanatory diagrams of protective systems for the contents stored in the page table entry (PTE) 122. FIG. 71 shows an encryption system of PTE. The contents stored in the PTE 122, that is, values of secure page flag field, secure context identifier, logical address and physical address values are encrypted by the encrypter 165 using the processor-specific key 111 and the encrypted PTE 183 is stored in the page table 182 in the physical memory.

Figure 72:
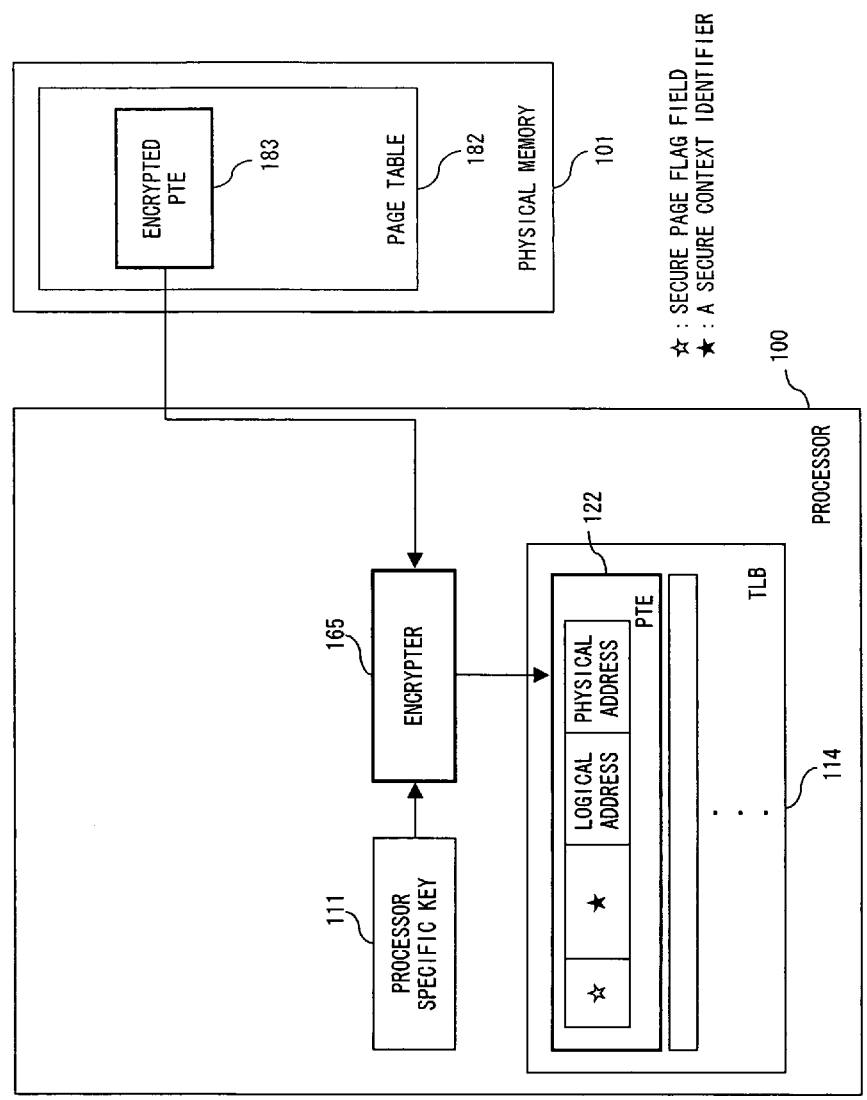
FIG. 72 is an explanatory diagram of a decryption system of the page table entry.

FIG. 72 is an explanatory diagram of a decryption system for the corresponding encrypted PTE shown in FIG. 71. In this figure, the encrypted PTE 183 stored in the physical memory 101 is decrypted using the decrypter 168 using the processor-specific key 111 and is stored as PTE in the TLB 114.

Figure 73:
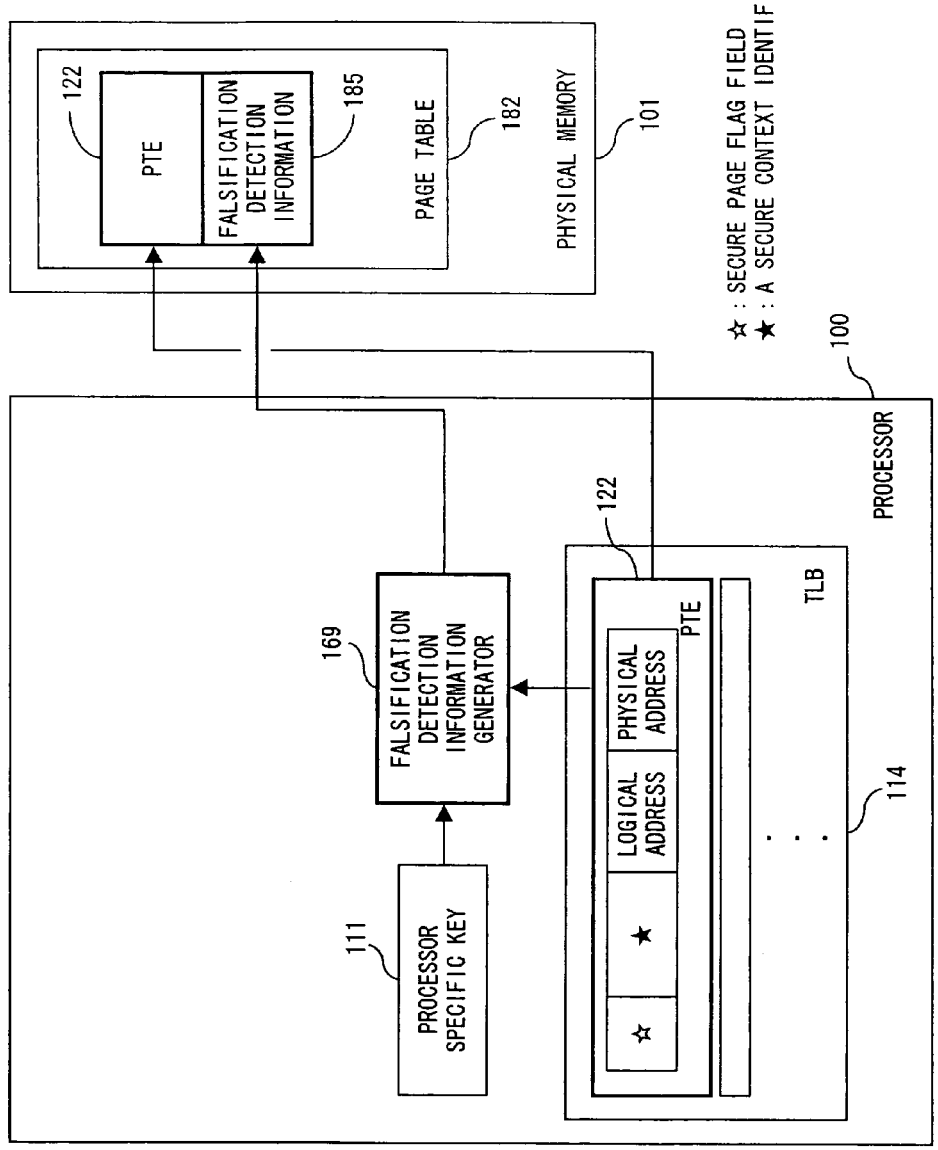
FIG. 73 is an explanatory diagram of a falsification detecting information adding system to the page table entry.
Figure 74:
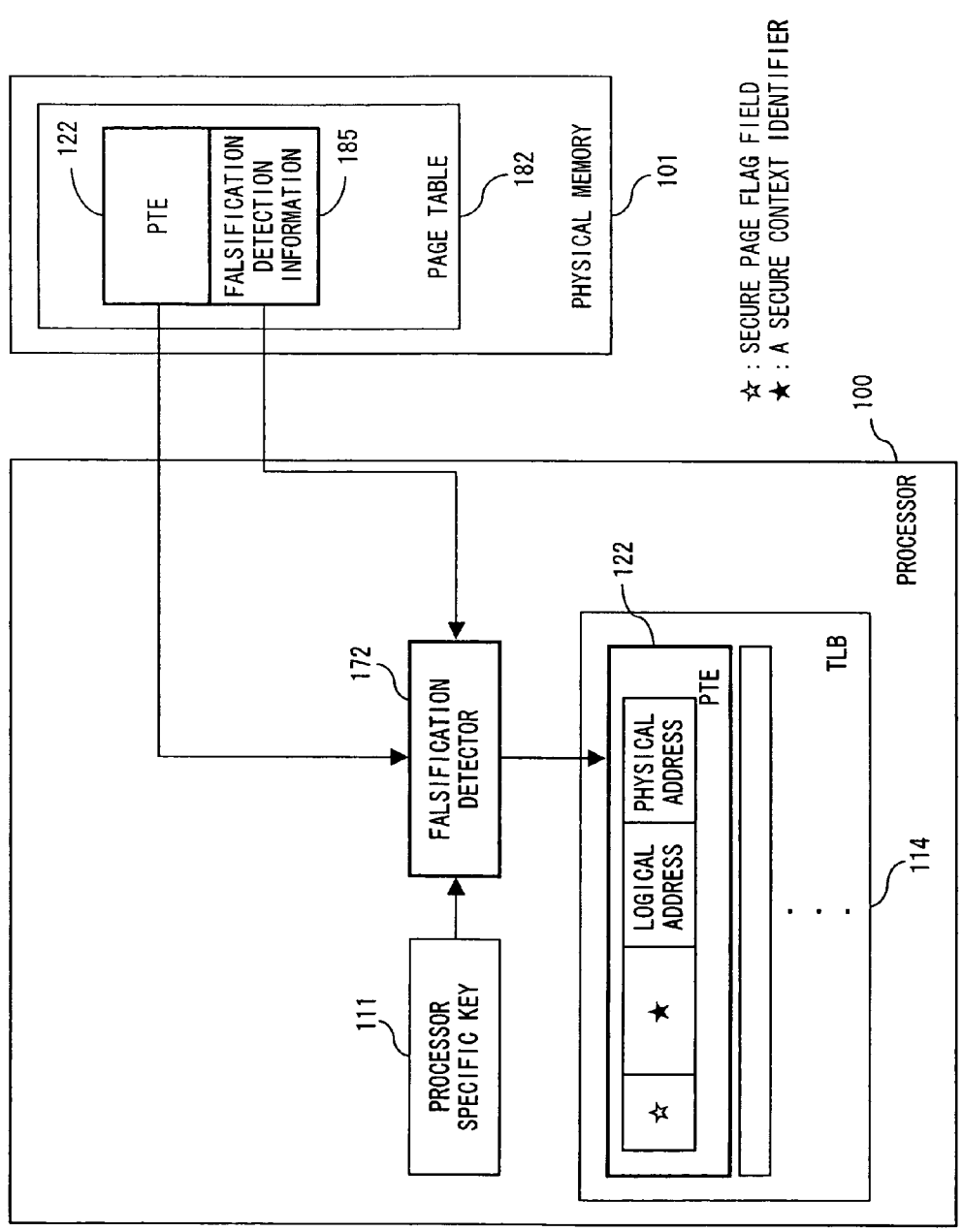
FIG. 74 is an explanatory diagram of a falsification detecting system for the page table entry.

FIG. 73 is an explanatory diagram of an falsification detection information addition system to the PTE and FIG. 74 is an explanatory diagram of an falsification detection system for the PTE. In FIG. 73, an falsification detection information 185 for the PTE 122 is generated using the processor-specific key 111 by the falsification detection information generator 169 and is stored in the page table 182 along with the PTE 122.

In FIG. 74, falsification is detected in the PTE 122 stored in the page table 182 by the falsification detector 172 using the alternation detection information 185 and the processor-specific key 111.

As mentioned above, in the seventh embodiment, encryption and falsification detection are performed for the context information and PTE used by the secure processor so that the security of information processing is further improved.

Figure 75:
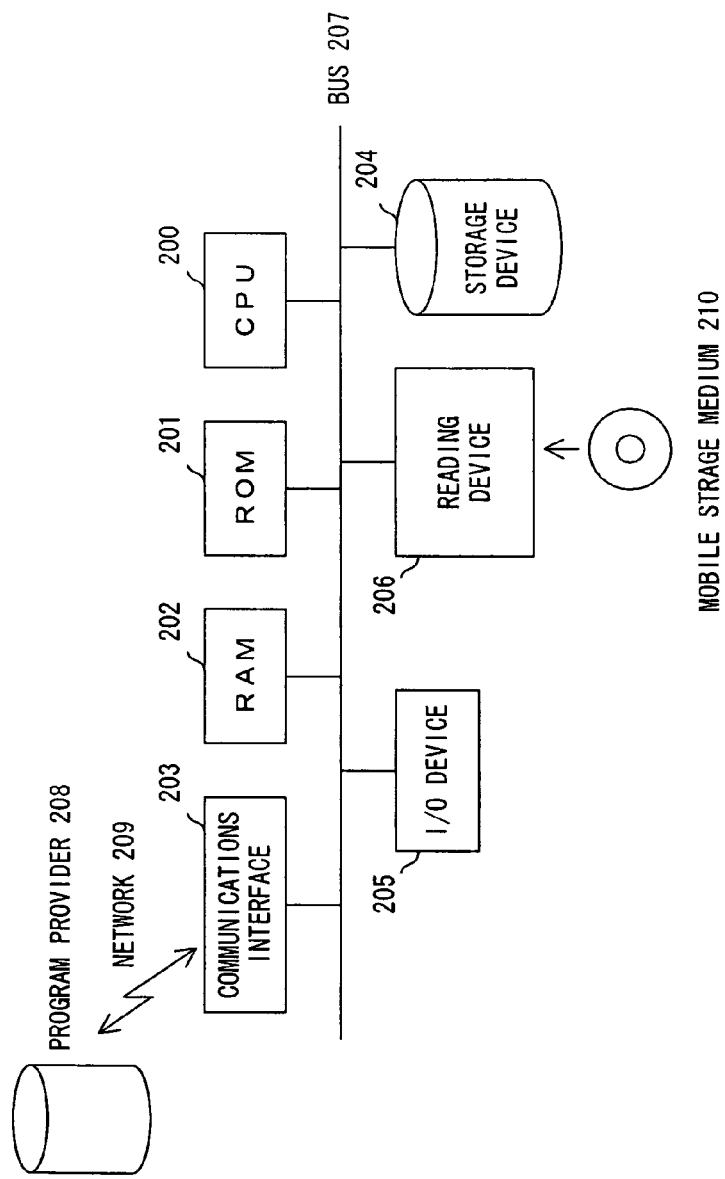
FIG. 75 is a diagram explaining when loading a program to the computer to implement the present invention.

A secure processor of the present invention and a program for the secure processor were described in detail above. It is possible to use this secure processor as a basic component of the general computer systems. FIG. 75 is a configuration block diagram of such a computer system, namely the hardware environment.

A computer system shown in FIG. 75 comprises a central processing unit (CPU) 200, a read only memory (ROM) 201, a random access memory (RAM) 202, a communication interface 203, a memory device 204, I/O device 205, a mobile storage meduim reading device 206, and a bus 207 connecting all of the components.

As memory devices 204, various types of memory devices such as a hard disk and magnetic disk can be used. The programs are shown in FIG. 3 through FIG. 5, FIG. 7, FIG. 9 through FIG. 11 and in other flowcharts, and programs are described in claims 7, 19 and 20, in the scope of the present invention, are stored in such memory devices 204 or ROM 201 and when these programs are executed by the CPU 200, operation of a secure processor, setting of an encryption key, code authentication processing and encryption processing can be carried out in the embodiments of the present invention.

These programs can be stored in the memory devices 204 by the program providers 208 via network 209 and communication interface 203, or they can be stored in mobile memory media which have been distributed commercially, set in a reading device 206 and executed by the CPU 200. As mobile memory media 210, a variety of types of memory media such as CD-ROMs, flexible disks, photo disks, photo magnetic disks, and DVDs can be used. The secure processor in the mode of the present invention can be operated when the programs stored in such memory media are read by the reading devices 206.

The invention claimed is:

1. A secure processor comprising:
an instruction execution unit configured to execute instructions;
a load/store control unit configured to control loading/storing of the data for an external memory in response to a command from the instruction execution unit;
an encryption processing unit configured to perform data encryption/decryption of data between the load/store control unit and the external memory; and
a key storing unit configured to store multiple encryption keys and multiple decryption keys, wherein
the instruction execution unit specifies an encryption key to be used for data encryption by the encryption processing unit in response to an instruction being executed, the specified encryption keys being varied among a plurality of instructions or a plurality of intervals of instructions being executed, outputs an encryption key number to specify the encryption key to the key storing unit, specifies a decryption key to be used for data decryption by the encryption processing unit in response to an instruction being executed, the specified decryption keys being varied among a plurality of instructions or a plurality of intervals of instructions being executed, and outputs a decryption key number to specify the decryption key to the key storing unit, and
the key storing unit gives the encryption key to be used for data encryption to the encryption processing unit in response to the encryption key number and gives the decryption key to be used for data decryption to the encryption processing unit in response to the decryption key number.

2. The secure processor according to claim 1, wherein the key storing unit configured to store decryption keys to be used for decryption of the instruction fetched data loaded externally, and when the instruction execution unit is in an instruction fetched state, the key storing unit gives the decryption key for decryption to the encryption processing unit.

3. The secure processor according to claim 1, further comprising:
a key number storing unit configured to store encryption key numbers specifying the encryption keys and decryption key numbers specifying the decryption keys, which are output by the instruction execution unit, wherein
the key storing unit gives the encryption key to be used for the data encryption to the encryption processing unit in response to the encryption key number given from the key number storing unit and gives the decryption key to be used for the data decryption to the encryption processing unit in response to the decryption key number given from the key number storing unit.

4. The secure processor according to claim 1, further comprising:
a key number storing unit configured to store decryption key numbers of the decryption keys to be used for decryption of the instruction fetched data loaded from the outside, wherein
when the instruction execution unit is in an instruction fetched state, the key storing unit gives the decryption key to be used for decryption of the instruction fetched data to the encryption processing unit in response to the decryption key number output from the key number storing unit.

5. The secure processor according to claim 1, wherein the instruction execution unit outputs supervisor/user switching signals in response to the instruction in addition to the encryption key number or the decryption key number as a signal to specify the encryption key or the decryption key.

6. The secure processor according to claim 1, wherein the instruction execution unit outputs a process identifier including the instruction being executed in addition to the encryption key number or the decryption key number as a signal to specify the encryption key or the decryption key.

7. The secure processor according to claim 1, wherein the load/store control unit further comprises:
a write-through type cache memory; and
a read modify write unit configured to give the data to be stored in the external memory combined with the data loaded via the encryption processing unit from the external memory to the encryption processing unit.

8. The secure processor according to claim 1, further comprising a data bypass unit configured to transfer a plain text data without performing encryption/decryption by bypassing the encryption processing unit between the load/store control unit and the external memory.

9. A secure processor comprising:
an instruction execution unit configured to execute instructions;
a load/store control unit configured to control loading/storing of the data to an external memory in response to a command from the instruction execution unit;
an encryption processing unit configured to perform encryption/decryption of the data between the load/store control unit and the external memory; and
a key storing unit configured to store multiple encryption keys and multiple decryption keys, wherein
the instruction execution unit specifies an encryption key to be used for data encryption to the encryption processing unit in response to a first access address of data/instruction fetch based on the instruction being executed, different encryption keys being specified for a plurality of access addresses of data/instruction fetch, outputs a first logical address as the first access address to the key storing unit, specifies a decryption key to be used for data decryption to the encryption processing unit in response to a second access address of data/instruction fetch based on the instruction being executed, different decryption keys being specified for a plurality of access addresses of data/instruction fetch, and outputs a second logical address as the second access address to the key storing unit, and the key storing unit gives the encryption key for data encryption to the encryption processing unit in response to the first logical address and gives the decryption key for data decryption to the encryption processing unit in response to the second logical address.

10. The secure processor according to claim 9, wherein the load/store control unit outputs a physical address as the first access address or the second access address to the key storing unit in response to the command given from the instruction execution unit, and the key storing unit gives the encryption key or the decryption key to the encryption processing unit in response to the physical address.

11. The secure processor according to claim 9, wherein the key storing unit configured to store multiple encryption keys and multiple decryption keys respectively corresponding to logical addresses and physical addresses as access addresses, and the key storing unit gives the encryption processing unit the encryption key or the decryption key which corresponds to an address selected based on an instruction from the instruction execution unit which indicates which of a physical address given by the load/store control unit or a logical address given from the instruction execution unit is selected.

12. The secure processor according to claim 9, further comprising:

an address selection instruction storing unit configured to store data for address selection instruction which are output by the instruction execution unit and which indicate an encryption key or a decryption key to be given to the encryption processing unit in response to either a logical address or a physical address, wherein the key storing unit gives the encryption key or the decryption key corresponding to the logical address or the physical address based on the contents stored in the address selection instruction storing unit to the encryption processing unit.

13. The secure processor according to claim 9, wherein the load/store control unit selects the encryption key or the decryption key stored in the key storing unit in response to the first logical address or the second logical address given while the instructions are executed from the instruction execution unit and gives the selected key to the encryption processing unit.

14. The secure processor according to claim 13, wherein the instruction execution unit outputs a signal indicating ON/OFF of the key storing unit and a signal giving an encryption key or a decryption key to be used when the key storing unit indicates an OFF state, to the encryption processing unit, and in response to the ON/OFF signal, the encryption processing unit uses the encryption key or the decryption key given from the key storing unit when the key storing unit indicates ON, whereas the encryption processing unit uses the encryption key or the decryption key given from the instruction execution unit when the signal is OFF.

15. The secure processor according to claim 9, wherein the instruction execution unit outputs a supervisor/user switching signal in response to the instruction in addition to the first logical address or the second logical address as a signal to specify the encryption key or the decryption key.

16. The secure processor according to claim 9, wherein the instruction execution unit outputs a process identifier including the instruction being executed in addition to the first logical address or the second logical address as a signal to specify the encryption key or the decryption key.

17. The secure processor according to claim 9, wherein the load/store control unit further comprises a write-through type cache memory, and a read modify write unit configured to give the data to be stored in the external memory combined with the data loaded via the encryption processing unit from the external memory to the encryption processing unit.

18. The secure processor according to claim 9, further comprising a data bypass unit configured to transfer a plain text data without performing encryption/decryption by bypassing the encryption processing unit between the load/store control unit and the external memory.

* * * * *